US009790574B2

(12) United States Patent
Nagel et al.

(10) Patent No.: US 9,790,574 B2
(45) Date of Patent: Oct. 17, 2017

(54) DEVICES FOR TAILORING MATERIALS

(75) Inventors: Christopher J. Nagel, Wayland, MA (US); John T. Preston, Hingham, MA (US)

(73) Assignee: Electromagnetics Corporation, Fall River, MA (US)

(*) Notice: Subject to any disclaimer, the term of this patent is extended or adjusted under 35 U.S.C. 154(b) by 1497 days.

(21) Appl. No.: 13/300,971

(22) Filed: Nov. 21, 2011

(65) Prior Publication Data

US 2012/0133464 A1 May 31, 2012

Related U.S. Application Data

(60) Provisional application No. 61/416,141, filed on Nov. 22, 2010.

(51) Int. Cl.
*H01F 7/20* (2006.01)
*C22C 9/00* (2006.01)

(52) U.S. Cl.
CPC ..................... *C22C 9/00* (2013.01)

(58) Field of Classification Search
CPC ................. C22C 9/00; H01L 2924/12041
USPC .................................... 335/209, 284
See application file for complete search history.

(56) References Cited

U.S. PATENT DOCUMENTS

| 2,395,458 A | 2/1946 | Cape |
| 2,956,873 A | 10/1960 | Gordon |
| 3,331,712 A | 7/1967 | Griest et al. |
| 3,695,865 A | 10/1972 | Wolker |
| 3,754,894 A | 8/1973 | Saccomano et al. |
| 3,985,310 A | 10/1976 | Kent et al. |
| 4,168,967 A | 9/1979 | Sridhar et al. |
| 4,175,954 A | 11/1979 | Oden et al. |
| 4,260,008 A | 4/1981 | Kranz et al. |
| 4,318,738 A | 3/1982 | Masumoto et al. |
| 4,456,479 A | 6/1984 | Harris et al. |
| 4,613,386 A | 9/1986 | Kansa et al. |
| 4,685,965 A | 8/1987 | Strigl |
| 5,190,577 A | 3/1993 | Bermel et al. |
| 5,281,939 A | 1/1994 | Juds et al. |
| 5,288,342 A | 2/1994 | Job |
| 5,308,379 A | 5/1994 | Ishida et al. |
| 5,362,421 A | 11/1994 | Kropp et al. |

(Continued)

FOREIGN PATENT DOCUMENTS

| EP | 1008839 | 6/2000 |
| JP | 0499236 | 3/1992 |

(Continued)

OTHER PUBLICATIONS

Database WPI, Section Ch, Week 197728, Derwent Publications Ltd., London, GB; XP002254970, Class M24, An 1977-49267Y and JP 52065133 (Nippon Steel Corp), May 30, 1977 Abstract.

(Continued)

*Primary Examiner* — Bernard Rojas
(74) *Attorney, Agent, or Firm* — Onello & Mello, LLP

(57) ABSTRACT

The present invention relates to devices that improve control by selection, inversion, fortification, uniformization and mapping background energy (including dark energy and/or dark matter) and including electromagnetic energies in various forms and states of aggregation, during a tailoring process and to processes of tailoring materials.

42 Claims, 37 Drawing Sheets

(56) References Cited

U.S. PATENT DOCUMENTS

| | | |
|---|---|---|
| 5,449,491 A | 9/1995 | Job |
| 5,580,574 A | 12/1996 | Behl et al. |
| 5,632,826 A | 5/1997 | Hultin-Stigenberg et al. |
| 5,672,879 A * | 9/1997 | Glavish ............... H01J 37/1475 250/396 ML |
| 5,759,308 A | 6/1998 | Hultin-Stigenberg et al. |
| 5,858,125 A | 1/1999 | Hasegawa |
| 5,958,599 A | 9/1999 | Goyal et al. |
| 6,008,069 A | 12/1999 | Yamada |
| 6,192,969 B1 | 2/2001 | Bunn et al. |
| 6,235,251 B1 | 5/2001 | Davidson |
| 6,277,438 B1 | 8/2001 | Olivas |
| 6,303,760 B1 | 10/2001 | Dorn et al. |
| 6,421,366 B1 | 7/2002 | Breker et al. |
| 6,572,792 B1 | 6/2003 | Nagel |
| 6,693,264 B2 | 2/2004 | Anderhuber et al. |
| 6,921,497 B2 | 7/2005 | Nagel |
| 7,238,297 B2 | 7/2007 | Nagel |
| 7,252,793 B2 | 8/2007 | Nagel |
| 7,317,870 B2 | 1/2008 | Timans et al. |
| 7,491,348 B2 | 2/2009 | Nagel |
| 7,655,160 B2 | 2/2010 | Nagel |
| 7,707,403 B2 | 4/2010 | Nagel |
| 2004/0113130 A1 | 6/2004 | Nagel |
| 2004/0124958 A1 | 7/2004 | Watts et al. |
| 2004/0129350 A1 | 7/2004 | Nagel |
| 2004/0129925 A1 | 7/2004 | Nagel |
| 2005/0064190 A1 | 3/2005 | Nagel |
| 2006/0076484 A1 | 4/2006 | Brown et al. |
| 2006/0186800 A1 | 8/2006 | Nagel |
| 2008/0191705 A1 | 8/2008 | Bellan |
| 2010/0111752 A1 | 5/2010 | Nagel |
| 2010/0315039 A1* | 12/2010 | Terao ..................... H02J 7/025 320/108 |
| 2015/0236633 A1* | 8/2015 | Torrey ................. H02P 25/088 318/254.1 |
| 2016/0045841 A1* | 2/2016 | Kaplan ............... B01J 19/0093 429/49 |

FOREIGN PATENT DOCUMENTS

| | | |
|---|---|---|
| JP | 04124235 | 4/1992 |
| JP | 11255593 | 9/1999 |
| SU | 1132136 | 4/1983 |
| WO | 9529678 | 11/1995 |
| WO | 199927146 | 6/1999 |
| WO | 2003089676 A2 | 10/2003 |
| WO | 2005072207 A2 | 8/2005 |

OTHER PUBLICATIONS

Job, Jennifer, "New Carbon Molecules Make Stronger Metals," The World and I, pp. 170-177, 1991.
Burstein, et al., "Electrochemically Induced Annealing of Stainless-Steel Surfaces," Nature, 407:885-887, 2000.
Gorman, J., "New Work Improves Stainless Steel Surface," Science News, 158:312, 2000.
Weiss, P., "Pores of Glass Skin Shrink from Light," Science News, 158:312, 2000.
Weiss, P., "Light Pulses Flout Sacrosanct Speed Limit," Science News, 157:375, 2000.
Weiss, P., "Vibrations Flit Along Water's Fast Lane," Science News, 156:358, 1999.
Weiss, P., "Electron Breakup? Physics Shake-up," Science News, 158:216, 2000.
Milius, S., "Wasps Drive Frog Eggs to (Escape) Hatch," Science News, 158:246, 2000.
Gorman, J., "Crystal Reveals Unexpected Beginnings," Science News,158:84, 2000.
Weiss, P., "Voltage Flip Turns Magnetism on, off," Science News, 159:63, 2001.
Ohno, et al.,"Electric-field Control of Ferromagnetism," Nature, 408:944-946, 2000.
Weiss, P., "Light Stands Still in Atom Clouds," Science News, 159:52, 2001.
Gorman, J., "Strange Crystal Birth Found in Mine," Science News, 158:207, 2000.
Holzheld, et al., "Evidence for a Late Chondritic Veneer in the Earth's Mantle From High-Pressure Partitioning of Palladium and Platinum," Nature, 406:396-399, 2000.
Kishimoto, et al., "Observation of Nuclear Excitation by Electron Transition in 197 Au with Synchrotron X Rays and an Avalanche Photodiode," The American Physical Society, 85:1831-1834, 2000.
Carreyre, et al., "First Direct Proof of Internal Conversion Between Bound States," The American Physical Society, 62:024311-1/024311-8, 2000.
Jacoby, "Picture-Perfect Orbitals," C&EN, p. 8, 1999.
Zuo, et al., "Direct Observation of d holes and Cu-Cu Bonding in Cu20, " AR3 Nature, 401:49, 1999.
Raloff, J., "Medicinal EMFs: Harnessing Electric and Magnetic Fields for Healing and Health," Science News, 1999. 156:316-318.
Weiss, P., "Magnetic Whispers: Chemistry and Medicine Finally Tune into Controversial Molecular Chatter," Science News, 159:42-44, 2001.
Weiss, P., "Breaking the Law: Can Quantum Mechanics + Thermodynamics = Perpetual Motion?," Science News, 2000. 158:234-239, 2000.
"Pravda Releases More Info on Sensational Energy Source Discovery" [online], Jul. 12, 2001. Retrieved from the Internet http://www.100megsfree4.com/farshores/nrussen.htm (No Author Cited).
"Handbook of Chemistry and Physics, 73rd Edition," edited by D.R. Lide, CRC Press, pp. 10-233 tp 10-271, 1992.
Havrilla, "X-Ray Fluorescence Spectrometry," Handbook of Instrumental Techniques for Analytical Chemistry, Frank A. Settle, Ed., Prentice-Hall, Inc., pp. 459-468, 1997.
Database WPI, Section PQ, Week 199438, Derwent Publications Ltd., London, GB; XP002254971, Class P53, AN 1994 1994•308766 and KR 9 310 044 B (Lee D), 1993, Abstract.
Database WPI, Section Ch. Week 198204, Derwent Publications Ltd, London, GB; XP002254972.Class L03, AN 1982.06910E and IP 56162427 A (Meidensha Elec MgfCo Ltd), 1981, Abstract.
Australian Examination Report dated Jan. 27, 2017 issued in corresponding Australian Application No. 2016202554.
Canadian Office Action dated Jul. 6, 2017 issued in corresponding Canadian Application No. 2,817,391.

* cited by examiner

DEVICES FOR TAILORING MATERIALS

RELATED APPLICATIONS

This application claims the benefit of U.S. Application No. 61/416,141, filed Nov. 22, 2010. The entire teachings of the above application(s) are incorporated herein by reference.

BACKGROUND OF THE INVENTION

Tailoring a variety of materials has been described in U.S. Pat. Nos. 6,572,792 and 7,238,297, entitled "COMPOSITION OF MATTER TAILORING: SYSTEM I" and U.S. Ser. No. 11/063,694 entitled "COMPOSITION OF MATTER TAILORING: SYSTEM II", filed Feb. 23, 2005, each by Christopher Nagel, the contents of which are incorporated herein by reference. In the methods described in the prior patents, carbon is added to the material in an iterative heating cycle and the products produced by the methods possess modified electronic structures. Improvements in process control are desirable.

SUMMARY OF THE INVENTION

The present invention relates to devices that improve control by selection, inversion, fortification, uniformization and mapping background energy (including vacuum energy, dark energy and/or dark matter, grid or brane energy) and including electromagnetic energies in various forms and states of aggregation, during a tailoring process and to processes of tailoring materials. Background energy can be disaggregated and then integrated into common forms of matter (e.g., materials) for the expressed purpose of altering electrodynamic interactions by establishing harmonic maps between the respective electromagnetic fields.

Preferred devices for controlling tailoring and background energy during a tailoring process include a CPT Cage, such as an apparatus for tailoring materials comprising two or more closed loops made of conductive materials, such as wire rings or windings, each ring connected to at least one power supply and/or frequency generator. Preferably, at least one closed loop is connected to a DC power supply and at least one closed loop is connected to an AC power supply. Alternatively, the power supply can be either AC or DC. Preferably, at least one closed loop is connected to a DC power supply with an AC overlay. The closed loops are preferably stacked or disposed to form a "cage" or define a space or volume within the closed loops sufficient to house a material to be tailored.

Preferred devices also include concentrators of aggregated or disaggregated background energy forms, such as a CPT Cage as discussed above and/or an apparatus comprising two or more polarizers or columnators (conductive plates), an amplifier or attenuator (forcing function), and a resonant modulator (either an electrode, conductive toroid, plate(s) or needle(s)), each connected to a DC and an AC power supply. The polarizers or columnators are characterized by a distal and proximal ends, the resonant modulators located proximal to, but not touching, the proximal end of the polarizers or columnators. The resonant modulator(s) preferably have an opposing charge to the polarizers or columnators. Preferably, arcing between the resonant modulators and polarizers or columnators is avoided. Each device can be used with an optional forcing function and/or manufactured from a tailored material. Forcing functions, as defined below, can optionally be attached or layered on to one or more elements of a concentrator. These concentrators include a DE Lens, such as a Macro Lens, Micro Lens and Needle Lens and are preferably placed outside the CPT Cage, aligned radially therewith with the resonant modulator and proximal end of the polarizers or columnators also proximal to the CPT Cage. Each concentrator can be used independently or in any combination. For example, a CPT Cage can be used alone or in combination with one or more DE Lens, including a Macro Lens, Micro Lens and/or Needle Lens. When used together, they can be used in parallel (along independent radiuses from the CPT Cage center) or in series (along the same radius from the CPT Cage center). Further, each concentrator can be used with or without a forcing function. For example, a forcing function can be overlayed onto an element of the device. Each element of a concentrator (e.g., rings, toroids, columnators, collectors, resonant modulators and the like) can be manufactured independently from tailored or natural materials. An Operating Unit is defined as one or more concentrators in combination with a material to be tailored.

Preferred devices also include a Needle Lens, such as an apparatus comprising at least one stepper or exciter (needle), a resonant modulator (toroid) and a collector, said stepper and toroid being connected to a DC and/or AC power supply such as a frequency generator.

The present invention also relates to apparatus and processes for tailoring materials comprising one or more of the devices described herein in connection with a tailoring apparatus comprising at least one light source.

Any matter can be tailored, including solids, liquids and gases. For example, metals, alloys, elements, inorganic compounds (such as salts, ceramics, oxides, carbonates, sulfates, halides, and other minerals), organic compounds (such as alkanes, alkanols and the like) and the noble gases can be tailored. The tailored materials produced in accordance with the invention are defined, distinguished and/or characterized by a change in one or more energy, electronic properties, physical properties, and the like. As established in U.S. Pat. No. 7,238,297, X-ray fluorescence spectroscopy is one method of detecting and distinguishing tailored materials. Changes in properties can be made and/or controlled to be transient, fixed, adjusted, or temporary and include properties such as mechanical, electrical, chemical, thermal, engineering, and physical properties, as well as structural character of the composition of matter (e.g., electronic character, electronic spacing, alignment, orientation, order, anisotropy, and the like).

The present invention includes tailored materials, also referred to as quasielements (QE), anomalous elements or emissions (AE), sensitized elements, or topologically induced emissions and materials comprising quasielements or anomalous elements or anomalous emissions. In one embodiment, the materials can be heat labile and, according, not tailored by previous methods. Further, because the process does not require achieving a molten state nor using dissolved carbon, tailored materials that are essentially carbon-free and are characterized by the x-ray fluorescence spectrometry plots and elemental abundance tables (obtained from x-ray fluorescence analysis) showing one or more AEs. In one embodiment, an AE is an element having an x-ray fluorescence emission which does not match a standard, as determined using the UNIQUANT® software package by ThermoFisher.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-5C illustrate embodiments of the frequencies applied to a DE Lens.

DETAILED DESCRIPTION OF THE INVENTION

The invention relates to the discovery that processes for tailoring materials are improved when using one or more apparatuses described herein.

Figure 1:
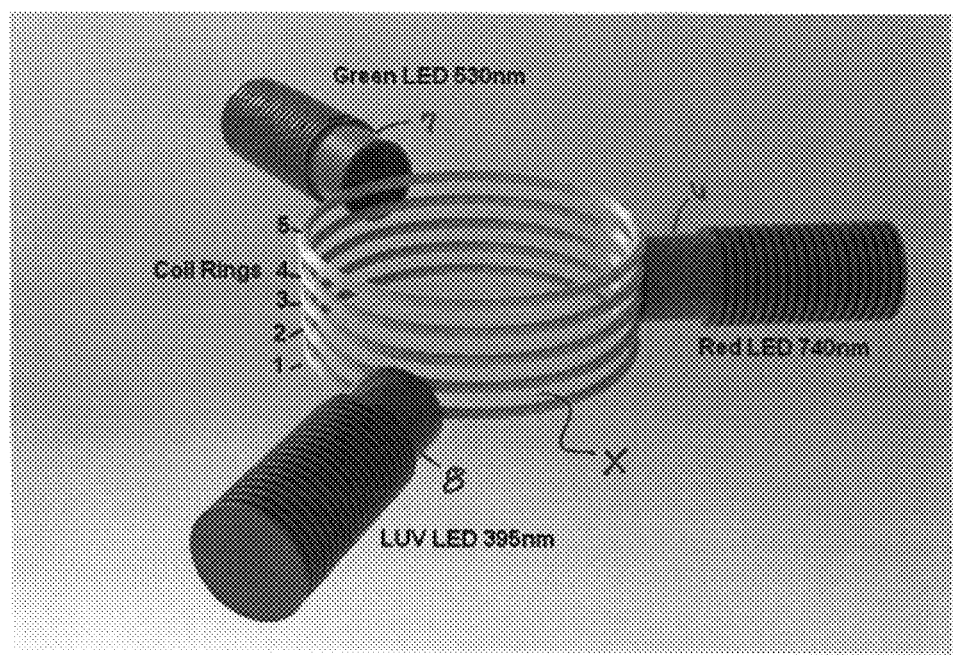
FIG. 1 is an illustration of an embodiment of the CPT Cage, the power supplies are not shown.

The CPT Cage of the invention comprises a plurality of intermodulators $a_{1-n}$, or closed loops of a conducting material. As shown in FIGS. 1 and 2, the intermodulators are wire rings or windings. The number of intermodulators can be 2, 3, 4, 5, or more. Five wire windings are illustrated in FIG. 1 and are numbered 1-5. In one preferred embodiment, the number is selected from the Fibonacci (or related series, such as Lucas) series. The intermodulators are preferably made of a conducting metal, copper is preferred, such as 14 to 30 gauge wire. In a particularly preferred embodiment for small samples, see below, 18 gauge copper magnet wire is employed. In one embodiment, the wire is a tailored material. The intermodulators and material to be tailored can be the same or different (e.g., an apparatus used to tailor copper can employ copper wire). The rings, or intermodulators, can be formed by winding wire. The outer diameter of each ring is, independently, preferably greater than 1 inch, such as at least 2, 3, 4 or more inches. Preferably the rings have the same dimensions. A preferred outer diameter is 4.25 inches. A preferred inner diameter is about 3.75" when the material to be tailored measures about 1.5"×1.5"×0.25". The diameter of the ring, or windings or toroidal diameter, is preferably less than 1 inch, such as less than 0.75, 0.5, or 0.25 inches. In one embodiment, each ring is formed by winding the wire between 10 and 12 times. The wire rings can be spaced evenly or uniformly or they can be spaced variably. Where the number of rings is greater than 5, the spacing preferably follows the Fibonacci series as well. For example, where the rings are equally spaced, each ring can be spaced, relative to its adjacent or proximate ring, by at least ¼", such as at least ⅜" or at least ½". Where the spacings follow the Fibonacci series, the spacing between the center ring and adjacent (or first adjacent) rings can be considered X (e.g. ¼"), the spacings between the first adjacent and the next adjacent (or second adjacent) rings can also be considered X, the spacings between the second adjacent and next adjacent (or third adjacent) rings can be considered 2X (e.g., ½"), the spacings between the third adjacent and next adjacent (or fourth adjacent) rings can be considered 3X (e.g., ¾") and so on.

For purposes of nomenclature elsewhere in the application, the $1^{st}$ ring will refer to the ring closest to the base of the apparatus (shown in FIG. 1 as ring 1), the $2^{nd}$ ring adjacent to and/or above the $1^{st}$ ring (shown in FIG. 1 as ring 2); the $3^{rd}$ ring adjacent to and/or above the $2^{nd}$ ring (shown in FIG. 1 as ring 3), etc.

Figure 2A:
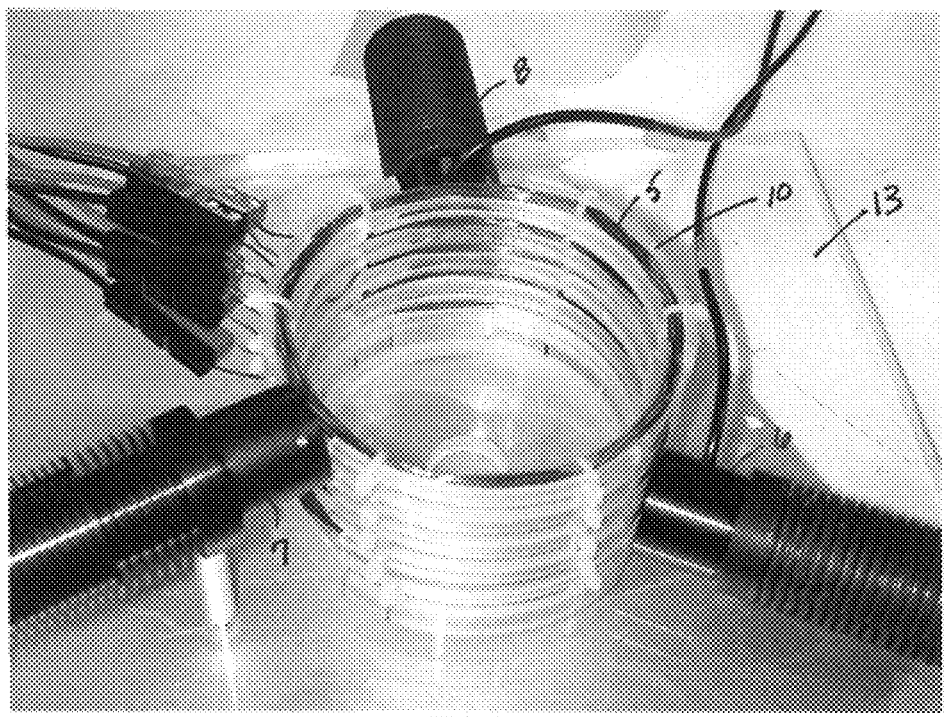
FIGS. 2A-2F are photographs of embodiments of the CPT Cage.
Figure 2B:
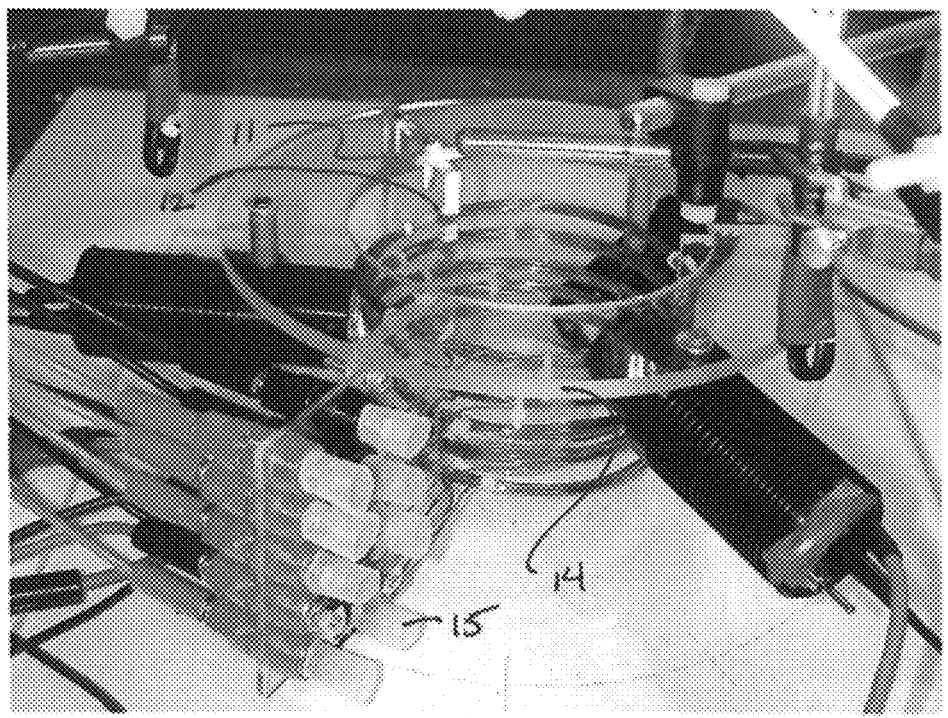

In general, the rings, or intermodulators, are configured, placed or stacked, to form a cylindrical space. The rings can be supported by vertical supports 10, preferably formed from a nonconductive material or resin. See FIG. 2A. A transparent resin is preferred. The supports can take the form of a sheet 11 radially placed on the outside of the cylindrical space with an indentation 12 on the internal surface (i.e., the surface facing the center of the apparatus) to receive the rings, or intermodulators. See FIG. 2B. Of course, alternative configurations can be envisioned. The supports can be fixed to a base 13 (FIG. 2A) and/or top 14 (FIG. 2B). The base and/or top can be made of the same material as the vertical support.

Each wire ring is connected 15 to a power supply and/or frequency generator (not shown). Each power supply can, independently, supply AC or DC current or a combination thereof to each ring. For example, AC can be provided at 1 mAmp or more, such as 2 amps. The DC power supplies can conveniently range from essentially 0 volts to 100 kv, typically 5 to 10 kv. DC supplies of up to 5 kv are convenient. For example, DC power can be supplied via either a 12 or 24 volt supply equipped to provide 2 amps DC optionally with 5 or 20, 50 ohm dropping resistor/coils. Frequencies can be supplied via AC in the range of 0 to 10 GHz or higher, such as 0 to 50 MHz, or 10 Hz to 5 MHz. Preferably, frequency is supplied via AC to at least one ring at about 1700 kHz. AC can be supplied in a constant fashion with a constant wave form or in a varied wave form. In another embodiment the frequency can be 1700 kHz+/−340 kHz. The frequency can oscillate around a set point of 1700 kHz and can be supplied in a patterned frequency, such as a square (Sq), triangle (Tri) or sine (Si) pattern. The power may be supplied with an offset or an overlay. For example, where 5 rings are employed, the $5^{th}$ and $3^{rd}$ rings can each be connected to a DC power supply, the $4^{th}$ and $1^{st}$ rings can be connected to 60 Hz AC power, the $2^{nd}$ ring can be connected to a frequency generator set for 1700 kHz in a square wave.

The order or direction that the current is applied can be varied. Changing the order or direction can impact the results obtained.

Figure 2C:
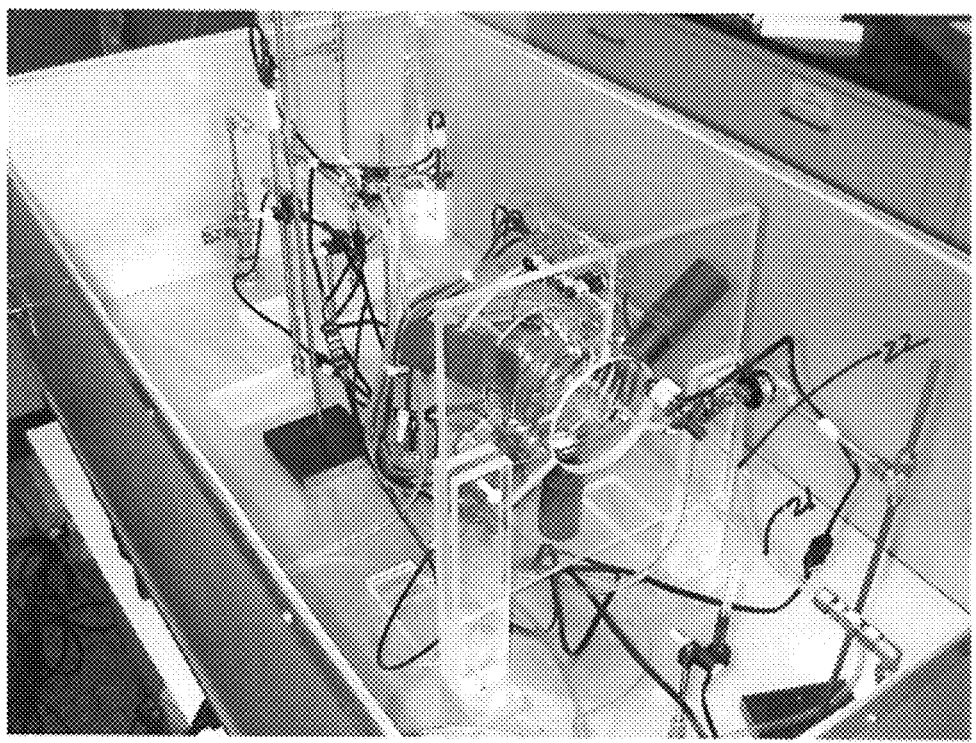
Figure 2D:
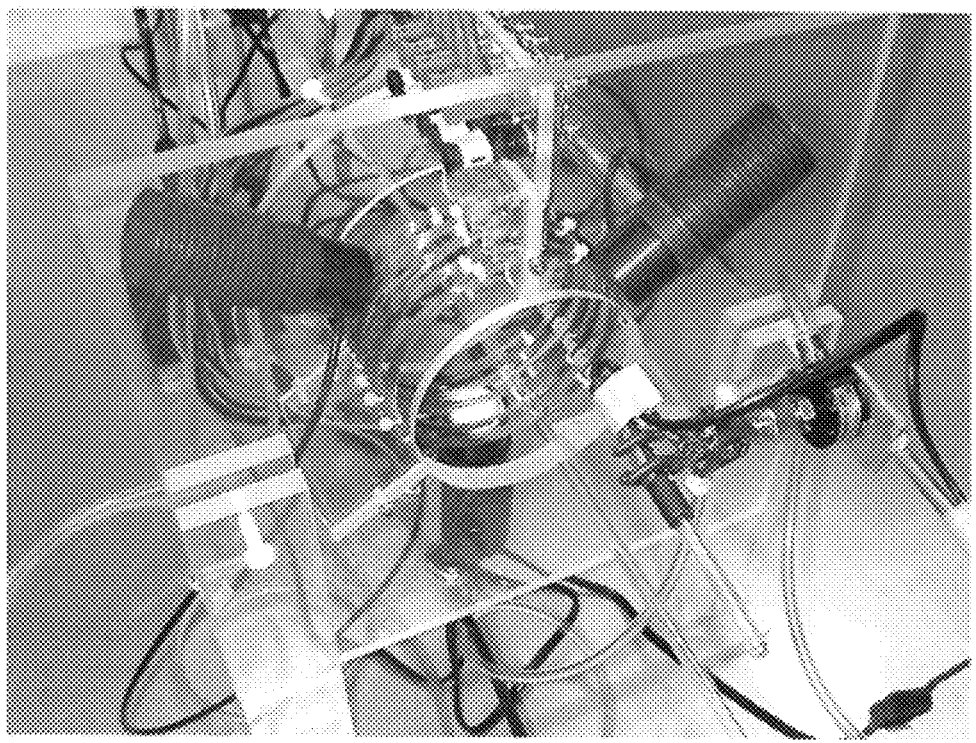
Figure 2E:
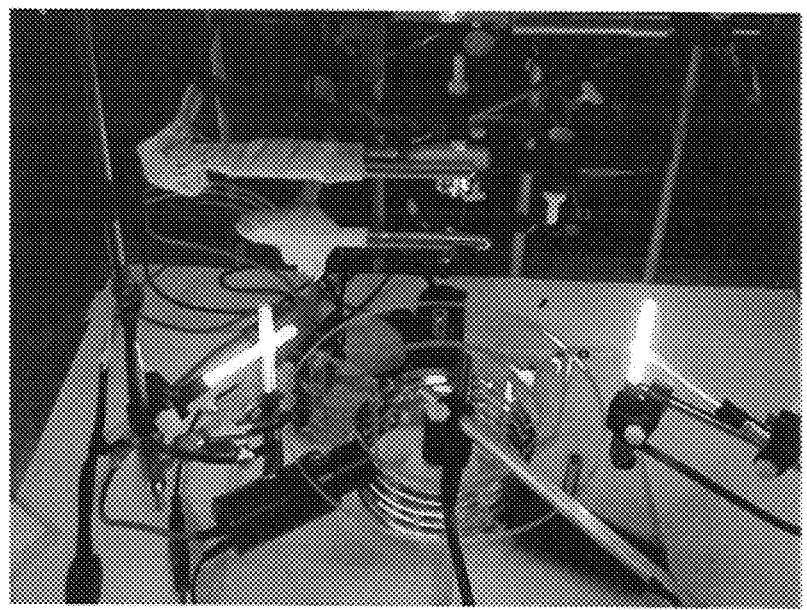
Figure 2F:
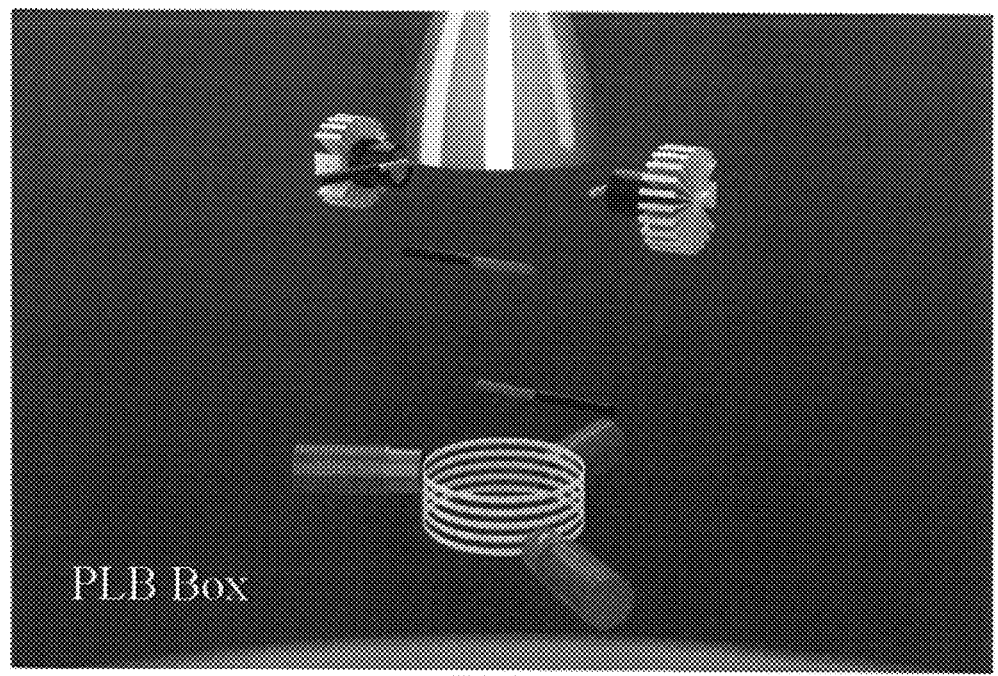

The Cage can be enclosed, as shown in FIGS. 2C and 2D or open, as shown in FIG. 2E.

In one embodiment of the invention, a process is provided wherein an iterative cycling or oscillating electromagnetic energy is applied to a material. A cycle includes a period of time where the energy of the material is varied between two distinct levels (L1 to L2, wherein L1<L2). Over a period of time, a cycle involves varying the energy level including a period of raising (or increasing) the energy potential of the material and a period when the energy potential decreases (either passively or actively), in any order. Inert gas can be added during the entire cycle or part of the cycle. The electromagnetic energy can preferably be supplied by one or more light sources, such as lamps 6-8 in FIG. 1, as will be described herein below. In a preferred embodiment, the material to be tailored is placed within the CPT Cage.

The following table provides examples of suitable power supplies and frequency generation arrangements.

Figure 6A:
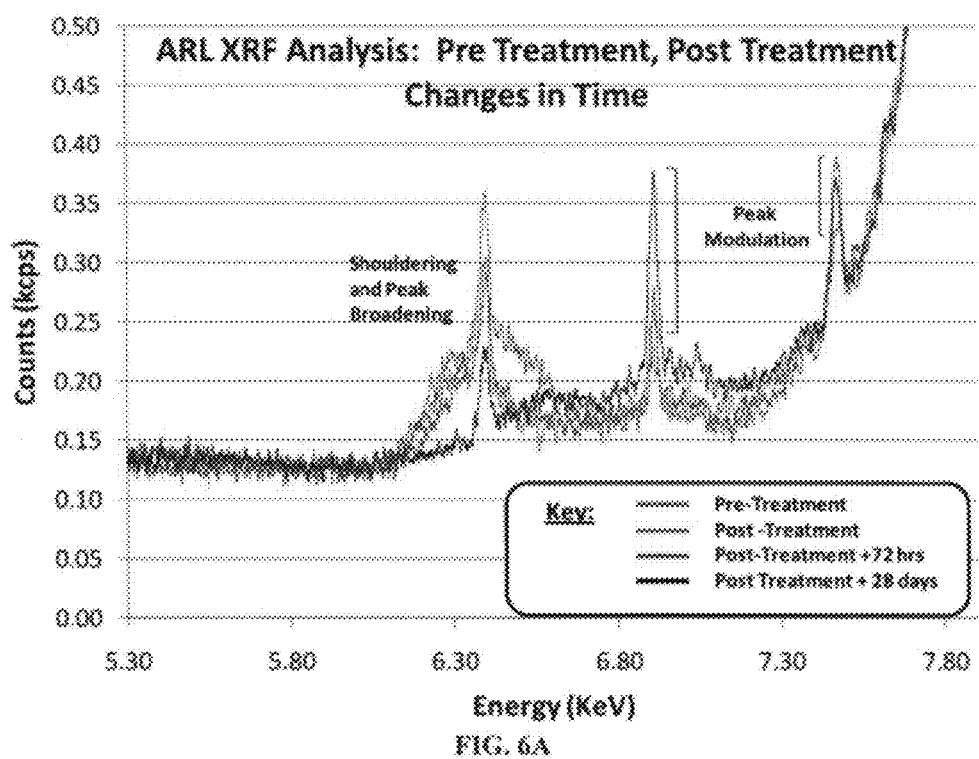
FIGS. 6A-6H represent the XRF analysis of embodiments employing the CPT Cage.
Figure 6B:
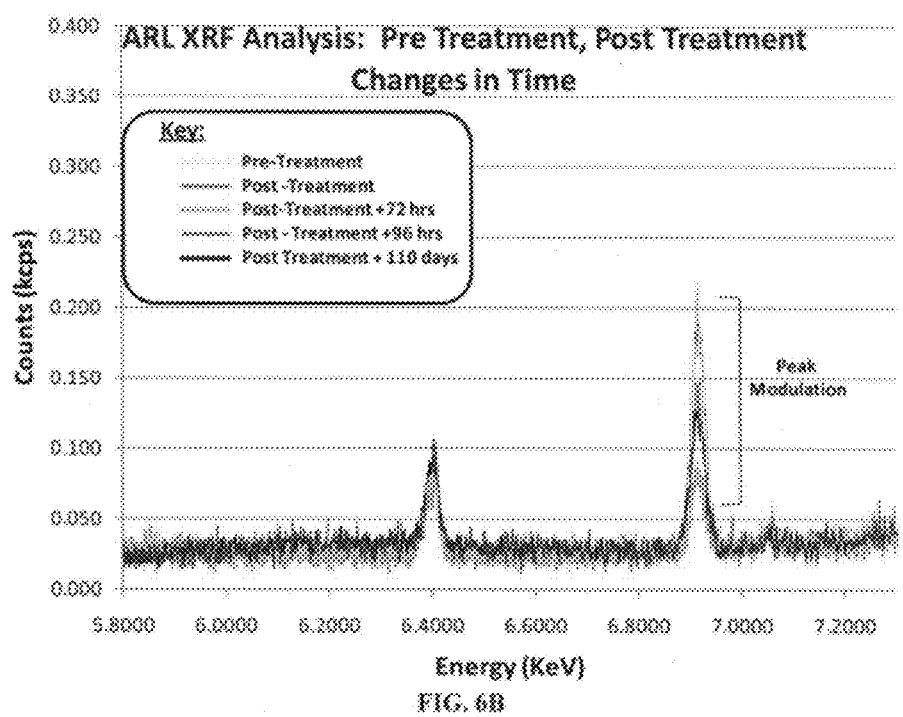
Figure 6C:
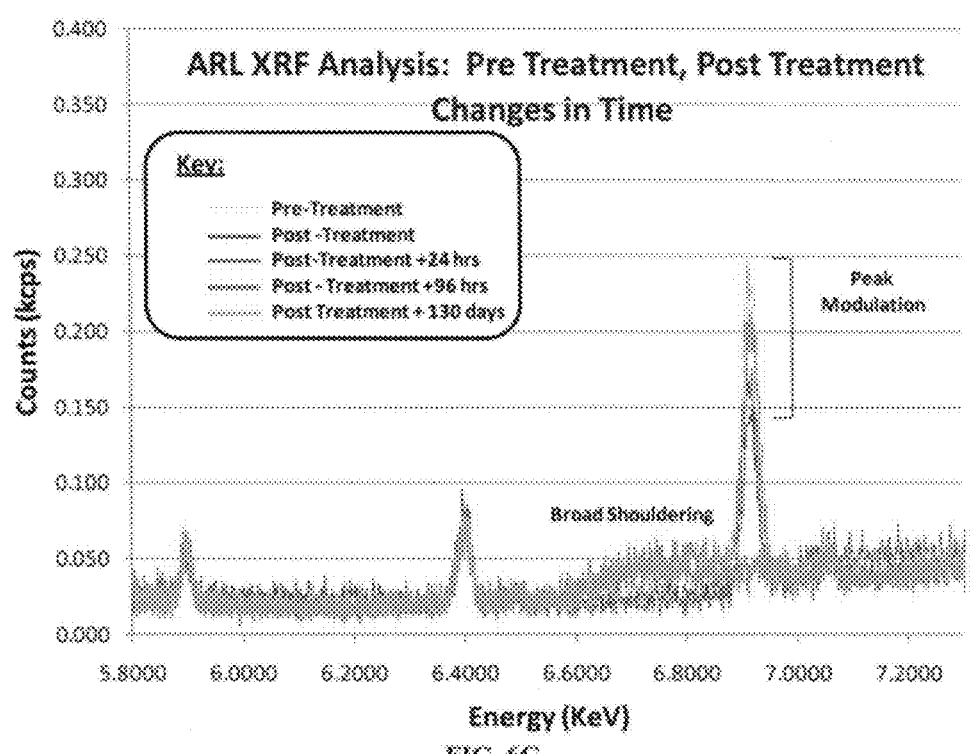
Figure 6D:
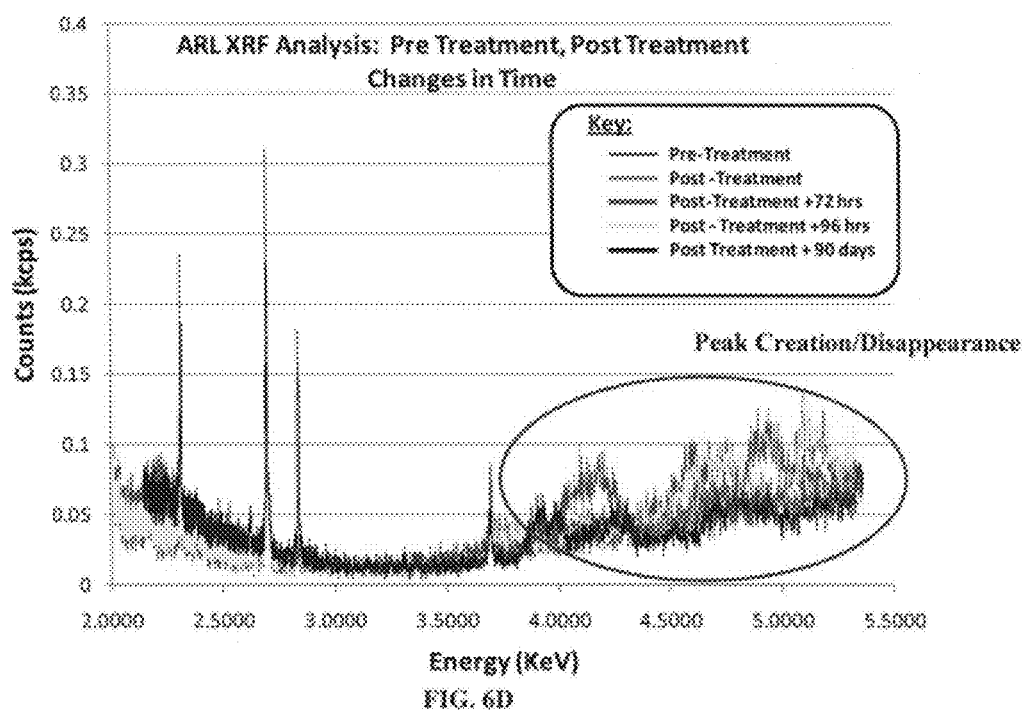
Figure 6E:
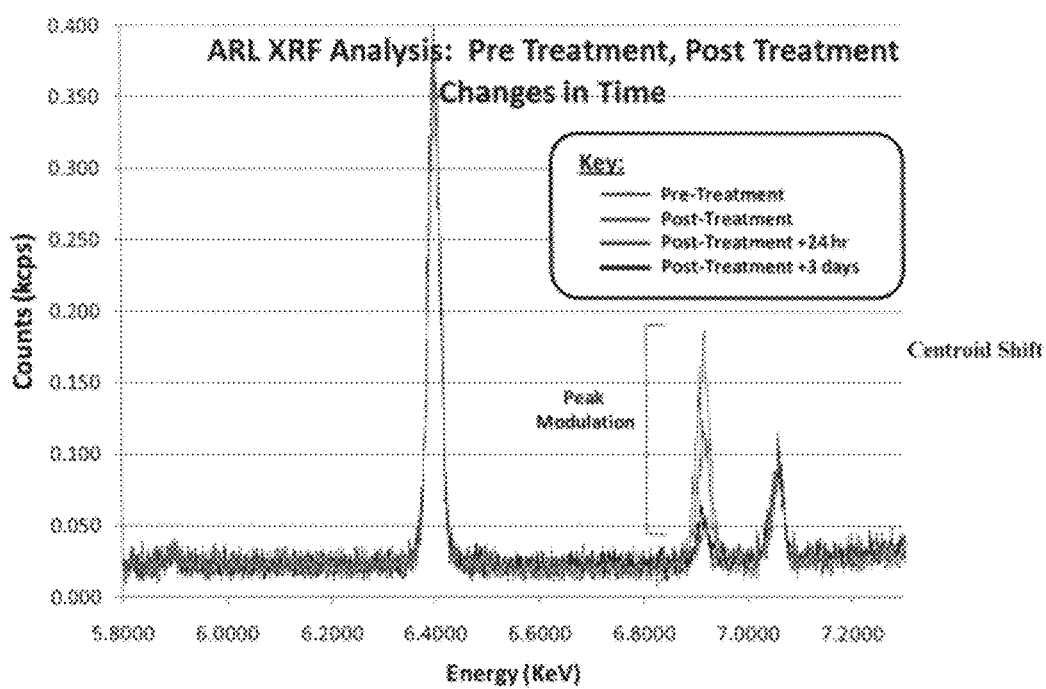

| | | | Coil Operating Patterns | | | |
|---|---|---|---|---|---|---|
| Exptl Protocol | 1st ring | 2nd ring | 3rd ring | 4th ring | 5th ring | Exptl Results |
| 14-07-03-H23 Example 1 | DC | AC | 987 Hz to 2.83 MHz | 1700 KHz Sq 557 Hz to 157 KHz | DC | Spectral Changes: Peak Modulation (same centroid) Peak Broadening/Narrowing Temporal Changes Recorded UniQuant (v2.54) Concentration Changes: Sensitized/Quasi Elements Detected/Induced; Concentration Change Quantified and Recorded Illustration: See FIG. 6A See Table 1a, 1b, 1c |
| 14-05-09 Example 2 | DC | AC | AC | 1700 KHz Sq | 500 KHz 20.2 MHz Si | Spectral Changes: Peak Modulation (same centroid): Temporal Changes: Recorded UniQuant (v2.54) Concentration Changes: Sensitized/Quasi Elements Detected/Induced; Concentration Change Quantified and Recorded Illustration: See FIG. 6B (ROI) See Table 2a, 2b, 2c |
| 14-09-07 Example 3 | 557 Hz to 157 KHz Sq | AC | AC | 1700 KHz Sq | DC | Spectral Changes: Peak Modulation (same centroid) Peak Broadening/Narrowing Temporal Changes Recorded UniQuant (v2.54) Concentration Changes: Sensitized/Quasi Elements Detected/Induced; Concentration Change Quantified and Recorded Illustration: See FIG. 6C See Table 3a, 3b, 3c |
| 14-06-03 Example 4 | DC | AC | 0.1 hz-3.5 MHz Tr | 1700 KHz Sq | DC | Spectral Changes: Peak Creation/Disappearance Peak Broadening/Narrowing Temporal Changes Recorded UniQuant (v2.54) Concentration Changes: Sensitized/Quasi Elements Detected/Induced; Concentration Change Quantified and Recorded Illustration: See FIG. 6D See Table 4a, 4b, 4c |
| 14-01-11 lower Rad Example 5 | DC | AC | AC 200 Hz Sq 987 Hz Tr 235.5 kHz Si | 1700 KHz Sq | DC | Spectral Changes: Peak Modulation (same centroid) Peak Modulation (varying centroid) Temporal Changes Recorded UniQuant (v2.54) Concentration Changes: Sensitized/Quasi Elements Detected/Induced; Concentration Change Quantified and Recorded Illustration: See FIG. 6E |
| 14-07-03-H21 Example 6 | AC | 200 Hz ± 20% Tr 10.1 Hz ± 20% Si 1.4 KHz ± 20% Sq | 1700 KHz Si | AC | DC | Spectral Changes: Peak Modulation (same centroid) Peak Disappearance/Creation Peak Broadening/Narrowing Temporal Changes Recorded UniQuant (v2.54) Concentration Changes: |

-continued

Figure 6F:
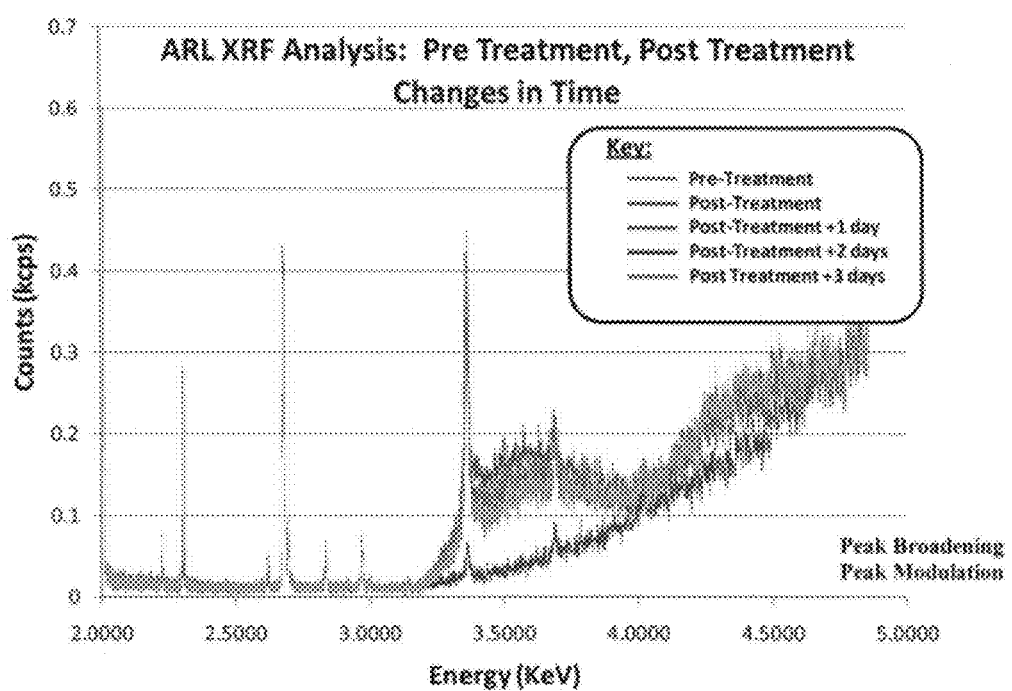
Figure 6G:
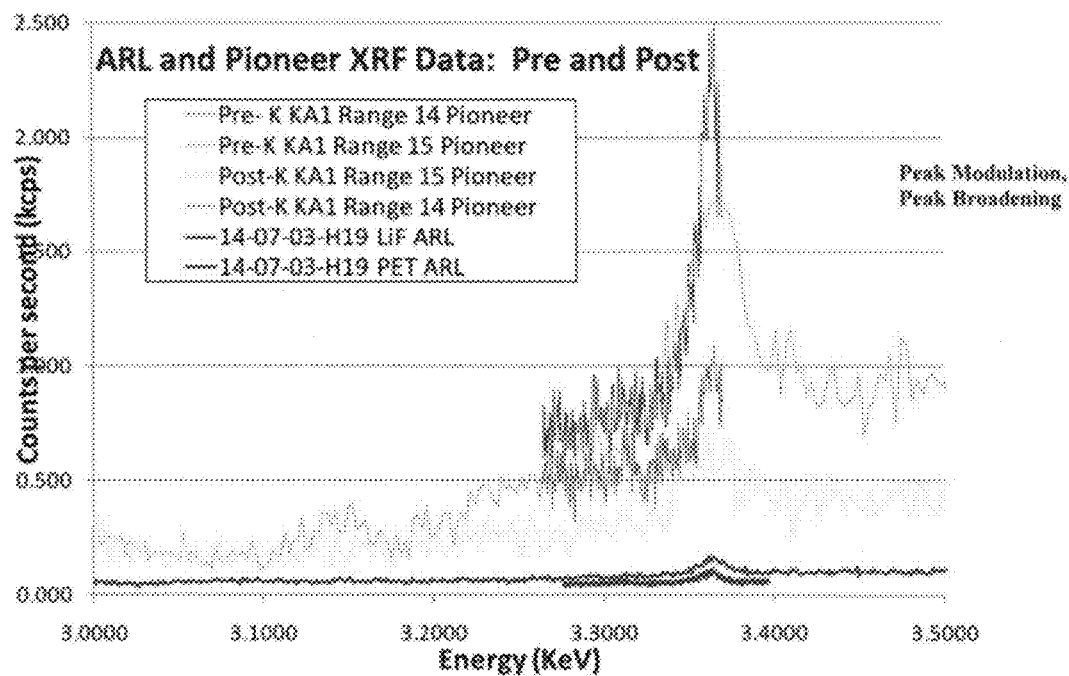
Figure 6H:
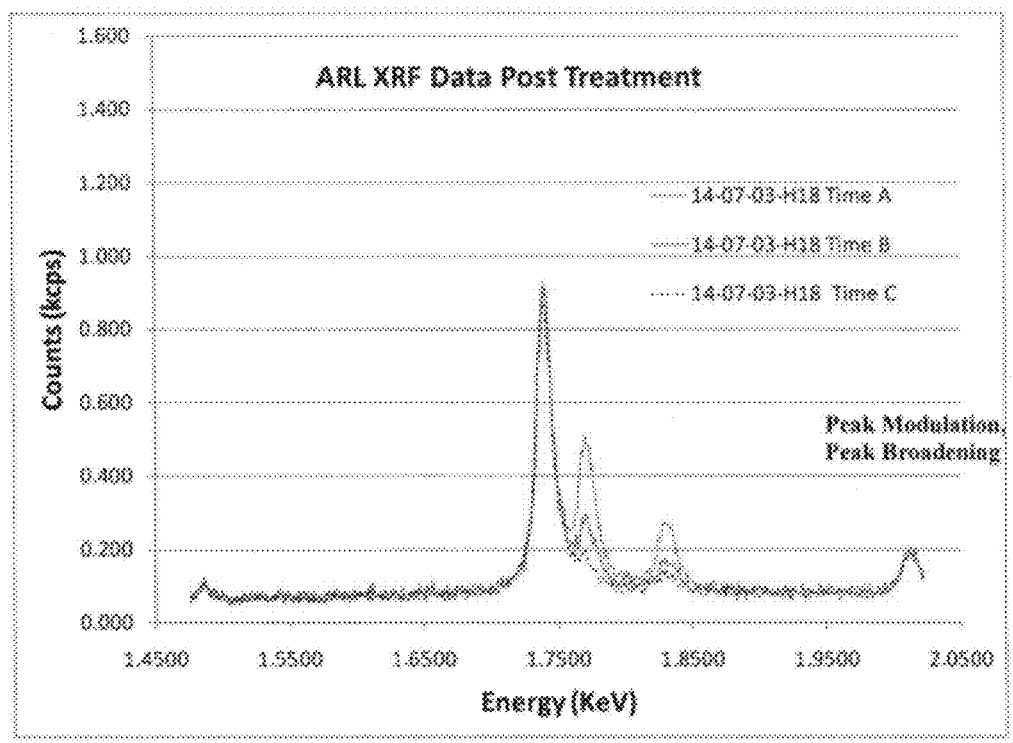

| Coil Operating Patterns | | | | | | |
|---|---|---|---|---|---|---|
| Exptl Protocol | $1^{st}$ ring | $2^{nd}$ ring | $3^{rd}$ ring | $4^{th}$ ring | $5^{th}$ ring | Exptl Results |
| 14-07-03-H19 Example 7 | AC | 200 Hz Tr 10.1 Hz Si 1.4 KHz Sq 557 KHz Sq | DC | AC | DC | No UniQuant analysis performed Illustration: See FIG. 6F Spectral Changes: Peak Modulation (same centroid) Peak Broadening/Narrowing Peak Creation/Disappearance Temporal Changes Recorded Spectra$^{Plus}$ (v1.7) Concentration Changes: Sensitized/Quasi Elements Detected/Induced; Concentration Change Recorded Illustration: See FIG. 6G |
| 14-07-03-H18 Example 8 | AC | 1700 KHz Tr 200 Hz Si 987 KHz Sq 235.5 KHz Sq | DC | AC | DC | Spectral Changes: Peak Modulation (same centroid) Peak Broadening/Narrowing Temporal Changes Recorded Spectra$^{Plus}$ (v1.7) Concentration Changes: Sensitized/Quasi Elements Detected/Induced; Concentration Change Recorded Illustration: See FIG. 6H |

TABLE 1a 14-07-03 H23 Pre vs. Post 0 hr

| | | H23 Pre | | | | | H23 Post | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 11 Na | 0 | 2 | 8 | | 0.001 | 0. | 2 | 1 | 7 | 0.0335 | 0.0075 | 0.0411 |
| 16 S | 0 | 0 | 10 | | 0.001 | 0. | 10 | 0 | 0 | 0.0082 | 0.0082 | 0.0033 |
| 17 Cl | 3 | 0 | 7 | 0.0029 | 0.0016 | 0.0029 | 10 | 0 | 0 | 0.0058 | 0.0058 | 0.0024 |
| 19 K | 10 | 0 | 0 | 0.0088 | 0.0088 | 0.0037 | 0 | 0 | 10 | | 0.001 | 0. |
| 20 Ca | 1 | 8 | 1 | 0.008 | 0.0017 | 0.0066 | 0 | 0 | 10 | | 0.001 | 0. |
| 22 Ti | 10 | 0 | 0 | 0.0144 | 0.0144 | 0.0049 | 10 | 0 | 0 | 0.0158 | 0.0158 | 0.0054 |
| 23 V | 10 | 0 | 0 | 0.0041 | 0.0041 | 0.0022 | 10 | 0 | 0 | 0.0068 | 0.0068 | 0.0027 |
| 26 Fe | 0 | 0 | 10 | | 0.001 | 0. | 5 | 3 | 2 | 0.004 | 0.0025 | 0.0053 |
| 29 Cu | 10 | 0 | 0 | 99.862 | 99.862 | 0.0936 | 10 | 0 | 0 | 99.761 | 99.761 | 0.0741 |
| 31 Ga | 4 | 5 | 1 | 0.009 | 0.0042 | 0.0126 | 3 | 6 | 1 | 0.01 | 0.0037 | 0.0136 |
| 38 Sr | 0 | 0 | 10 | | 0.001 | 0. | 1 | 2 | 7 | 0.003 | 0.0012 | 0.0019 |
| 42 Mo | 1 | 4 | 5 | 0.006 | 0.0015 | 0.0047 | 0 | 4 | 6 | | 0.001 | 0. |
| 45 Rh | 1 | 2 | 7 | 0.009 | 0.0018 | 0.0076 | 0 | 1 | 9 | | 0.001 | 0. |
| 47 Ag | 0 | 4 | 6 | | 0.001 | 0. | 3 | 4 | 3 | 0.004 | 0.0019 | 0.0043 |
| 48 Cd | 1 | 4 | 5 | 0.005 | 0.0014 | 0.0038 | 2 | 5 | 3 | 0.006 | 0.002 | 0.0065 |
| 55 Cs | 0 | 2 | 8 | | 0.001 | 0. | 3 | 2 | 5 | 0.007 | 0.0028 | 0.009 |
| 56 Ba | 0 | 7 | 3 | | 0.001 | 0. | 4 | 3 | 3 | 0.008 | 0.0038 | 0.0111 |
| 57 La | 4 | 6 | 0 | 0.0258 | 0.0109 | 0.0386 | 10 | 0 | 0 | 0.1057 | 0.1057 | 0.024 |
| 59 Pr | 6 | 1 | 3 | 0.0057 | 0.0038 | 0.0073 | 7 | 3 | 0 | 0.0079 | 0.0058 | 0.0107 |
| 62 Sm | 10 | 0 | 0 | 0.0288 | 0.0288 | 0.0068 | 10 | 0 | 0 | 0.0235 | 0.0235 | 0.0128 |
| 65 Tb | 10 | 0 | 0 | 0.0109 | 0.0109 | 0.0064 | 10 | 0 | 0 | 0.02 | 0.02 | 0.0053 |
| 68 Er | 9 | 1 | 0 | 0.0122 | 0.0111 | 0.0124 | 0 | 0 | 10 | | 0.001 | 0. |
| 75 Re | 1 | 5 | 4 | 0.018 | 0.0027 | 0.0161 | 0 | 6 | 4 | | 0.001 | 0. |
| 77 Ir | 5 | 5 | 0 | 0.0316 | 0.0163 | 0.0557 | 8 | 2 | 0 | 0.0276 | 0.0223 | 0.0365 |
| 78 Pt | 2 | 6 | 2 | 0.021 | 0.005 | 0.0257 | 1 | 4 | 5 | 0.018 | 0.0027 | 0.0161 |
| 90 Th | 2 | 3 | 5 | 0.008 | 0.0024 | 0.009 | 0 | 5 | 5 | | 0.001 | 0. |

TABLE 1b 14-07-03 H23 Pre vs. Post 96 hr

| | | H23 Pre | | | | | | H23 Post 96 hr | | | | |
|---|---|---|---|---|---|---|---|---|---|---|---|---|
| Z | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
| 16 S | 0 | 0 | 10 | | 0.001 | 0. | 10 | 0 | 0 | 0.0164 | 0.0164 | 0.0025 |
| 17 Cl | 3 | 0 | 7 | 0.0029 | 0.0016 | 0.0029 | 10 | 0 | 0 | 0.0106 | 0.0106 | 0.0033 |
| 19 K | 10 | 0 | 0 | 0.0088 | 0.0088 | 0.0037 | 0 | 0 | 10 | | 0.001 | 0. |
| 20 Ca | 1 | 8 | 1 | 0.008 | 0.0017 | 0.0066 | 0 | 0 | 10 | | 0.001 | 0. |
| 21 Sc | 0 | 0 | 10 | | 0.001 | 0. | 9 | 0 | 1 | 0.0037 | 0.0034 | 0.0032 |
| 22 Ti | 10 | 0 | 0 | 0.0144 | 0.0144 | 0.0049 | 0 | 0 | 10 | | 0.001 | 0. |
| 23 V | 10 | 0 | 0 | 0.0041 | 0.0041 | 0.0022 | 10 | 0 | 0 | 0.0082 | 0.0082 | 0.0016 |
| 29 Cu | 10 | 0 | 0 | 99.862 | 99.862 | 0.0936 | 10 | 0 | 0 | 99.88 | 99.88 | 0.086 |
| 31 Ga | 4 | 5 | 1 | 0.009 | 0.0042 | 0.0126 | 3 | 5 | 2 | 0.007 | 0.0028 | 0.0087 |
| 34 Se | 0 | 0 | 10 | | 0.001 | 0. | 2 | 0 | 8 | 0.004 | 0.0016 | 0.0038 |
| 42 Mo | 1 | 4 | 5 | 0.006 | 0.0015 | 0.0047 | 3 | 0 | 7 | 0.007 | 0.0028 | 0.009 |
| 45 Rh | 1 | 2 | 7 | 0.009 | 0.0018 | 0.0076 | 1 | 3 | 6 | 0.012 | 0.0021 | 0.0104 |
| 47 Ag | 0 | 4 | 6 | | 0.001 | 0. | 3 | 3 | 4 | 0.0043 | 0.002 | 0.0049 |
| 48 Cd | 1 | 4 | 5 | 0.005 | 0.0014 | 0.0038 | 3 | 3 | 4 | 0.0057 | 0.0024 | 0.007 |
| 52 Te | 0 | 2 | 8 | | 0.001 | 0. | 1 | 3 | 6 | 0.004 | 0.0013 | 0.0028 |
| 56 Ba | 0 | 7 | 3 | | 0.001 | 0. | 1 | 8 | 1 | 0.007 | 0.0016 | 0.0057 |
| 57 La | 4 | 6 | 0 | 0.0258 | 0.0109 | 0.0386 | 9 | 1 | 0 | 0.0271 | 0.0245 | 0.0283 |
| 59 Pr | 6 | 1 | 3 | 0.0057 | 0.0038 | 0.0073 | 8 | 2 | 0 | 0.0094 | 0.0077 | 0.0124 |
| 62 Sm | 10 | 0 | 0 | 0.0288 | 0.0288 | 0.0068 | 0 | 4 | 6 | | 0.001 | 0. |
| 65 Tb | 10 | 0 | 0 | 0.0109 | 0.0109 | 0.0064 | 1 | 4 | 5 | 0.004 | 0.0013 | 0.0028 |
| 68 Er | 9 | 1 | 0 | 0.0122 | 0.0111 | 0.0124 | 9 | 0 | 1 | 0.0243 | 0.022 | 0.0257 |
| 69 Tm | 0 | 2 | 8 | | 0.001 | 0. | 1 | 2 | 7 | 0.008 | 0.0017 | 0.0066 |
| 75 Re | 1 | 5 | 4 | 0.018 | 0.0027 | 0.0161 | 1 | 3 | 6 | 0.017 | 0.0026 | 0.0152 |
| 76 Os | 0 | 3 | 7 | | 0.001 | 0. | 1 | 1 | 8 | 0.024 | 0.0033 | 0.0218 |
| 77 Ir | 5 | 5 | 0 | 0.0316 | 0.0163 | 0.0557 | 4 | 5 | 1 | 0.0233 | 0.0099 | 0.0354 |
| 78 Pt | 2 | 6 | 2 | 0.021 | 0.005 | 0.0257 | 0 | 4 | 6 | | 0.001 | 0. |
| 90 Th | 2 | 3 | 5 | 0.008 | 0.0024 | 0.009 | 0 | 4 | 6 | | 0.001 | 0. |

TABLE 1c 14-07-03 H23 Post 0 hours vs. Post 96 hr

| | | H23 Post | | | | | | H23 Post 96 hr | | | | |
|---|---|---|---|---|---|---|---|---|---|---|---|---|
| Z | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
| 11 Na | 2 | 1 | 7 | 0.0335 | 0.0075 | 0.0411 | 0 | 0 | 10 | | 0.001 | 0. |
| 16 S | 10 | 0 | 0 | 0.0082 | 0.0082 | 0.0033 | 10 | 0 | 0 | 0.0164 | 0.0164 | 0.0025 |
| 17 Cl | 10 | 0 | 0 | 0.0058 | 0.0058 | 0.0024 | 10 | 0 | 0 | 0.0106 | 0.0106 | 0.0033 |
| 21 Sc | 0 | 2 | 8 | | 0.001 | 0. | 9 | 0 | 1 | 0.0037 | 0.0034 | 0.0032 |
| 22 Ti | 10 | 0 | 0 | 0.0158 | 0.0158 | 0.0054 | 0 | 0 | 10 | | 0.001 | 0. |
| 23 V | 10 | 0 | 0 | 0.0068 | 0.0068 | 0.0027 | 10 | 0 | 0 | 0.0082 | 0.0082 | 0.0016 |
| 26 Fe | 5 | 3 | 2 | 0.004 | 0.0025 | 0.0053 | 0 | 0 | 10 | | 0.001 | 0. |
| 29 Cu | 10 | 0 | 0 | 99.761 | 99.761 | 0.0741 | 10 | 0 | 0 | 99.88 | 99.88 | 0.086 |
| 31 Ga | 3 | 6 | 1 | 0.01 | 0.0037 | 0.0136 | 3 | 5 | 2 | 0.007 | 0.0028 | 0.0087 |
| 34 Se | 0 | 0 | 10 | | 0.001 | 0. | 2 | 0 | 8 | 0.004 | 0.0016 | 0.0038 |
| 38 Sr | 1 | 2 | 7 | 0.003 | 0.0012 | 0.0019 | 0 | 1 | 9 | | 0.001 | 0. |
| 42 Mo | 0 | 4 | 6 | | 0.001 | 0. | 3 | 0 | 7 | 0.007 | 0.0028 | 0.009 |
| 45 Rh | 0 | 1 | 9 | | 0.001 | 0. | 1 | 3 | 6 | 0.012 | 0.0021 | 0.0104 |
| 47 Ag | 3 | 4 | 3 | 0.004 | 0.0019 | 0.0043 | 3 | 3 | 4 | 0.0043 | 0.002 | 0.0049 |
| 48 Cd | 2 | 5 | 3 | 0.006 | 0.002 | 0.0065 | 3 | 3 | 4 | 0.0057 | 0.0024 | 0.007 |
| 52 Te | 0 | 3 | 7 | | 0.001 | 0. | 1 | 3 | 6 | 0.004 | 0.0013 | 0.0028 |
| 55 Cs | 3 | 2 | 5 | 0.007 | 0.0028 | 0.009 | 0 | 5 | 5 | | 0.001 | 0. |
| 56 Ba | 4 | 3 | 3 | 0.008 | 0.0038 | 0.0111 | 1 | 8 | 1 | 0.007 | 0.0016 | 0.0057 |
| 57 La | 10 | 0 | 0 | 0.1057 | 0.1057 | 0.024 | 9 | 1 | 0 | 0.0271 | 0.0245 | 0.0283 |
| 59 Pr | 7 | 3 | 0 | 0.0079 | 0.0058 | 0.0107 | 8 | 2 | 0 | 0.0094 | 0.0077 | 0.0124 |
| 62 Sm | 10 | 0 | 0 | 0.0235 | 0.0235 | 0.0128 | 0 | 4 | 6 | | 0.001 | 0. |
| 65 Tb | 10 | 0 | 0 | 0.02 | 0.02 | 0.0053 | 1 | 4 | 5 | 0.004 | 0.0013 | 0.0028 |
| 68 Er | 0 | 0 | 10 | | 0.001 | 0. | 9 | 0 | 1 | 0.0243 | 0.022 | 0.0257 |
| 69 Tm | 0 | 0 | 10 | | 0.001 | 0. | 1 | 2 | 7 | 0.008 | 0.0017 | 0.0066 |
| 75 Re | 0 | 6 | 4 | | 0.001 | 0. | 1 | 3 | 6 | 0.017 | 0.0026 | 0.0152 |
| 76 Os | 0 | 7 | 3 | | 0.001 | 0. | 1 | 1 | 8 | 0.024 | 0.0033 | 0.0218 |
| 77 Ir | 8 | 2 | 0 | 0.0276 | 0.0223 | 0.0365 | 4 | 5 | 1 | 0.0233 | 0.0099 | 0.0354 |
| 78 Pt | 1 | 4 | 5 | 0.018 | 0.0027 | 0.0161 | 0 | 4 | 6 | | 0.001 | 0. |

NIST Standard C1122 Beryllium Copper Pre vs. Post

TABLE 1c-continued

| | | NIST Pre | | | | | NIST Post | | | | |
|---|---|---|---|---|---|---|---|---|---|---|---|
| Z | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
|---|---|---|---|---|---|---|---|---|---|---|---|---|
| 11 Na | 10 | 0 | 0 | 0.1077 | 0.1077 | 0.0509 | 10 | 0 | 0 | 0.1103 | 0.1103 | 0.0744 |
| 12 Mg | 10 | 0 | 0 | 0.0728 | 0.0728 | 0.0217 | 10 | 0 | 0 | 0.0788 | 0.0788 | 0.0181 |
| 13 Al | 10 | 0 | 0 | 0.0731 | 0.0731 | 0.0291 | 10 | 0 | 0 | 0.0842 | 0.0842 | 0.0178 |
| 14 Si | 10 | 0 | 0 | 0.438 | 0.438 | 0.0276 | 10 | 0 | 0 | 0.453 | 0.453 | 0.0145 |
| 16 S | 6 | 4 | 0 | 0.0518 | 0.0315 | 0.0788 | 8 | 2 | 0 | 0.055 | 0.0442 | 0.0684 |
| 16 So | 4 | 6 | 0 | 0.0528 | 0.0217 | 0.0802 | 2 | 8 | 0 | 0.0545 | 0.0117 | 0.0677 |
| 17 Cl | 10 | 0 | 0 | 0.0855 | 0.0855 | 0.0084 | 10 | 0 | 0 | 0.0912 | 0.0912 | 0.0077 |
| 19 K | 10 | 0 | 0 | 0.01 | 0.01 | 0.0039 | 10 | 0 | 0 | 0.0102 | 0.0102 | 0.0037 |
| 20 Ca | 10 | 0 | 0 | 0.0117 | 0.0117 | 0.0032 | 10 | 0 | 0 | 0.0094 | 0.0094 | 0.0059 |
| 21 Sc | 2 | 4 | 4 | 0.003 | 0.0014 | 0.0025 | 0 | 0 | 10 | | 0.001 | 0. |
| 22 Ti | 1 | 6 | 3 | 0.004 | 0.0013 | 0.0028 | 4 | 1 | 5 | 0.0048 | 0.0025 | 0.0059 |
| 23 V | 0 | 0 | 10 | | 0.001 | 0. | 0 | 0 | 10 | | 0.001 | 0. |
| 24 Cr | 7 | 0 | 3 | 0.0026 | 0.0021 | 0.0026 | 10 | 0 | 0 | 0.0028 | 0.0028 | 0.0014 |
| 25 Mn | 10 | 0 | 0 | 0.0082 | 0.0082 | 0.0026 | 10 | 0 | 0 | 0.0073 | 0.0073 | 0.0027 |
| 26 Fe | 10 | 0 | 0 | 0.17 | 0.17 | 0. | 10 | 0 | 0 | 0.17 | 0.17 | 0. |
| 27 Co | 10 | 0 | 0 | 0.21 | 0.21 | 0. | 10 | 0 | 0 | 0.222 | 0.222 | 0.0126 |
| 29 Cu | 10 | 0 | 0 | 98.383 | 98.383 | 0.1077 | 10 | 0 | 0 | 98.346 | 98.346 | 0.1365 |
| 31 Ga | 3 | 3 | 4 | 0.008 | 0.0031 | 0.0105 | 1 | 7 | 2 | 0.01 | 0.0019 | 0.0085 |
| 34 Se | 1 | 0 | 9 | 0.004 | 0.0013 | 0.0028 | 0 | 1 | 9 | | 0.001 | 0. |
| 42 Mo | 3 | 1 | 6 | 0.0063 | 0.0026 | 0.0078 | 0 | 1 | 9 | | 0.001 | 0. |
| 45 Rh | 1 | 3 | 6 | 0.009 | 0.0018 | 0.0076 | 1 | 1 | 8 | 0.009 | 0.0018 | 0.0076 |
| 47 Ag | 10 | 0 | 0 | 0.0081 | 0.0081 | 0.0052 | 10 | 0 | 0 | 0.007 | 0.007 | 0.0058 |
| 48 Cd | 4 | 3 | 3 | 0.0045 | 0.0024 | 0.0055 | 2 | 4 | 4 | 0.005 | 0.0018 | 0.0053 |
| 50 Sn | 10 | 0 | 0 | 0.0072 | 0.0072 | 0.0044 | 10 | 0 | 0 | 0.0067 | 0.0067 | 0.0049 |
| 59 Pr | 8 | 1 | 1 | 0.008 | 0.0066 | 0.0104 | 9 | 1 | 0 | 0.0096 | 0.0087 | 0.0105 |
| 68 Er | 10 | 0 | 0 | 0.182 | 0.182 | 0.019 | 10 | 0 | 0 | 0.178 | 0.178 | 0.0237 |
| 69 Tm | 1 | 3 | 6 | 0.009 | 0.0018 | 0.0076 | 0 | 4 | 6 | | 0.001 | 0. |
| 71 Lu | 10 | 0 | 0 | 0.141 | 0.141 | 0.0263 | 10 | 0 | 0 | 0.131 | 0.131 | 0.0263 |
| 75 Re | 1 | 5 | 4 | 0.017 | 0.0026 | 0.0152 | 0 | 7 | 3 | | 0.001 | 0. |
| 77 Ir | 6 | 4 | 0 | 0.0232 | 0.0143 | 0.0351 | 7 | 3 | 0 | 0.0233 | 0.0166 | 0.0325 |
| 82 Pb | 1 | 5 | 4 | 0.008 | 0.0017 | 0.0066 | 1 | 5 | 4 | 0.008 | 0.0017 | 0.0066 |
| 90 Th | 0 | 2 | 8 | | 0.001 | 0. | 1 | 2 | 7 | 0.007 | 0.0016 | 0.0057 |

NIST Standard C1122 Beryllium Copper Pre vs. Post 96 hour

| | | NIST Pre | | | | | NIST Post 96 hr | | | | |
|---|---|---|---|---|---|---|---|---|---|---|---|
| Z | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
|---|---|---|---|---|---|---|---|---|---|---|---|---|
| 11 Na | 10 | 0 | 0 | 0.1077 | 0.1077 | 0.0509 | 10 | 0 | 0 | 0.0925 | 0.0925 | 0.056 |
| 12 Mg | 10 | 0 | 0 | 0.0728 | 0.0728 | 0.0217 | 10 | 0 | 0 | 0.0743 | 0.0743 | 0.0236 |
| 13 Al | 10 | 0 | 0 | 0.0731 | 0.0731 | 0.0291 | 10 | 0 | 0 | 0.064 | 0.064 | 0.034 |
| 14 Si | 10 | 0 | 0 | 0.438 | 0.438 | 0.0276 | 10 | 0 | 0 | 0.428 | 0.428 | 0.0237 |
| 16 S | 6 | 4 | 0 | 0.0518 | 0.0315 | 0.0788 | 9 | 1 | 0 | 0.0578 | 0.0521 | 0.054 |
| 16 So | 4 | 6 | 0 | 0.0528 | 0.0217 | 0.0802 | 1 | 9 | 0 | 0.058 | 0.0067 | 0.0541 |
| 17 Cl | 10 | 0 | 0 | 0.0855 | 0.0855 | 0.0084 | 10 | 0 | 0 | 0.0882 | 0.0882 | 0.0669 |
| 19 K | 10 | 0 | 0 | 0.01 | 0.01 | 0.0039 | 10 | 0 | 0 | 0.0105 | 0.0105 | 0.0062 |
| 20 Ca | 10 | 0 | 0 | 0.0117 | 0.0117 | 0.0032 | 10 | 0 | 0 | 0.0117 | 0.0117 | 0.0032 |
| 21 Sc | 2 | 4 | 4 | 0.003 | 0.0014 | 0.0025 | 0 | 0 | 10 | | 0.001 | 0. |
| 22 Ti | 1 | 6 | 3 | 0.004 | 0.0013 | 0.0028 | 8 | 0 | 2 | 0.004 | 0.004 | 0.0051 |
| 24 Cr | 7 | 0 | 3 | 0.0026 | 0.0021 | 0.0026 | 7 | 0 | 3 | 0.0023 | 0.0019 | 0.0019 |
| 25 Mn | 10 | 0 | 0 | 0.0082 | 0.0082 | 0.0026 | 10 | 0 | 0 | 0.0076 | 0.0076 | 0.0031 |
| 26 Fe | 10 | 0 | 0 | 0.17 | 0.17 | 0. | 10 | 0 | 0 | 0.169 | 0.169 | 0.0095 |
| 27 Co | 10 | 0 | 0 | 0.21 | 0.21 | 0. | 10 | 0 | 0 | 0.209 | 0.209 | 0.0095 |
| 29 Cu | 10 | 0 | 0 | 98.383 | 98.383 | 0.1077 | 10 | 0 | 0 | 98.455 | 98.455 | 0.1471 |
| 31 Ga | 3 | 3 | 4 | 0.008 | 0.0031 | 0.0105 | 4 | 3 | 3 | 0.0083 | 0.0039 | 0.0118 |
| 33 As | 0 | 3 | 7 | | 0.001 | 0. | 1 | 2 | 7 | 0.018 | 0.0027 | 0.0161 |
| 34 Se | 1 | 0 | 9 | 0.004 | 0.0013 | 0.0028 | 0 | 0 | 10 | | 0.001 | 0. |
| 42 Mo | 3 | 1 | 6 | 0.0063 | 0.0026 | 0.0078 | 2 | 0 | 8 | 0.0065 | 0.0021 | 0.007 |
| 45 Rh | 1 | 3 | 6 | 0.009 | 0.0018 | 0.0076 | 1 | 2 | 7 | 0.012 | 0.0021 | 0.0104 |
| 47 Ag | 10 | 0 | 0 | 0.0081 | 0.0081 | 0.0052 | 9 | 1 | 0 | 0.0068 | 0.0062 | 0.0068 |
| 48 Cd | 4 | 3 | 3 | 0.0045 | 0.0024 | 0.0055 | 4 | 5 | 1 | 0.0048 | 0.0025 | 0.006 |
| 50 Sn | 10 | 0 | 0 | 0.0072 | 0.0072 | 0.0044 | 10 | 0 | 0 | 0.0076 | 0.0076 | 0.0075 |
| 55 Cs | 0 | 7 | 3 | | 0.001 | 0. | 2 | 2 | 6 | 0.006 | 0.002 | 0.0063 |
| 56 Ba | 0 | 5 | 5 | | 0.001 | 0. | 1 | 5 | 4 | 0.008 | 0.0017 | 0.0066 |
| 59 Pr | 8 | 1 | 1 | 0.008 | 0.0066 | 0.0104 | 9 | 1 | 0 | 0.0092 | 0.0084 | 0.0092 |
| 68 Er | 10 | 0 | 0 | 0.182 | 0.182 | 0.019 | 10 | 0 | 0 | 0.157 | 0.157 | 0.0145 |
| 69 Tm | 1 | 3 | 6 | 0.009 | 0.0018 | 0.0076 | 0 | 0 | 10 | | 0.001 | 0. |
| 71 Lu | 10 | 0 | 0 | 0.141 | 0.141 | 0.0263 | 10 | 0 | 0 | 0.115 | 0.115 | 0.0255 |
| 75 Re | 1 | 5 | 4 | 0.017 | 0.0026 | 0.0152 | 1 | 4 | 5 | 0.02 | 0.0029 | 0.018 |
| 77 Ir | 6 | 4 | 0 | 0.0232 | 0.0143 | 0.0351 | 5 | 5 | 0 | 0.027 | 0.014 | 0.0425 |
| 78 Pt | 0 | 7 | 3 | | 0.001 | 0. | 1 | 2 | 7 | 0.029 | 0.0038 | 0.0266 |

TABLE 1c-continued

| Z | | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
|---|---|---|---|---|---|---|---|---|---|---|---|---|---|
| 79 | Au | 0 | 4 | 6 | | 0.001 | 0. | 1 | 2 | 7 | 0.015 | 0.0024 | 0.0133 |
| 81 | Tl | 0 | 1 | 9 | | 0.001 | 0. | 1 | 4 | 5 | 0.012 | 0.0021 | 0.0104 |
| 82 | Pb | 1 | 5 | 4 | 0.008 | 0.0017 | 0.0066 | 1 | 7 | 2 | 0.007 | 0.0016 | 0.0057 |

NIST Standard C1122 Beryllium Copper Post vs. Post 96 hours

| | | NIST Post | | | | | | NIST Post 96 hr | | | | | |
|---|---|---|---|---|---|---|---|---|---|---|---|---|---|
| Z | | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
| 11 | Na | 10 | 0 | 0 | 0.1103 | 0.1103 | 0.0744 | 10 | 0 | 0 | 0.0925 | 0.0925 | 0.056 |
| 12 | Mg | 10 | 0 | 0 | 0.0788 | 0.0788 | 0.0181 | 10 | 0 | 0 | 0.0743 | 0.0743 | 0.0236 |
| 13 | Al | 10 | 0 | 0 | 0.0842 | 0.0842 | 0.0178 | 10 | 0 | 0 | 0.064 | 0.064 | 0.034 |
| 14 | Si | 10 | 0 | 0 | 0.453 | 0.453 | 0.0145 | 10 | 0 | 0 | 0.428 | 0.428 | 0.0237 |
| 16 | S | 8 | 2 | 0 | 0.055 | 0.0442 | 0.0684 | 9 | 1 | 0 | 0.0578 | 0.0521 | 0.054 |
| 16 | So | 2 | 8 | 0 | 0.0545 | 0.0117 | 0.0677 | 1 | 9 | 0 | 0.058 | 0.0067 | 0.0541 |
| 17 | Cl | 10 | 0 | 0 | 0.0912 | 0.0912 | 0.0077 | 10 | 0 | 0 | 0.0882 | 0.0882 | 0.0069 |
| 19 | K | 10 | 0 | 0 | 0.0102 | 0.0102 | 0.0037 | 10 | 0 | 0 | 0.0105 | 0.0105 | 0.0062 |
| 20 | Ca | 10 | 0 | 0 | 0.0094 | 0.0094 | 0.0059 | 10 | 0 | 0 | 0.0117 | 0.0117 | 0.0032 |
| 22 | Ti | 4 | 1 | 5 | 0.0048 | 0.0025 | 0.0059 | 8 | 0 | 2 | 0.0048 | 0.004 | 0.0051 |
| 24 | Cr | 10 | 0 | 0 | 0.0028 | 0.0028 | 0.0014 | 7 | 0 | 3 | 0.0023 | 0.0019 | 0.0019 |
| 25 | Mn | 10 | 0 | 0 | 0.0073 | 0.0073 | 0.0027 | 10 | 0 | 0 | 0.0076 | 0.0076 | 0.0031 |
| 26 | Fe | 10 | 0 | 0 | 0.17 | 0.17 | 0. | 10 | 0 | 0 | 0.169 | 0.169 | 0.0095 |
| 27 | Co | 10 | 0 | 0 | 0.222 | 0.222 | 0.0126 | 10 | 0 | 0 | 0.209 | 0.209 | 0.0095 |
| 29 | Cu | 10 | 0 | 0 | 98.346 | 98.346 | 0.1365 | 10 | 0 | 0 | 98.455 | 98.455 | 0.1471 |
| 31 | Ga | 1 | 7 | 2 | 0.01 | 0.0019 | 0.0085 | 4 | 3 | 3 | 0.0083 | 0.0039 | 0.0118 |
| 33 | As | 0 | 2 | 8 | | 0.001 | 0. | 1 | 2 | 7 | 0.018 | 0.0027 | 0.0161 |
| 42 | Mo | 0 | 1 | 9 | | 0.001 | 0. | 2 | 0 | 8 | 0.0065 | 0.0021 | 0.007 |
| 45 | Rh | 1 | 1 | 8 | 0.009 | 0.0018 | 0.0076 | 1 | 2 | 7 | 0.012 | 0.0021 | 0.0104 |
| 47 | Ag | 10 | 0 | 0 | 0.007 | 0.007 | 0.0058 | 9 | 1 | 0 | 0.0068 | 0.0062 | 0.0068 |
| 48 | Cd | 2 | 4 | 4 | 0.005 | 0.0018 | 0.0053 | 4 | 5 | 1 | 0.0048 | 0.0025 | 0.006 |
| 50 | Sn | 10 | 0 | 0 | 0.0067 | 0.0067 | 0.0049 | 10 | 0 | 0 | 0.0076 | 0.0076 | 0.0075 |
| 55 | Cs | 0 | 4 | 6 | | 0.001 | 0. | 2 | 2 | 6 | 0.006 | 0.002 | 0.0063 |
| 56 | Ba | 0 | 5 | 5 | | 0.001 | 0. | 1 | 5 | 4 | 0.008 | 0.0017 | 0.0066 |
| 59 | Pr | 9 | 1 | 0 | 0.0096 | 0.0087 | 0.0105 | 9 | 1 | 0 | 0.0092 | 0.0084 | 0.0092 |
| 68 | Er | 10 | 0 | 0 | 0.178 | 0.178 | 0.0237 | 10 | 0 | 0 | 0.157 | 0.157 | 0.0145 |
| 71 | Lu | 10 | 0 | 0 | 0.131 | 0.131 | 0.0263 | 10 | 0 | 0 | 0.115 | 0.115 | 0.0255 |
| 75 | Re | 0 | 7 | 3 | | 0.001 | 0. | 1 | 4 | 5 | 0.02 | 0.0029 | 0.018 |
| 77 | Ir | 7 | 3 | 0 | 0.0233 | 0.0166 | 0.0325 | 5 | 5 | 0 | 0.027 | 0.014 | 0.0425 |
| 78 | Pt | 0 | 5 | 5 | | 0.001 | 0. | 1 | 2 | 7 | 0.029 | 0.0038 | 0.0266 |
| 79 | Au | 0 | 4 | 6 | | 0.001 | 0. | 1 | 2 | 7 | 0.015 | 0.0024 | 0.0133 |
| 80 | Hg | 0 | 6 | 4 | | 0.001 | 0. | 0 | 4 | 6 | | 0.001 | 0. |
| 81 | Tl | 0 | 3 | 7 | | 0.001 | 0. | 1 | 4 | 5 | 0.012 | 0.0021 | 0.0104 |
| 82 | Pb | 1 | 5 | 4 | 0.008 | 0.0017 | 0.0066 | 1 | 7 | 2 | 0.007 | 0.0016 | 0.0057 |
| 90 | Th | 1 | 2 | 7 | 0.007 | 0.0016 | 0.0057 | 0 | 3 | 7 | | 0.001 | 0. |

TABLE 2a 14-05-09 Pre-Post

| | | Pre | | | | | | Post | | | | | |
|---|---|---|---|---|---|---|---|---|---|---|---|---|---|
| Z | | Hits | <2e | < | Average of Hits | Average of All at LDL/2 | 3X Standard Dev with Non His at LDL/2 | Hits | <2e | < | Average of Hits | Average of All at LDL/2 | 3X Standard Dev with Non Hits at LDL/2 |
| 12 | Mg | 4 | 6 | 0 | 0.0125 | 0.0056 | 0.0181 | 8 | 2 | 0 | 0.0123 | 0.01 | 0.0148 |
| 13 | Al | 10 | 0 | 0 | 99.612 | 99.612 | 0.031 | 10 | 0 | 0 | 99.582 | 99.582 | 0.0276 |
| 14 | Si | 10 | 0 | 0 | 0.268 | 0.268 | 0.019 | 10 | 0 | 0 | 0.278 | 0.278 | 0.0237 |
| 16 | S | 0 | 0 | 10 | #DIV/0! | 0.001 | 0. | 4 | 0 | 6 | 0.0023 | 0.0015 | 0.002 |
| 20 | Ca | 9 | 1 | 0 | 0.0059 | 0.0054 | 0.0057 | 0 | 0 | 10 | #DIV/0! | 0.001 | 0. |
| 22 | Ti | 1 | 0 | 9 | 0.0023 | 0.0011 | 0.0012 | 3 | 0 | 7 | 0.0024 | 0.0014 | 0.0021 |
| 23 | V | 0 | 0 | 10 | #DIV/0! | 0.001 | 0. | 2 | 0 | 8 | 0.0022 | 0.0012 | 0.0015 |
| 26 | Fe | 10 | 0 | 0 | 0.0033 | 0.0033 | 0.0023 | 10 | 0 | 0 | 0.0046 | 0.0046 | 0.0017 |
| 27 | Co | 0 | 0 | 10 | #DIV/0! | 0.001 | 0. | 10 | 0 | 0 | 0.0051 | 0.0051 | 0.0022 |
| 28 | Ni | 10 | 0 | 0 | 0.0039 | 0.0039 | 0.0026 | 9 | 0 | 1 | 0.0034 | 0.0032 | 0.0025 |
| 29 | Cu | 10 | 0 | 0 | 0.0537 | 0.0537 | 0.004 | 10 | 0 | 0 | 0.0457 | 0.0457 | 0.0071 |
| 30 | Zn | 10 | 0 | 0 | 0.0096 | 0.0096 | 0.0034 | 10 | 0 | 0 | 0.005 | 0.005 | 0.0035 |
| 40 | Zr | 1 | 0 | 9 | 0.002 | 0.0011 | 0.0009 | 0 | 0 | 10 | #DIV/0! | 0.001 | 0. |
| 46 | Pd | 2 | 0 | 8 | 0.0024 | 0.0013 | 0.0018 | 3 | 0 | 7 | 0.0026 | 0.0015 | 0.0024 |
| 47 | Ag | 4 | 0 | 6 | 0.0027 | 0.0017 | 0.0027 | 2 | 0 | 8 | 0.0029 | 0.0014 | 0.0025 |
| 48 | Cd | 1 | 0 | 9 | 0.0023 | 0.0011 | 0.0012 | 0 | 0 | 10 | #DIV/0! | 0.001 | 0. |
| 53 | I | 1 | 3 | 6 | 0.003 | 0.0012 | 0.0019 | 0 | 2 | 8 | #DIV/0! | 0.001 | 0. |
| 55 | Cs | 8 | 2 | 0 | 0.0065 | 0.0054 | 0.0074 | 9 | 1 | 0 | 0.0059 | 0.0054 | 0.0049 |

TABLE 2a-continued 14-05-09 Pre-Post

| | | Pre | | | | | Post | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 56 Ba | 10 | 0 | 0 | 0.0087 | 0.0087 | 0.0047 | 7 | 3 | 0 | 0.0077 | 0.0057 | 0.0101 |
| 58 Ce | 3 | 1 | 6 | 0.0037 | 0.0018 | 0.0039 | 3 | 3 | 4 | 0.0047 | 0.0021 | 0.0054 |
| 59 Pr | 0 | 0 | 10 | #DIV/0! | 0.001 | 0. | 1 | 1 | 8 | 0.004 | 0.0013 | 0.0028 |
| 60 Nd | 0 | 0 | 10 | #DIV/0! | 0.001 | 0. | 3 | 1 | 6 | 0.0033 | 0.0017 | 0.0035 |
| 63 Eu | 4 | 0 | 6 | 0.004 | 0.0022 | 0.0049 | 3 | 4 | 3 | 0.0033 | 0.0017 | 0.0035 |
| 64 Gd | 0 | 2 | 8 | #DIV/0! | 0.001 | 0. | 1 | 0 | 9 | 0.003 | 0.0012 | 0.0019 |
| 67 Ho | 1 | 0 | 9 | 0.003 | 0.0012 | 0.0019 | 1 | 0 | 9 | 0.004 | 0.0013 | 0.0028 |
| 71 Lu | 7 | 0 | 3 | 0.0031 | 0.0025 | 0.0033 | 4 | 0 | 6 | 0.0025 | 0.0016 | 0.0023 |
| 72 Hf | 1 | 0 | 9 | 0.0023 | 0.0011 | 0.0012 | 1 | 0 | 9 | 0.0024 | 0.0011 | 0.0013 |
| 74 W | 9 | 1 | 0 | 0.006 | 0.0055 | 0.0057 | 10 | 0 | 0 | 0.0345 | 0.0345 | 0.0094 |
| 90 Th | 3 | 4 | 3 | 0.0022 | 0.0014 | 0.0018 | 3 | 2 | 5 | 0.0026 | 0.0015 | 0.0024 |

TABLE 2b 14-05-09 Pre-Post 96 hr

| | | Pre | | | | | Post 96 hr | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 12 Mg | 4 | 6 | 0 | 0.0125 | 0.0056 | 0.0181 | 8 | 2 | 0 | 0.0121 | 0.0099 | 0.0142 |
| 13 Al | 10 | 0 | 0 | 99.612 | 99.612 | 0.031 | 10 | 0 | 0 | 99.499 | 99.499 | 0.0263 |
| 14 Si | 10 | 0 | 0 | 0.268 | 0.268 | 0.019 | 10 | 0 | 0 | 0.3 | 0.3 | 0.0141 |
| 16 S | 0 | 0 | 10 | #DIV/0! | 0.001 | 0. | 10 | 0 | 0 | 0.0085 | 0.0085 | 0.0049 |
| 20 Ca | 9 | 1 | 0 | 0.0059 | 0.0054 | 0.0057 | 1 | 0 | 9 | 0.0024 | 0.0011 | 0.0013 |
| 22 Ti | 1 | 0 | 9 | 0.0023 | 0.0011 | 0.0012 | 0 | 0 | 10 | #DIV/0! | 0.001 | 0. |
| 23 V | 0 | 0 | 10 | #DIV/0! | 0.001 | 0. | 10 | 0 | 0 | 0.0028 | 0.0028 | 0.0015 |
| 26 Fe | 10 | 0 | 0 | 0.0033 | 0.0033 | 0.0023 | 10 | 0 | 0 | 0.0044 | 0.0044 | 0.0019 |
| 27 Co | 0 | 0 | 10 | #DIV/0! | 0.001 | 0. | 10 | 0 | 0 | 0.0082 | 0.0082 | 0.0017 |
| 28 Ni | 10 | 0 | 0 | 0.0039 | 0.0039 | 0.0026 | 10 | 0 | 0 | 0.0035 | 0.0035 | 0.0021 |
| 29 Cu | 10 | 0 | 0 | 0.0537 | 0.0537 | 0.004 | 10 | 0 | 0 | 0.0543 | 0.0543 | 0.0028 |
| 30 Zn | 10 | 0 | 0 | 0.0096 | 0.0096 | 0.0034 | 10 | 0 | 0 | 0.0083 | 0.0083 | 0.0036 |
| 40 Zr | 1 | 0 | 9 | 0.002 | 0.0011 | 0.0009 | 0 | 0 | 10 | #DIV/0! | 0.001 | 0. |
| 46 Pd | 2 | 0 | 8 | 0.0024 | 0.0013 | 0.0018 | 1 | 0 | 9 | 0.0027 | 0.0012 | 0.0016 |
| 47 Ag | 4 | 0 | 6 | 0.0027 | 0.0017 | 0.0027 | 3 | 0 | 7 | 0.0026 | 0.0015 | 0.0025 |
| 48 Cd | 1 | 0 | 9 | 0.0023 | 0.0011 | 0.0012 | 0 | 0 | 10 | #DIV/0! | 0.001 | 0. |
| 53 I | 1 | 3 | 6 | 0.003 | 0.0012 | 0.0019 | 0 | 3 | 7 | #DIV/0! | 0.001 | 0. |
| 55 Cs | 8 | 2 | 0 | 0.0065 | 0.0054 | 0.0074 | 5 | 5 | 0 | 0.0066 | 0.0038 | 0.009 |
| 56 Ba | 10 | 0 | 0 | 0.0087 | 0.0087 | 0.0047 | 9 | 1 | 0 | 0.0081 | 0.0074 | 0.0074 |
| 58 Ce | 3 | 1 | 6 | 0.0037 | 0.0018 | 0.0039 | 6 | 4 | 0 | 0.0047 | 0.0032 | 0.006 |
| 60 Nd | 0 | 0 | 10 | #DIV/0! | 0.001 | 0. | 3 | 4 | 3 | 0.0033 | 0.0017 | 0.0035 |
| 63 Eu | 4 | 0 | 6 | 0.004 | 0.0022 | 0.0049 | 9 | 0 | 1 | 0.004 | 0.0037 | 0.0035 |
| 67 Ho | 1 | 0 | 9 | 0.003 | 0.0012 | 0.0019 | 0 | 0 | 10 | #DIV/0! | 0.001 | 0. |
| 71 Lu | 7 | 0 | 3 | 0.0031 | 0.0025 | 0.0033 | 1 | 3 | 6 | 0.002 | 0.0011 | 0.0009 |
| 72 Hf | 1 | 0 | 9 | 0.0023 | 0.0011 | 0.0012 | 1 | 0 | 9 | 0.0024 | 0.0011 | 0.0013 |
| 74 W | 9 | 1 | 0 | 0.006 | 0.0055 | 0.0057 | 10 | 0 | 0 | 0.0724 | 0.0724 | 0.0107 |
| 90 Th | 3 | 4 | 3 | 0.0022 | 0.0014 | 0.0018 | 2 | 4 | 4 | 0.0029 | 0.0014 | 0.0023 |

TABLE 2c 14-05-09 Post-Post 96 hr

| | | Post | | | | | Post 96 hr | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 12 Mg | 8 | 2 | 0 | 0.0123 | 0.01 | 0.0148 | 8 | 2 | 0 | 0.0121 | 0.0099 | 0.0142 |
| 13 Al | 10 | 0 | 0 | 99.582 | 99.582 | 0.0276 | 10 | 0 | 0 | 99.499 | 99.499 | 0.0263 |
| 14 Si | 10 | 0 | 0 | 0.278 | 0.278 | 0.0237 | 10 | 0 | 0 | 0.3 | 0.3 | 0.0141 |

TABLE 2c-continued 14-05-09 Post-Post 96 hr

| | | Post | | | | | Post 96 hr | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
|---|---|---|---|---|---|---|---|---|---|---|---|---|
| 16 S | 4 | 0 | 6 | 0.0023 | 0.0015 | 0.002 | 10 | 0 | 0 | 0.0085 | 0.0085 | 0.0049 |
| 20 Ca | 0 | 0 | 10 | | 0.001 | 0. | 1 | 0 | 9 | 0.0024 | 0.0011 | 0.0013 |
| 22 Ti | 3 | 0 | 7 | 0.0024 | 0.0014 | 0.0021 | 0 | 0 | 10 | | 0.001 | 0. |
| 23 V | 2 | 0 | 8 | 0.0022 | 0.0012 | 0.0015 | 10 | 0 | 0 | 0.0028 | 0.0028 | 0.0015 |
| 26 Fe | 10 | 0 | 0 | 0.0046 | 0.0046 | 0.0017 | 10 | 0 | 0 | 0.0044 | 0.0044 | 0.0019 |
| 27 Co | 10 | 0 | 0 | 0.0051 | 0.0051 | 0.0022 | 10 | 0 | 0 | 0.0082 | 0.0082 | 0.0017 |
| 28 Ni | 9 | 0 | 1 | 0.0034 | 0.0032 | 0.0025 | 10 | 0 | 0 | 0.0035 | 0.0035 | 0.0021 |
| 29 Cu | 10 | 0 | 0 | 0.0457 | 0.0457 | 0.0071 | 10 | 0 | 0 | 0.0543 | 0.0543 | 0.0028 |
| 30 Zn | 10 | 0 | 0 | 0.005 | 0.005 | 0.0035 | 10 | 0 | 0 | 0.0083 | 0.0083 | 0.0036 |
| 46 Pd | 3 | 0 | 7 | 0.0026 | 0.0015 | 0.0024 | 1 | 0 | 9 | 0.0027 | 0.0012 | 0.0016 |
| 47 Ag | 2 | 0 | 8 | 0.0029 | 0.0014 | 0.0025 | 3 | 0 | 7 | 0.0026 | 0.0015 | 0.0025 |
| 55 Cs | 9 | 1 | 0 | 0.0059 | 0.0054 | 0.0049 | 5 | 5 | 0 | 0.0066 | 0.0038 | 0.009 |
| 56 Ba | 7 | 3 | 0 | 0.0077 | 0.0057 | 0.0101 | 9 | 1 | 0 | 0.0081 | 0.0074 | 0.0074 |
| 58 Ce | 3 | 3 | 4 | 0.0047 | 0.0021 | 0.0054 | 6 | 4 | 0 | 0.0047 | 0.0032 | 0.006 |
| 59 Pr | 1 | 1 | 8 | 0.004 | 0.0013 | 0.0028 | 0 | 0 | 10 | | 0.001 | 0. |
| 60 Nd | 3 | 1 | 6 | 0.0033 | 0.0017 | 0.0035 | 3 | 4 | 3 | 0.0033 | 0.0017 | 0.0035 |
| 63 Eu | 3 | 4 | 3 | 0.0033 | 0.0017 | 0.0035 | 9 | 0 | 1 | 0.004 | 0.0037 | 0.0035 |
| 64 Gd | 1 | 0 | 9 | 0.003 | 0.0012 | 0.0019 | 0 | 2 | 8 | | 0.001 | 0. |
| 67 Ho | 1 | 0 | 9 | 0.004 | 0.0013 | 0.0028 | 0 | 0 | 10 | | 0.001 | 0. |
| 71 Lu | 4 | 0 | 6 | 0.0025 | 0.0016 | 0.0023 | 1 | 3 | 6 | 0.002 | 0.0011 | 0.0009 |
| 72 Hf | 1 | 0 | 9 | 0.0024 | 0.0011 | 0.0013 | 1 | 0 | 9 | 0.0024 | 0.0011 | 0.0013 |
| 74 W | 10 | 0 | 0 | 0.0345 | 0.0345 | 0.0094 | 10 | 0 | 0 | 0.0724 | 0.0724 | 0.0107 |
| 90 Th | 3 | 2 | 5 | 0.0026 | 0.0015 | 0.0024 | 2 | 4 | 4 | 0.0029 | 0.0014 | 0.0023 |

TABLE 3a 14-09-07 Pre Post

| | | Pre | | | | | Post | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
|---|---|---|---|---|---|---|---|---|---|---|---|---|
| 12 Mg | 10 | 0 | 0 | 99.857 | 99.857 | 0.0145 | 10 | 0 | 0 | 99.808 | 99.808 | 0.0276 |
| 16 S | 0 | 0 | 10 | | 0.001 | 0. | 10 | 0 | 0 | 0.0106 | 0.0106 | 0.0057 |
| 17 Cl | 3 | 1 | 6 | 0.0043 | 0.002 | 0.0051 | 10 | 0 | 0 | 0.042 | 0.042 | 0.006 |
| 20 Ca | 3 | 0 | 7 | 0.002 | 0.0013 | 0.0014 | 1 | 0 | 9 | 0.002 | 0.0011 | 0.0009 |
| 22 Ti | 9 | 0 | 1 | 0.0027 | 0.0025 | 0.0021 | 7 | 0 | 3 | 0.0033 | 0.0026 | 0.0036 |
| 25 Mn | 10 | 0 | 0 | 0.0048 | 0.0048 | 0.0019 | 10 | 0 | 0 | 0.0051 | 0.0051 | 0.0012 |
| 26 Fe | 10 | 0 | 0 | 0.0038 | 0.0038 | 0.0017 | 10 | 0 | 0 | 0.0048 | 0.0048 | 0.001 |
| 27 Co | 10 | 0 | 0 | 0.0094 | 0.0094 | 0.0015 | 10 | 0 | 0 | 0.011 | 0.011 | 0.003 |
| 28 Ni | 5 | 0 | 5 | 0.0025 | 0.0017 | 0.0025 | 10 | 0 | 0 | 0.0032 | 0.0032 | 0.0018 |
| 29 Cu | 10 | 0 | 0 | 0.0194 | 0.0194 | 0.0032 | 10 | 0 | 0 | 0.018 | 0.018 | 0.0035 |
| 30 Zn | 10 | 0 | 0 | 0.0077 | 0.0077 | 0.0014 | 9 | 0 | 1 | 0.0038 | 0.0035 | 0.0039 |
| 33 As | 1 | 0 | 9 | 0.0024 | 0.0011 | 0.0013 | 0 | 0 | 10 | | 0.001 | 0. |
| 55 Cs | 6 | 4 | 0 | 0.0055 | 0.0037 | 0.0071 | 6 | 3 | 1 | 0.0057 | 0.0038 | 0.0073 |
| 56 Ba | 1 | 7 | 2 | 0.007 | 0.0016 | 0.0057 | 2 | 8 | 0 | 0.007 | 0.0022 | 0.0076 |
| 57 La | 10 | 0 | 0 | 0.0081 | 0.0081 | 0.0057 | 10 | 0 | 0 | 0.0201 | 0.0201 | 0.0164 |
| 58 Ce | 8 | 2 | 0 | 0.0073 | 0.006 | 0.0108 | 1 | 4 | 5 | 0.003 | 0.0012 | 0.0019 |
| 60 Nd | 10 | 0 | 0 | 0.0049 | 0.0049 | 0.003 | 0 | 0 | 10 | | 0.001 | 0. |
| 63 Eu | 1 | 4 | 5 | 0.003 | 0.0012 | 0.0019 | 6 | 0 | 4 | 0.0025 | 0.0019 | 0.0025 |
| 69 Tm | 0 | 0 | 10 | | 0.001 | 0. | 1 | 0 | 9 | 0.0025 | 0.0012 | 0.0014 |
| 70 Yb | 1 | 0 | 9 | 0.0023 | 0.0011 | 0.0012 | 0 | 0 | 10 | | 0.001 | 0. |
| 74 W | 10 | 0 | 0 | 0.0599 | 0.0599 | 0.0033 | 10 | 0 | 0 | 0.0552 | 0.0552 | 0.0069 |
| 82 Pb | 0 | 0 | 10 | | 0.001 | 0. | 1 | 0 | 9 | 0.002 | 0.0011 | 0.0009 |
| 90 Th | 1 | 5 | 4 | 0.003 | 0.0012 | 0.0019 | 3 | 6 | 1 | 0.0034 | 0.0017 | 0.0035 |

TABLE 3b 14-09-07 Pre-Post 96

| | | | | Pre | | | | | | Post 96 | | |
|---|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 12 Mg | 10 | 0 | 0 | 99.857 | 99.857 | 0.0145 | 10 | 0 | 0 | 99.816 | 99.816 | 0.0322 |
| 16 S | 0 | 0 | 10 | | 0.001 | 0. | 10 | 0 | 0 | 0.0291 | 0.0291 | 0.003 |
| 17 Cl | 3 | 1 | 6 | 0.0043 | 0.002 | 0.0051 | 10 | 0 | 0 | 0.0427 | 0.0427 | 0.0079 |
| 20 Ca | 3 | 0 | 7 | 0.002 | 0.0013 | 0.0014 | 0 | 0 | 10 | | 0.001 | 0. |
| 22 Ti | 9 | 0 | 1 | 0.0027 | 0.0025 | 0.0021 | 7 | 0 | 3 | 0.0027 | 0.0022 | 0.0026 |
| 23 V | 0 | 0 | 10 | | 0.001 | 0. | 1 | 0 | 9 | 0.0029 | 0.0012 | 0.0018 |
| 24 Cr | 0 | 0 | 10 | | 0.001 | 0. | 1 | 0 | 9 | 0.0021 | 0.0011 | 0.001 |
| 25 Mn | 10 | 0 | 0 | 0.0048 | 0.0048 | 0.0019 | 10 | 0 | 0 | 0.0044 | 0.0044 | 0.0015 |
| 26 Fe | 10 | 0 | 0 | 0.0038 | 0.0038 | 0.0017 | 10 | 0 | 0 | 0.0041 | 0.0041 | 0.002 |
| 27 Co | 10 | 0 | 0 | 0.0094 | 0.0094 | 0.0015 | 10 | 0 | 0 | 0.003 | 0.003 | 0.0018 |
| 28 Ni | 5 | 0 | 5 | 0.0025 | 0.0017 | 0.0025 | 10 | 0 | 0 | 0.0038 | 0.0038 | 0.0015 |
| 29 Cu | 10 | 0 | 0 | 0.0194 | 0.0194 | 0.0032 | 10 | 0 | 0 | 0.0187 | 0.0187 | 0.0038 |
| 30 Zn | 10 | 0 | 0 | 0.0077 | 0.0077 | 0.0014 | 10 | 0 | 0 | 0.0046 | 0.0046 | 0.0026 |
| 33 As | 1 | 0 | 9 | 0.0024 | 0.0011 | 0.0013 | 0 | 0 | 10 | # | 0.001 | 0. |
| 53 I | 0 | 2 | 8 | | 0.001 | 0. | 1 | 2 | 7 | 0.003 | 0.0012 | 0.0019 |
| 55 Cs | 6 | 4 | 0 | 0.0055 | 0.0037 | 0.0071 | 5 | 5 | 0 | 0.0058 | 0.0034 | 0.0078 |
| 56 Ba | 1 | 7 | 2 | 0.007 | 0.0016 | 0.0057 | 3 | 7 | 0 | 0.008 | 0.0031 | 0.0102 |
| 57 La | 10 | 0 | 0 | 0.0081 | 0.0081 | 0.0057 | 9 | 0 | 1 | 0.0092 | 0.0084 | 0.012 |
| 58 Ce | 8 | 2 | 0 | 0.0073 | 0.006 | 0.0108 | 0 | 1 | 9 | # | 0.001 | 0. |
| 59 Pr | 0 | 1 | 9 | # | 0.001 | 0. | 6 | 4 | 0 | 0.0048 | 0.0033 | 0.006 |
| 60 Nd | 10 | 0 | 0 | 0.0049 | 0.0049 | 0.003 | 0 | 1 | 9 | | 0.001 | 0. |
| 63 Eu | 1 | 4 | 5 | 0.003 | 0.0012 | 0.0019 | 0 | 0 | 10 | # | 0.001 | 0. |
| 68 Er | 0 | 0 | 10 | | 0.001 | 0. | 7 | 0 | 3 | 0.0033 | 0.0026 | 0.0036 |
| 70 Yb | 1 | 0 | 9 | 0.0023 | 0.0011 | 0.0012 | 0 | 0 | 10 | # | 0.001 | 0. |
| 74 W | 10 | 0 | 0 | 0.0599 | 0.0599 | 0.0033 | 10 | 0 | 0 | 0.0388 | 0.0388 | 0.0061 |
| 90 Th | 1 | 5 | 4 | 0.003 | 0.0012 | 0.0019 | 6 | 3 | 1 | 0.0035 | 0.0025 | 0.0041 |

TABLE 3c 14-09-07 Post-Post96

| | | | | Post | | | | | | Post 96 | | |
|---|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 12 Mg | 10 | 0 | 0 | 99.808 | 99.808 | 0.0276 | 10 | 0 | 0 | 99.816 | 99.816 | 0.0322 |
| 16 S | 10 | 0 | 0 | 0.0106 | 0.0106 | 0.0057 | 10 | 0 | 0 | 0.0291 | 0.0291 | 0.003 |
| 17 Cl | 10 | 0 | 0 | 0.042 | 0.042 | 0.006 | 10 | 0 | 0 | 0.0427 | 0.0427 | 0.0079 |
| 20 Ca | 1 | 0 | 9 | 0.002 | 0.0011 | 0.0009 | 0 | 0 | 10 | #DIV/0! | 0.001 | 0. |
| 22 Ti | 7 | 0 | 3 | 0.0033 | 0.0026 | 0.0036 | 7 | 0 | 3 | 0.0027 | 0.0022 | 0.0026 |
| 23 V | 0 | 0 | 10 | #DIV/0! | 0.001 | 0. | 1 | 0 | 9 | 0.0029 | 0.0012 | 0.0018 |
| 24 Cr | 0 | 0 | 10 | #DIV/0! | 0.001 | 0. | 1 | 0 | 9 | 0.0021 | 0.0011 | 0.001 |
| 25 Mn | 10 | 0 | 0 | 0.0051 | 0.0051 | 0.0012 | 10 | 0 | 0 | 0.0044 | 0.0044 | 0.0015 |
| 26 Fe | 10 | 0 | 0 | 0.0048 | 0.0048 | 0.001 | 10 | 0 | 0 | 0.0041 | 0.0041 | 0.002 |
| 27 Co | 10 | 0 | 0 | 0.011 | 0.011 | 0.003 | 10 | 0 | 0 | 0.003 | 0.003 | 0.0018 |
| 28 Ni | 10 | 0 | 0 | 0.0032 | 0.0032 | 0.0018 | 10 | 0 | 0 | 0.0038 | 0.0038 | 0.0015 |
| 29 Cu | 10 | 0 | 0 | 0.018 | 0.018 | 0.0035 | 10 | 0 | 0 | 0.0187 | 0.0187 | 0.0038 |
| 30 Zn | 9 | 0 | 1 | 0.0038 | 0.0035 | 0.0039 | 10 | 0 | 0 | 0.0046 | 0.0046 | 0.0026 |
| 53 I | 0 | 1 | 9 | #DIV/0! | 0.001 | 0. | 1 | 2 | 7 | 0.003 | 0.0012 | 0.0019 |
| 55 Cs | 6 | 3 | 1 | 0.0057 | 0.0038 | 0.0073 | 5 | 5 | 0 | 0.0058 | 0.0034 | 0.0078 |
| 56 Ba | 2 | 8 | 0 | 0.007 | 0.0022 | 0.0076 | 3 | 7 | 0 | 0.008 | 0.0031 | 0.0102 |
| 57 La | 10 | 0 | 0 | 0.0201 | 0.0201 | 0.0164 | 9 | 0 | 1 | 0.0092 | 0.0084 | 0.012 |
| 58 Ce | 1 | 4 | 5 | 0.003 | 0.0012 | 0.0019 | 0 | 1 | 9 | #DIV/0! | 0.001 | 0. |
| 59 Pr | 0 | 2 | 8 | #DIV/0! | 0.001 | 0. | 6 | 4 | 0 | 0.0048 | 0.0033 | 0.006 |
| 63 Eu | 6 | 0 | 4 | 0.0025 | 0.0019 | 0.0025 | 0 | 0 | 10 | #DIV/0! | 0.001 | 0. |
| 68 Er | 0 | 0 | 10 | #DIV/0! | 0.001 | 0. | 7 | 0 | 3 | 0.0033 | 0.0026 | 0.0036 |
| 69 Tm | 1 | 0 | 9 | 0.0025 | 0.0012 | 0.0014 | 0 | 0 | 10 | #DIV/0! | 0.001 | 0. |
| 74 W | 10 | 0 | 0 | 0.0552 | 0.0552 | 0.0069 | 10 | 0 | 0 | 0.0388 | 0.0388 | 0.0061 |
| 82 Pb | 1 | 0 | 9 | 0.002 | 0.0011 | 0.0009 | 0 | 0 | 10 | #DIV/0! | 0.001 | 0. |
| 90 Th | 3 | 6 | 1 | 0.0034 | 0.0017 | 0.0035 | 6 | 3 | 1 | 0.0035 | 0.0025 | 0.0041 |

TABLE 4a

14-06-03 Pre-Post

| | Pre | | | | | | Post | | | | | |
|---|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 13 Al | 10 | 0 | 0 | 0.0582 | 0.0582 | 0.0109 | 10 | 0 | 0 | 0.0528 | 0.0528 | 0.0093 |
| 14 Si | 10 | 0 | 0 | 99.684 | 99.684 | 0.0429 | 10 | 0 | 0 | 99.7 | 99.7 | 0.04 |
| 16 S | 10 | 0 | 0 | 0.0101 | 0.0101 | 0.0058 | 10 | 0 | 0 | 0.0154 | 0.0154 | 0.0057 |
| 17 Cl | 5 | 4 | 1 | 0.0062 | 0.0036 | 0.0086 | 0 | 0 | 10 | #DIV/0! | 0.001 | 0. |
| 19 K | 6 | 0 | 4 | 0.003 | 0.0022 | 0.0033 | 2 | 0 | 8 | 0.0026 | 0.0013 | 0.0021 |
| 20 Ca | 10 | 0 | 0 | 0.0144 | 0.0144 | 0.0025 | 10 | 0 | 0 | 0.0038 | 0.0038 | 0.004 |
| 21 Sc | 0 | 0 | 10 | #DIV/0! | 0.001 | 0. | 6 | 0 | 4 | 0.0026 | 0.002 | 0.0027 |
| 22 Ti | 10 | 0 | 0 | 0.0067 | 0.0067 | 0.0036 | 10 | 0 | 0 | 0.0124 | 0.0124 | 0.0035 |
| 23 V | 10 | 0 | 0 | 0.0026 | 0.0026 | 0.0009 | 2 | 0 | 8 | 0.0022 | 0.0012 | 0.0015 |
| 24 Cr | 10 | 0 | 0 | 0.0038 | 0.0038 | 0.0016 | 10 | 0 | 0 | 0.0035 | 0.0035 | 0.0021 |
| 25 Mn | 6 | 0 | 4 | 0.0026 | 0.0019 | 0.0026 | 10 | 0 | 0 | 0.0035 | 0.0035 | 0.001 |
| 26 Fe | 10 | 0 | 0 | 0.042 | 0.042 | 0.0037 | 10 | 0 | 0 | 0.0401 | 0.0401 | 0.0039 |
| 27 Co | 10 | 0 | 0 | 0.0152 | 0.0152 | 0.0034 | 10 | 0 | 0 | 0.0093 | 0.0093 | 0.0016 |
| 28 Ni | 10 | 0 | 0 | 0.0079 | 0.0079 | 0.0021 | 10 | 0 | 0 | 0.0067 | 0.0067 | 0.0023 |
| 29 Cu | 10 | 0 | 0 | 0.0458 | 0.0458 | 0.0046 | 10 | 0 | 0 | 0.0414 | 0.0414 | 0.0053 |
| 30 Zn | 10 | 0 | 0 | 0.0149 | 0.0149 | 0.0022 | 10 | 0 | 0 | 0.0119 | 0.0119 | 0.0053 |
| 31 Ga | 10 | 0 | 0 | 0.0032 | 0.0032 | 0.0013 | 10 | 0 | 0 | 0.004 | 0.004 | 0.0016 |
| 33 As | 2 | 0 | 8 | 0.0026 | 0.0013 | 0.002 | 3 | 0 | 7 | 0.0025 | 0.0014 | 0.0021 |
| 40 Zr | 2 | 0 | 8 | 0.0021 | 0.0012 | 0.0014 | 2 | 0 | 8 | 0.0021 | 0.0012 | 0.0013 |
| 46 Pd | 1 | 0 | 9 | 0.0031 | 0.0012 | 0.002 | 2 | 0 | 8 | 0.0026 | 0.0013 | 0.0021 |
| 47 Ag | 7 | 0 | 3 | 0.0026 | 0.0021 | 0.0027 | 3 | 0 | 7 | 0.0028 | 0.0015 | 0.0027 |
| 55 Cs | 8 | 2 | 0 | 0.007 | 0.0058 | 0.0082 | 9 | 1 | 0 | 0.0068 | 0.0062 | 0.0072 |
| 56 Ba | 7 | 3 | 0 | 0.009 | 0.0066 | 0.0127 | 8 | 2 | 0 | 0.0089 | 0.0073 | 0.0108 |
| 57 La | 6 | 4 | 0 | 0.0143 | 0.009 | 0.0233 | 10 | 0 | 0 | 0.0143 | 0.0143 | 0.0121 |
| 58 Ce | 0 | 0 | 10 | #DIV/0! | 0.001 | 0. | 7 | 2 | 1 | 0.0057 | 0.0043 | 0.008 |
| 59 Pr | 10 | 0 | 0 | 0.0097 | 0.0097 | 0.0045 | 10 | 0 | 0 | 0.0077 | 0.0077 | 0.0091 |
| 60 Nd | 0 | 0 | 10 | #DIV/0! | 0.001 | 0. | 7 | 3 | 0 | 0.0039 | 0.003 | 0.0049 |
| 62 Sm | 1 | 4 | 5 | 0.005 | 0.0014 | 0.0038 | 9 | 1 | 0 | 0.0053 | 0.0049 | 0.0065 |
| 64 Gd | 0 | 0 | 10 | #DIV/0! | 0.001 | 0. | 10 | 0 | 0 | 0.0068 | 0.0068 | 0.0034 |
| 66 Dy | 0 | 1 | 9 | #DIV/0! | 0.001 | 0. | 8 | 1 | 1 | 0.0054 | 0.0045 | 0.0065 |
| 67 Ho | 4 | 2 | 4 | 0.004 | 0.0022 | 0.0049 | 0 | 0 | 10 | #DIV/0! | 0.001 | 0. |
| 70 Yb | 0 | 0 | 10 | #DIV/0! | 0.001 | 0. | 1 | 1 | 8 | 0.003 | 0.0012 | 0.0019 |
| 71 Lu | 6 | 3 | 1 | 0.0032 | 0.0023 | 0.0035 | 2 | 5 | 3 | 0.003 | 0.0014 | 0.0025 |
| 72 Hf | 5 | 2 | 3 | 0.0038 | 0.0024 | 0.0047 | 4 | 1 | 5 | 0.003 | 0.0018 | 0.0031 |
| 74 W | 10 | 0 | 0 | 0.0344 | 0.0344 | 0.0064 | 10 | 0 | 0 | 0.0156 | 0.0156 | 0.0072 |
| 75 Re | 0 | 0 | 10 | #DIV/0! | 0.001 | 0. | 1 | 0 | 9 | 0.0026 | 0.0012 | 0.0015 |
| 76 Os | 1 | 0 | 9 | 0.0024 | 0.0011 | 0.0013 | 0 | 0 | 10 | #DIV/0! | 0.001 | 0. |
| 77 Ir | 1 | 0 | 9 | 0.002 | 0.0011 | 0.0009 | 1 | 0 | 9 | 0.0024 | 0.0011 | 0.0013 |
| 81 Tl | 4 | 0 | 6 | 0.0027 | 0.0017 | 0.0028 | 0 | 0 | 10 | #DIV/0! | 0.001 | 0. |
| 82 Pb | 1 | 0 | 9 | 0.0021 | 0.0011 | 0.001 | 0 | 0 | 10 | #DIV/0! | 0.001 | 0. |
| 83 Bi | 1 | 0 | 9 | 0.0028 | 0.0012 | 0.0017 | 0 | 0 | 10 | #DIV/0! | 0.001 | 0. |
| 90 Th | 2 | 2 | 6 | 0.003 | 0.0014 | 0.0025 | 8 | 0 | 2 | 0.0033 | 0.0029 | 0.0032 |

TABLE 4b

14-06-03 Pre-Post96

| | Pre | | | | | | Post 96 hr | | | | | |
|---|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 13 Al | 10 | 0 | 0 | 0.0582 | 0.0582 | 0.0109 | 10 | 0 | 0 | 0.0698 | 0.0698 | 0.0107 |
| 14 Si | 10 | 0 | 0 | 99.684 | 99.684 | 0.0429 | 10 | 0 | 0 | 99.693 | 99.693 | 0.0906 |
| 16 S | 10 | 0 | 0 | 0.0101 | 0.0101 | 0.0058 | 10 | 0 | 0 | 0.0294 | 0.0294 | 0.0067 |
| 17 Cl | 5 | 4 | 1 | 0.0062 | 0.0036 | 0.0086 | 1 | 0 | 9 | 0.003 | 0.0012 | 0.0019 |
| 19 K | 6 | 0 | 4 | 0.003 | 0.0022 | 0.0033 | 1 | 0 | 9 | 0.0023 | 0.0011 | 0.0012 |
| 20 Ca | 10 | 0 | 0 | 0.0144 | 0.0144 | 0.0025 | 5 | 0 | 5 | 0.0026 | 0.0018 | 0.0028 |
| 21 Sc | 0 | 0 | 10 | #DIV/0! | 0.001 | 0. | 3 | 0 | 7 | 0.0021 | 0.0013 | 0.0016 |
| 22 Ti | 10 | 0 | 0 | 0.0067 | 0.0067 | 0.0036 | 10 | 0 | 0 | 0.0082 | 0.0082 | 0.0033 |
| 23 V | 10 | 0 | 0 | 0.0026 | 0.0026 | 0.0009 | 0 | 0 | 10 | #DIV/0! | 0.001 | 0. |
| 24 Cr | 10 | 0 | 0 | 0.0038 | 0.0038 | 0.0016 | 9 | 0 | 1 | 0.003 | 0.0028 | 0.0022 |
| 25 Mn | 6 | 0 | 4 | 0.0026 | 0.0019 | 0.0026 | 9 | 0 | 1 | 0.0028 | 0.0027 | 0.0023 |
| 26 Fe | 10 | 0 | 0 | 0.042 | 0.042 | 0.0037 | 10 | 0 | 0 | 0.0454 | 0.0454 | 0.0035 |
| 27 Co | 10 | 0 | 0 | 0.0152 | 0.0152 | 0.0034 | 10 | 0 | 0 | 0.0123 | 0.0123 | 0.0048 |
| 28 Ni | 10 | 0 | 0 | 0.0079 | 0.0079 | 0.0021 | 10 | 0 | 0 | 0.0038 | 0.0038 | 0.0023 |
| 29 Cu | 10 | 0 | 0 | 0.0458 | 0.0458 | 0.0046 | 10 | 0 | 0 | 0.0454 | 0.0454 | 0.0071 |

TABLE 4b-continued

14-06-03 Pre-Post96

| | | Pre | | | | | Post 96 hr | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 30 Zn | 10 | 0 | 0 | 0.0149 | 0.0149 | 0.0022 | 10 | 0 | 0 | 0.0156 | 0.0156 | 0.0038 |
| 31 Ga | 10 | 0 | 0 | 0.0032 | 0.0032 | 0.0013 | 10 | 0 | 0 | 0.0032 | 0.0032 | 0.0011 |
| 33 As | 2 | 0 | 8 | 0.0026 | 0.0013 | 0.002 | 0 | 0 | 10 | #DIV/0! | 0.001 | 0. |
| 40 Zr | 2 | 0 | 8 | 0.0021 | 0.0012 | 0.0014 | 0 | 0 | 10 | #DIV/0! | 0.001 | 0. |
| 46 Pd | 1 | 0 | 9 | 0.0031 | 0.0012 | 0.002 | 2 | 0 | 8 | 0.003 | 0.0014 | 0.0025 |
| 47 Ag | 7 | 0 | 3 | 0.0026 | 0.0021 | 0.0027 | 5 | 0 | 5 | 0.0027 | 0.0018 | 0.003 |
| 48 Cd | 2 | 0 | 8 | 0.0023 | 0.0013 | 0.0016 | 1 | 0 | 9 | 0.003 | 0.0012 | 0.0019 |
| 53 I | 1 | 1 | 8 | 0.004 | 0.0013 | 0.0028 | 0 | 2 | 8 | #DIV/0! | 0.001 | 0. |
| 55 Cs | 8 | 2 | 0 | 0.007 | 0.0058 | 0.0082 | 7 | 3 | 0 | 0.0063 | 0.0047 | 0.0081 |
| 56 Ba | 7 | 3 | 0 | 0.009 | 0.0066 | 0.0127 | 8 | 2 | 0 | 0.0089 | 0.0073 | 0.0109 |
| 57 La | 6 | 4 | 0 | 0.0143 | 0.009 | 0.0233 | 3 | 7 | 0 | 0.0077 | 0.003 | 0.0098 |
| 59 Pr | 10 | 0 | 0 | 0.0097 | 0.0097 | 0.0045 | 0 | 8 | 2 | #DIV/0! | 0.001 | 0. |
| 62 Sm | 1 | 4 | 5 | 0.005 | 0.0014 | 0.0038 | 0 | 0 | 10 | #DIV/0! | 0.001 | 0. |
| 67 Ho | 4 | 2 | 4 | 0.004 | 0.0022 | 0.0049 | 0 | 1 | 9 | #DIV/0! | 0.001 | 0. |
| 68 Er | 0 | 0 | 10 | #DIV/0! | 0.001 | 0. | 6 | 3 | 1 | 0.005 | 0.0034 | 0.0065 |
| 71 Lu | 6 | 3 | 1 | 0.0032 | 0.0023 | 0.0035 | 0 | 1 | 9 | #DIV/0! | 0.001 | 0. |
| 72 Hf | 5 | 2 | 3 | 0.0038 | 0.0024 | 0.0047 | 1 | 4 | 5 | 0.003 | 0.0012 | 0.0019 |
| 74 W | 10 | 0 | 0 | 0.0344 | 0.0344 | 0.0064 | 10 | 0 | 0 | 0.0228 | 0.0228 | 0.0053 |
| 76 Os | 1 | 0 | 9 | 0.0024 | 0.0011 | 0.0013 | 4 | 0 | 6 | 0.0028 | 0.0017 | 0.003 |
| 77 Ir | 1 | 0 | 9 | 0.002 | 0.0011 | 0.0009 | 0 | 0 | 10 | #DIV/0! | 0.001 | 0. |
| 79 Au | 0 | 0 | 10 | #DIV/0! | 0.001 | 0. | 1 | 0 | 9 | 0.002 | 0.0011 | 0.0009 |
| 81 Tl | 4 | 0 | 6 | 0.0027 | 0.0017 | 0.0028 | 2 | 0 | 8 | 0.0021 | 0.0012 | 0.0014 |
| 82 Pb | 1 | 0 | 9 | 0.0021 | 0.0011 | 0.001 | 0 | 0 | 10 | #DIV/0! | 0.001 | 0. |
| 83 Bi | 1 | 0 | 9 | 0.0028 | 0.0012 | 0.0017 | 0 | 0 | 10 | #DIV/0! | 0.001 | 0. |
| 90 Th | 2 | 2 | 6 | 0.003 | 0.0014 | 0.0025 | 1 | 1 | 8 | 0.004 | 0.0013 | 0.0028 |

TABLE 4c

14-06-03 Post-Post96

| | | Post | | | | | Post 96 hr | | | | |
|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 13 Al | 10 | 0 | 0 | 0.0528 | 0.0528 | 0.0093 | 10 | 0 | 0 | 0.0698 | 0.0698 | 0.0107 |
| 14 Si | 10 | 0 | 0 | 99.7 | 99.7 | 0.04 | 10 | 0 | 0 | 99.693 | 99.693 | 0.0906 |
| 16 S | 10 | 0 | 0 | 0.0154 | 0.0154 | 0.0057 | 10 | 0 | 0 | 0.0294 | 0.0294 | 0.0067 |
| 17 Cl | 0 | 0 | 10 | #DIV/0! | 0.001 | 0. | 1 | 0 | 9 | 0.003 | 0.0012 | 0.0019 |
| 19 K | 2 | 0 | 8 | 0.0026 | 0.0013 | 0.0021 | 1 | 0 | 9 | 0.0023 | 0.0011 | 0.0012 |
| 20 Ca | 10 | 0 | 0 | 0.0038 | 0.0038 | 0.004 | 5 | 0 | 5 | 0.0026 | 0.0018 | 0.0028 |
| 21 Sc | 6 | 0 | 4 | 0.0026 | 0.002 | 0.0027 | 3 | 0 | 7 | 0.0021 | 0.0013 | 0.0016 |
| 22 Ti | 10 | 0 | 0 | 0.0124 | 0.0124 | 0.0035 | 10 | 0 | 0 | 0.0082 | 0.0082 | 0.0033 |
| 23 V | 2 | 0 | 8 | 0.0022 | 0.0012 | 0.0015 | 0 | 0 | 10 | #DIV/0! | 0.001 | 0. |
| 24 Cr | 10 | 0 | 0 | 0.0035 | 0.0035 | 0.0021 | 9 | 0 | 1 | 0.003 | 0.0028 | 0.0022 |
| 25 Mn | 10 | 0 | 0 | 0.0035 | 0.0035 | 0.001 | 9 | 0 | 1 | 0.0028 | 0.0027 | 0.0023 |
| 26 Fe | 10 | 0 | 0 | 0.0401 | 0.0401 | 0.0039 | 10 | 0 | 0 | 0.0454 | 0.0454 | 0.0035 |
| 27 Co | 10 | 0 | 0 | 0.0093 | 0.0093 | 0.0016 | 10 | 0 | 0 | 0.0123 | 0.0123 | 0.0048 |
| 28 Ni | 10 | 0 | 0 | 0.0067 | 0.0067 | 0.0023 | 10 | 0 | 0 | 0.0038 | 0.0038 | 0.0023 |
| 29 Cu | 10 | 0 | 0 | 0.0414 | 0.0414 | 0.0053 | 10 | 0 | 0 | 0.0454 | 0.0454 | 0.0071 |
| 30 Zn | 10 | 0 | 0 | 0.0119 | 0.0119 | 0.0053 | 10 | 0 | 0 | 0.0156 | 0.0156 | 0.0038 |
| 31 Ga | 10 | 0 | 0 | 0.004 | 0.004 | 0.0016 | 10 | 0 | 0 | 0.0032 | 0.0032 | 0.0011 |
| 33 As | 3 | 0 | 7 | 0.0025 | 0.0014 | 0.0021 | 0 | 0 | 10 | #DIV/0! | 0.001 | 0. |
| 40 Zr | 2 | 0 | 8 | 0.0021 | 0.0012 | 0.0013 | 0 | 0 | 10 | #DIV/0! | 0.001 | 0. |
| 46 Pd | 2 | 0 | 8 | 0.0026 | 0.0013 | 0.0021 | 2 | 0 | 8 | 0.003 | 0.0014 | 0.0025 |
| 47 Ag | 3 | 0 | 7 | 0.0028 | 0.0015 | 0.0027 | 5 | 0 | 5 | 0.0027 | 0.0018 | 0.003 |
| 55 Cs | 9 | 1 | 0 | 0.0068 | 0.0062 | 0.0072 | 7 | 3 | 0 | 0.0063 | 0.0047 | 0.0081 |
| 56 Ba | 8 | 2 | 0 | 0.0089 | 0.0073 | 0.0108 | 8 | 2 | 0 | 0.0089 | 0.0073 | 0.0109 |
| 57 La | 10 | 0 | 0 | 0.0143 | 0.0143 | 0.0121 | 3 | 7 | 0 | 0.0077 | 0.003 | 0.0098 |
| 58 Ce | 7 | 2 | 1 | 0.0057 | 0.0043 | 0.008 | 0 | 2 | 8 | #DIV/0! | 0.001 | 0. |
| 59 Pr | 10 | 0 | 0 | 0.0077 | 0.0077 | 0.0091 | 0 | 8 | 2 | #DIV/0! | 0.001 | 0. |
| 60 Nd | 7 | 3 | 0 | 0.0039 | 0.003 | 0.0049 | 0 | 1 | 9 | #DIV/0! | 0.001 | 0. |
| 62 Sm | 9 | 1 | 0 | 0.0053 | 0.0049 | 0.0065 | 0 | 0 | 10 | #DIV/0! | 0.001 | 0. |
| 64 Gd | 10 | 0 | 0 | 0.0068 | 0.0068 | 0.0034 | 0 | 0 | 10 | #DIV/0! | 0.001 | 0. |
| 66 Dy | 8 | 1 | 1 | 0.0054 | 0.0045 | 0.0065 | 0 | 0 | 10 | #DIV/0! | 0.001 | 0. |
| 68 Er | 0 | 2 | 8 | #DIV/0! | 0.001 | 0. | 6 | 3 | 1 | 0.005 | 0.0034 | 0.0065 |
| 70 Yb | 1 | 1 | 8 | 0.003 | 0.0012 | 0.0019 | 0 | 0 | 10 | #DIV/0! | 0.001 | 0. |
| 71 Lu | 2 | 5 | 3 | 0.003 | 0.0014 | 0.0025 | 0 | 1 | 9 | #DIV/0! | 0.001 | 0. |

TABLE 4c-continued

| | | Hits | <2e | < | Avg | Avg at LDL/2 | 3X SD |  | Hits | <2e | < | Avg | Avg at LDL/2 | 3X SD |
|---|---|---|---|---|---|---|---|---|---|---|---|---|---|---|
| 72 | Hf | 4 | 1 | 5 | 0.003 | 0.0018 | 0.0031 | | 1 | 4 | 5 | 0.003 | 0.0012 | 0.0019 |
| 74 | W | 10 | 0 | 0 | 0.0156 | 0.0156 | 0.0072 | | 10 | 0 | 0 | 0.0228 | 0.0228 | 0.0053 |
| 75 | Re | 1 | 0 | 9 | 0.0026 | 0.0012 | 0.0015 | | 0 | 0 | 10 | #DIV/0! | 0.001 | 0. |
| 76 | Os | 0 | 0 | 10 | #DIV/0! | 0.001 | 0. | | 4 | 0 | 6 | 0.0028 | 0.0017 | 0.003 |
| 77 | Ir | 1 | 0 | 9 | 0.0024 | 0.0011 | 0.0013 | | 0 | 0 | 10 | #DIV/0! | 0.001 | 0. |
| 79 | Au | 0 | 0 | 10 | #DIV/0! | 0.001 | 0. | | 1 | 0 | 9 | 0.002 | 0.0011 | 0.0009 |
| 81 | Tl | 0 | 0 | 10 | #DIV/0! | 0.001 | 0. | | 2 | 0 | 8 | 0.0021 | 0.0012 | 0.0014 |
| 90 | Th | 8 | 0 | 2 | 0.0033 | 0.0029 | 0.0032 | | 1 | 1 | 8 | 0.004 | 0.0013 | 0.0028 |

Reference to show stability: NIST Standard C1122 Beryllium Copper Pre vs. Post 0 hour

| | | NIST Pre | | | | | | NIST Post | | | | | |
|---|---|---|---|---|---|---|---|---|---|---|---|---|---|
| Z | | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 11 | Na | 10 | 0 | 0 | 0.0934 | 0.0934 | 0.0713 | 10 | 0 | 0 | 0.0968 | 0.0968 | 0.0511 |
| 12 | Mg | 10 | 0 | 0 | 0.0722 | 0.0722 | 0.0229 | 10 | 0 | 0 | 0.0775 | 0.0775 | 0.0174 |
| 13 | Al | 10 | 0 | 0 | 0.0559 | 0.0559 | 0.0219 | 10 | 0 | 0 | 0.0552 | 0.0552 | 0.0272 |
| 14 | Si | 10 | 0 | 0 | 0.418 | 0.418 | 0.019 | 10 | 0 | 0 | 0.417 | 0.417 | 0.0247 |
| 16 | S | 5 | 5 | 0 | 0.0556 | 0.0283 | 0.0863 | 7 | 3 | 0 | 0.0576 | 0.0406 | 0.082 |
| 16 | So | 5 | 5 | 0 | 0.0558 | 0.0284 | 0.0867 | 3 | 7 | 0 | 0.0577 | 0.018 | 0.0821 |
| 17 | Cl | 10 | 0 | 0 | 0.0862 | 0.0862 | 0.0081 | 10 | 0 | 0 | 0.0899 | 0.0899 | 0.0052 |
| 19 | K | 10 | 0 | 0 | 0.0097 | 0.0097 | 0.0019 | 10 | 0 | 0 | 0.0123 | 0.0123 | 0.0025 |
| 20 | Ca | 10 | 0 | 0 | 0.0074 | 0.0074 | 0.0049 | 10 | 0 | 0 | 0.0106 | 0.0106 | 0.0051 |
| 22 | Ti | 3 | 3 | 4 | 0.0047 | 0.0021 | 0.0054 | 1 | 5 | 4 | 0.006 | 0.0015 | 0.0047 |
| 24 | Cr | 6 | 0 | 4 | 0.0027 | 0.002 | 0.0027 | 6 | 0 | 4 | 0.0025 | 0.0019 | 0.0026 |
| 25 | Mn | 10 | 0 | 0 | 0.0073 | 0.0073 | 0.0022 | 10 | 0 | 0 | 0.0077 | 0.0077 | 0.001 |
| 26 | Fe | 10 | 0 | 0 | 0.166 | 0.166 | 0.0155 | 10 | 0 | 0 | 0.169 | 0.169 | 0.0095 |
| 27 | Co | 10 | 0 | 0 | 0.206 | 0.206 | 0.0155 | 10 | 0 | 0 | 0.212 | 0.212 | 0.0126 |
| 29 | Cu | 10 | 0 | 0 | 98.48 | 98.48 | 0.1386 | 10 | 0 | 0 | 98.469 | 98.469 | 0.1187 |
| 31 | Ga | 4 | 4 | 2 | 0.0073 | 0.0035 | 0.0098 | 4 | 4 | 2 | 0.0075 | 0.0036 | 0.0102 |
| 32 | Ge | 0 | 4 | 6 | | 0.001 | 0. | 1 | 1 | 8 | 0.006 | 0.0015 | 0.0047 |
| 37 | Rb | 1 | 0 | 9 | 0.003 | 0.0012 | 0.0019 | 0 | 0 | 10 | | 0.001 | 0. |
| 42 | Mo | 3 | 1 | 6 | 0.0057 | 0.0024 | 0.0068 | 1 | 4 | 5 | 0.006 | 0.0015 | 0.0047 |
| 45 | Rh | 1 | 3 | 6 | 0.008 | 0.0017 | 0.0066 | 0 | 3 | 7 | | 0.001 | 0. |
| 47 | Ag | 9 | 1 | 0 | 0.0067 | 0.0061 | 0.0071 | 9 | 1 | 0 | 0.0064 | 0.0059 | 0.0061 |
| 48 | Cd | 0 | 6 | 4 | | 0.001 | 0. | 2 | 6 | 2 | 0.0045 | 0.0017 | 0.0045 |
| 50 | Sn | 10 | 0 | 0 | 0.0062 | 0.0062 | 0.0051 | 10 | 0 | 0 | 0.0062 | 0.0062 | 0.0051 |
| 53 | I | 1 | 2 | 7 | 0.005 | 0.0014 | 0.0038 | 0 | 0 | 10 | | 0.001 | 0. |
| 55 | Cs | 1 | 1 | 8 | 0.006 | 0.0015 | 0.0047 | 1 | 2 | 7 | 0.006 | 0.0015 | 0.0047 |
| 56 | Ba | 1 | 5 | 4 | 0.01 | 0.0019 | 0.0085 | 1 | 4 | 5 | 0.007 | 0.0016 | 0.0057 |
| 59 | Pr | 8 | 2 | 0 | 0.0103 | 0.0084 | 0.0123 | 9 | 1 | 0 | 0.0091 | 0.0083 | 0.0109 |
| 68 | Er | 10 | 0 | 0 | 0.16 | 0.16 | 0.0141 | 10 | 0 | 0 | 0.156 | 0.156 | 0.0155 |
| 69 | Tm | 2 | 1 | 7 | 0.009 | 0.0026 | 0.0102 | 0 | 1 | 9 | | 0.001 | 0. |
| 71 | Lu | 10 | 0 | 0 | 0.123 | 0.123 | 0.0318 | 10 | 0 | 0 | 0.12 | 0.12 | 0.0346 |
| 75 | Re | 2 | 4 | 4 | 0.0195 | 0.0047 | 0.0237 | 0 | 7 | 3 | | 0.001 | 0. |
| 76 | Os | 1 | 5 | 4 | 0.015 | 0.0024 | 0.0133 | 1 | 6 | 3 | 0.017 | 0.0026 | 0.0152 |
| 77 | Ir | 6 | 4 | 0 | 0.0198 | 0.0123 | 0.0297 | 5 | 4 | 1 | 0.0236 | 0.0123 | 0.0374 |
| 78 | Pt | 1 | 4 | 5 | 0.017 | 0.0026 | 0.0152 | 1 | 5 | 4 | 0.022 | 0.0031 | 0.0199 |
| 79 | Au | 1 | 4 | 5 | 0.015 | 0.0024 | 0.0133 | 0 | 3 | 7 | | 0.001 | 0. |
| 82 | Pb | 4 | 4 | 2 | 0.0088 | 0.0041 | 0.0126 | 2 | 4 | 4 | 0.009 | 0.0026 | 0.0105 |

Reference to show stability: NIST Standard C1122 Beryllium Copper Pre vs. Post 96 hour

| | | NIST Pre | | | | | | NIST Post 96 hr | | | | | |
|---|---|---|---|---|---|---|---|---|---|---|---|---|---|
| Z | | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 11 | Na | 10 | 0 | 0 | 0.0934 | 0.0934 | 0.0713 | 10 | 0 | 0 | 0.1164 | 0.1164 | 0.043 |
| 12 | Mg | 10 | 0 | 0 | 0.0722 | 0.0722 | 0.0229 | 10 | 0 | 0 | 0.0746 | 0.0746 | 0.0206 |
| 13 | Al | 10 | 0 | 0 | 0.0559 | 0.0559 | 0.0219 | 10 | 0 | 0 | 0.0765 | 0.0765 | 0.035 |
| 14 | Si | 10 | 0 | 0 | 0.418 | 0.418 | 0.019 | 10 | 0 | 0 | 0.452 | 0.452 | 0.0237 |
| 16 | S | 5 | 5 | 0 | 0.0556 | 0.0283 | 0.0863 | 9 | 1 | 0 | 0.0619 | 0.0558 | 0.0579 |
| 16 | So | 5 | 5 | 0 | 0.0558 | 0.0284 | 0.0867 | 1 | 9 | 0 | 0.062 | 0.0071 | 0.0579 |
| 17 | Cl | 10 | 0 | 0 | 0.0862 | 0.0862 | 0.0081 | 10 | 0 | 0 | 0.094 | 0.094 | 0.0049 |
| 19 | K | 10 | 0 | 0 | 0.0097 | 0.0097 | 0.0019 | 10 | 0 | 0 | 0.0143 | 0.0143 | 0.0043 |
| 20 | Ca | 10 | 0 | 0 | 0.0074 | 0.0074 | 0.0049 | 10 | 0 | 0 | 0.0124 | 0.0124 | 0.004 |
| 21 | Sc | 0 | 3 | 7 | | 0.001 | 0. | 2 | 4 | 4 | 0.003 | 0.0014 | 0.0025 |
| 22 | Ti | 3 | 3 | 4 | 0.0047 | 0.0021 | 0.0054 | 0 | 2 | 8 | | 0.001 | 0. |
| 24 | Cr | 6 | 0 | 4 | 0.0027 | 0.002 | 0.0027 | 5 | 0 | 5 | 0.0024 | 0.0017 | 0.0022 |
| 25 | Mn | 10 | 0 | 0 | 0.0073 | 0.0073 | 0.0022 | 10 | 0 | 0 | 0.0083 | 0.0083 | 0.0025 |
| 26 | Fe | 10 | 0 | 0 | 0.166 | 0.166 | 0.0155 | 10 | 0 | 0 | 0.17 | 0.17 | 0. |
| 27 | Co | 10 | 0 | 0 | 0.206 | 0.206 | 0.0155 | 10 | 0 | 0 | 0.224 | 0.224 | 0.0155 |
| 29 | Cu | 10 | 0 | 0 | 98.48 | 98.48 | 0.1386 | 10 | 0 | 0 | 98.331 | 98.331 | 0.0741 |
| 31 | Ga | 4 | 4 | 2 | 0.0073 | 0.0035 | 0.0098 | 2 | 6 | 2 | 0.0075 | 0.0023 | 0.0083 |
| 37 | Rb | 1 | 0 | 9 | 0.003 | 0.0012 | 0.0019 | 0 | 1 | 9 | | 0.001 | 0. |

TABLE 4c-continued

| Z | | | | | | | | | | | | |
|---|---|---|---|---|---|---|---|---|---|---|---|---|
| 38 Sr | 0 | 0 | 10 | | 0.001 | 0. | 1 | 1 | 8 | 0.003 | 0.0012 | 0.0019 |
| 42 Mo | 3 | 1 | 6 | 0.0057 | 0.0024 | 0.0068 | 2 | 1 | 7 | 0.007 | 0.0022 | 0.0077 |
| 45 Rh | 1 | 3 | 6 | 0.008 | 0.0017 | 0.0066 | 0 | 3 | 7 | | 0.001 | 0. |
| 47 Ag | 9 | 1 | 0 | 0.0067 | 0.0061 | 0.0071 | 9 | 1 | 0 | 0.0069 | 0.0063 | 0.0087 |
| 48 Cd | 0 | 6 | 4 | | 0.001 | 0. | 3 | 5 | 2 | 0.0043 | 0.002 | 0.0049 |
| 50 Sn | 10 | 0 | 0 | 0.0062 | 0.0062 | 0.0051 | 10 | 0 | 0 | 0.0076 | 0.0076 | 0.006 |
| 53 I | 1 | 2 | 7 | 0.005 | 0.0014 | 0.0038 | 0 | 1 | 9 | | 0.001 | 0. |
| 55 Cs | 1 | 1 | 8 | 0.006 | 0.0015 | 0.0047 | 0 | 1 | 9 | | 0.001 | 0. |
| 56 Ba | 1 | 5 | 4 | 0.01 | 0.0019 | 0.0085 | 1 | 6 | 3 | 0.007 | 0.0016 | 0.0057 |
| 59 Pr | 8 | 2 | 0 | 0.0103 | 0.0084 | 0.0123 | 5 | 4 | 1 | 0.006 | 0.0035 | 0.0084 |
| 68 Er | 10 | 0 | 0 | 0.16 | 0.16 | 0.0141 | 10 | 0 | 0 | 0.179 | 0.179 | 0.0221 |
| 69 Tm | 2 | 1 | 7 | 0.009 | 0.0026 | 0.0102 | 0 | 2 | 8 | | 0.001 | 0. |
| 71 Lu | 10 | 0 | 0 | 0.123 | 0.123 | 0.0318 | 10 | 0 | 0 | 0.137 | 0.137 | 0.0348 |
| 75 Re | 2 | 4 | 4 | 0.0195 | 0.0047 | 0.0237 | 1 | 5 | 4 | 0.018 | 0.0027 | 0.0161 |
| 76 Os | 1 | 5 | 4 | 0.015 | 0.0024 | 0.0133 | 0 | 4 | 6 | | 0.001 | 0. |
| 77 Ir | 6 | 4 | 0 | 0.0198 | 0.0123 | 0.0297 | 6 | 4 | 0 | 0.0257 | 0.0158 | 0.0427 |
| 78 Pt | 1 | 4 | 5 | 0.017 | 0.0026 | 0.0152 | 0 | 4 | 6 | | 0.001 | 0. |
| 79 Au | 1 | 4 | 5 | 0.015 | 0.0024 | 0.0133 | 0 | 3 | 7 | | 0.001 | 0. |
| 82 Pb | 4 | 4 | 2 | 0.0088 | 0.0041 | 0.0126 | 3 | 5 | 2 | 0.0077 | 0.003 | 0.0098 |

Reference to show stability: NIST Standard C1122 Beryllium Copper Post vs. Post 96 hour

| | NIST Post | | | | | | NIST Post 96 hr | | | | | |
|---|---|---|---|---|---|---|---|---|---|---|---|---|
| Z | Hits | <2e | < | Average of Hits | Average of All at LDL/2 | 3X Standard Dev with Non Hits at LDL/2 | Hits | <2e | < | Average of Hits | Average of All at LDL/2 | 3X Standard Dev with Non Hits at LDL/2 |
| 11 Na | 10 | 0 | 0 | 0.0968 | 0.0968 | 0.0511 | 10 | 0 | 0 | 0.1164 | 0.1164 | 0.043 |
| 12 Mg | 10 | 0 | 0 | 0.0775 | 0.0775 | 0.0174 | 10 | 0 | 0 | 0.0746 | 0.0746 | 0.0206 |
| 13 Al | 10 | 0 | 0 | 0.0552 | 0.0552 | 0.0272 | 10 | 0 | 0 | 0.0765 | 0.0765 | 0.035 |
| 14 Si | 10 | 0 | 0 | 0.417 | 0.417 | 0.0247 | 10 | 0 | 0 | 0.452 | 0.452 | 0.0237 |
| 16 S | 7 | 3 | 0 | 0.0576 | 0.0406 | 0.082 | 9 | 1 | 0 | 0.0619 | 0.0558 | 0.0579 |
| 16 So | 3 | 7 | 0 | 0.0577 | 0.018 | 0.0821 | 1 | 9 | 0 | 0.062 | 0.0071 | 0.0579 |
| 17 Cl | 10 | 0 | 0 | 0.0899 | 0.0899 | 0.0052 | 10 | 0 | 0 | 0.094 | 0.094 | 0.0049 |
| 19 K | 10 | 0 | 0 | 0.0123 | 0.0123 | 0.0025 | 10 | 0 | 0 | 0.0143 | 0.0143 | 0.0043 |
| 20 Ca | 10 | 0 | 0 | 0.0106 | 0.0106 | 0.0051 | 10 | 0 | 0 | 0.0124 | 0.0124 | 0.004 |
| 21 Sc | 0 | 4 | 6 | | 0.001 | 0. | 2 | 4 | 4 | 0.003 | 0.0014 | 0.0025 |
| 22 Ti | 1 | 5 | 4 | 0.006 | 0.0015 | 0.0047 | 0 | 2 | 8 | | 0.001 | 0. |
| 24 Cr | 6 | 0 | 4 | 0.0025 | 0.0019 | 0.0026 | 5 | 0 | 5 | 0.0024 | 0.0017 | 0.0022 |
| 25 Mn | 10 | 0 | 0 | 0.0077 | 0.0077 | 0.001 | 10 | 0 | 0 | 0.0083 | 0.0083 | 0.0025 |
| 26 Fe | 10 | 0 | 0 | 0.169 | 0.169 | 0.0095 | 10 | 0 | 0 | 0.17 | 0.17 | 0. |
| 27 Co | 10 | 0 | 0 | 0.212 | 0.212 | 0.0126 | 10 | 0 | 0 | 0.224 | 0.224 | 0.0155 |
| 29 Cu | 10 | 0 | 0 | 98.469 | 98.469 | 0.1187 | 10 | 0 | 0 | 98.331 | 98.331 | 0.0741 |
| 31 Ga | 4 | 4 | 2 | 0.0075 | 0.0036 | 0.0102 | 2 | 6 | 2 | 0.0075 | 0.0023 | 0.0083 |
| 32 Ge | 1 | 1 | 8 | 0.006 | 0.0015 | 0.0047 | 0 | 1 | 9 | | 0.001 | 0. |
| 38 Sr | 0 | 0 | 10 | | 0.001 | 0. | 1 | 1 | 8 | 0.003 | 0.0012 | 0.0019 |
| 42 Mo | 1 | 4 | 5 | 0.006 | 0.0015 | 0.0047 | 2 | 1 | 7 | 0.007 | 0.0022 | 0.0077 |
| 47 Ag | 9 | 1 | 0 | 0.0064 | 0.0059 | 0.0061 | 9 | 1 | 0 | 0.0069 | 0.0063 | 0.0087 |
| 48 Cd | 2 | 6 | 2 | 0.0045 | 0.0017 | 0.0045 | 3 | 5 | 2 | 0.0043 | 0.002 | 0.0049 |
| 50 Sn | 10 | 0 | 0 | 0.0062 | 0.0062 | 0.0051 | 10 | 0 | 0 | 0.0076 | 0.0076 | 0.006 |
| 55 Cs | 1 | 2 | 7 | 0.006 | 0.0015 | 0.0047 | 0 | 1 | 9 | | 0.001 | 0. |
| 56 Ba | 1 | 4 | 5 | 0.007 | 0.0016 | 0.0057 | 1 | 6 | 3 | 0.007 | 0.0016 | 0.0057 |
| 59 Pr | 9 | 1 | 0 | 0.0091 | 0.0083 | 0.0109 | 5 | 4 | 1 | 0.006 | 0.0035 | 0.0084 |
| 68 Er | 10 | 0 | 0 | 0.156 | 0.156 | 0.0155 | 10 | 0 | 0 | 0.179 | 0.179 | 0.0221 |
| 71 Lu | 10 | 0 | 0 | 0.12 | 0.12 | 0.0346 | 10 | 0 | 0 | 0.137 | 0.137 | 0.0348 |
| 75 Re | 0 | 7 | 3 | | 0.001 | 0. | 1 | 5 | 4 | 0.018 | 0.0027 | 0.0161 |
| 76 Os | 1 | 6 | 3 | 0.017 | 0.0026 | 0.0152 | 0 | 4 | 6 | | 0.001 | 0. |
| 77 Ir | 5 | 4 | 1 | 0.0236 | 0.0123 | 0.0374 | 6 | 4 | 0 | 0.0257 | 0.0158 | 0.0427 |
| 78 Pt | 1 | 5 | 4 | 0.022 | 0.0031 | 0.0199 | 0 | 4 | 6 | | 0.001 | 0. |
| 82 Pb | 2 | 4 | 4 | 0.009 | 0.0026 | 0.0105 | 3 | 5 | 2 | 0.0077 | 0.003 | 0.0098 |

Figure 3A:
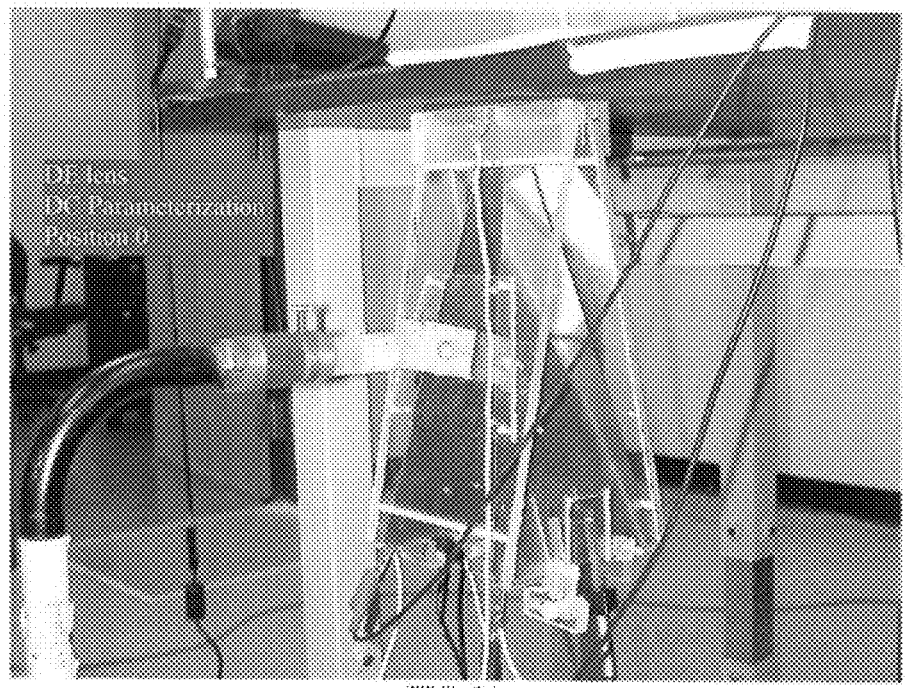
FIGS. 3A-3E are photographs of embodiments of the DE Lens.
Figure 3B:
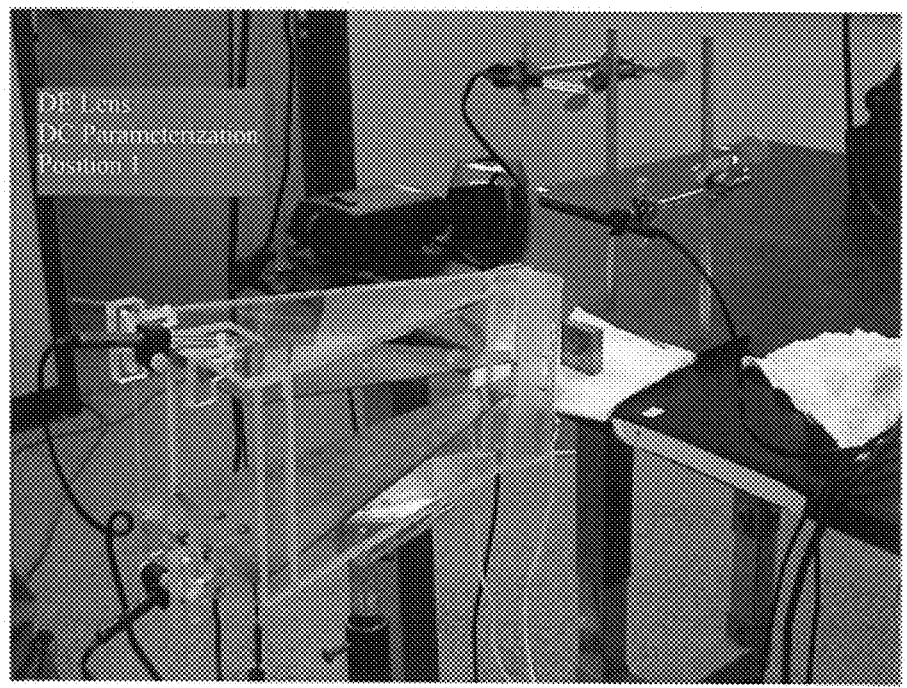
Figure 3C:
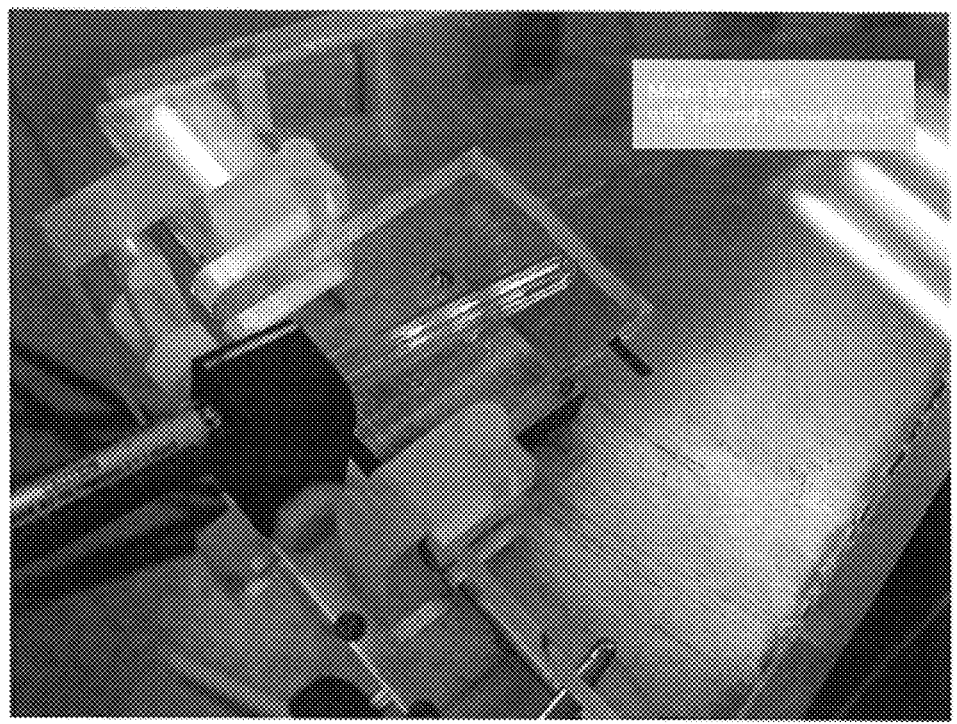
Figure 3D:
Figure 3E:
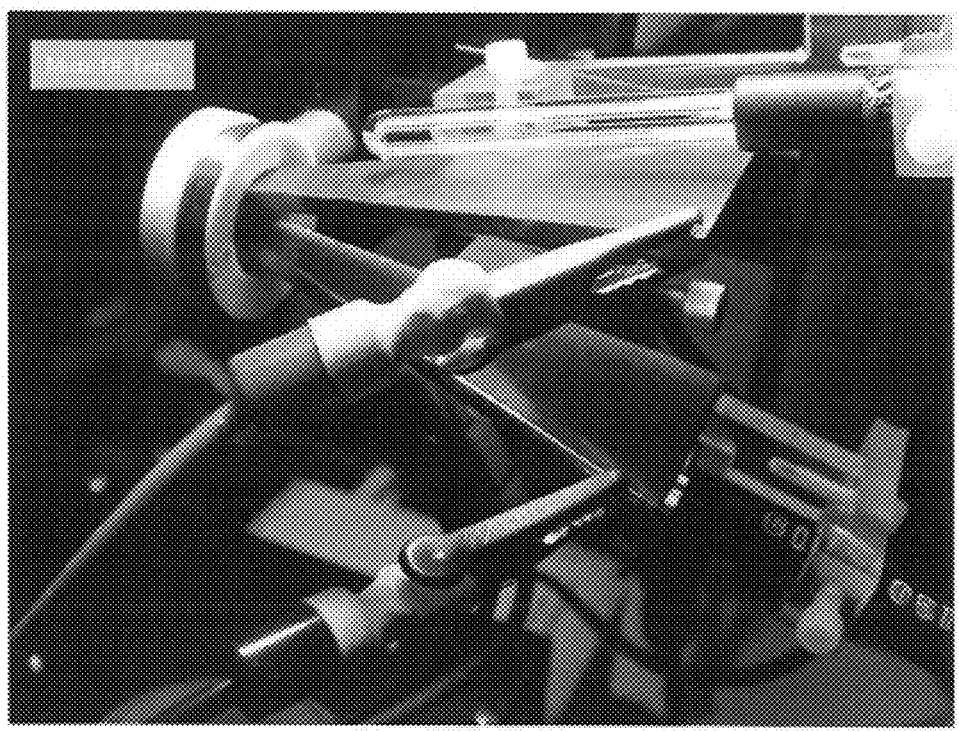
Figure 3F:
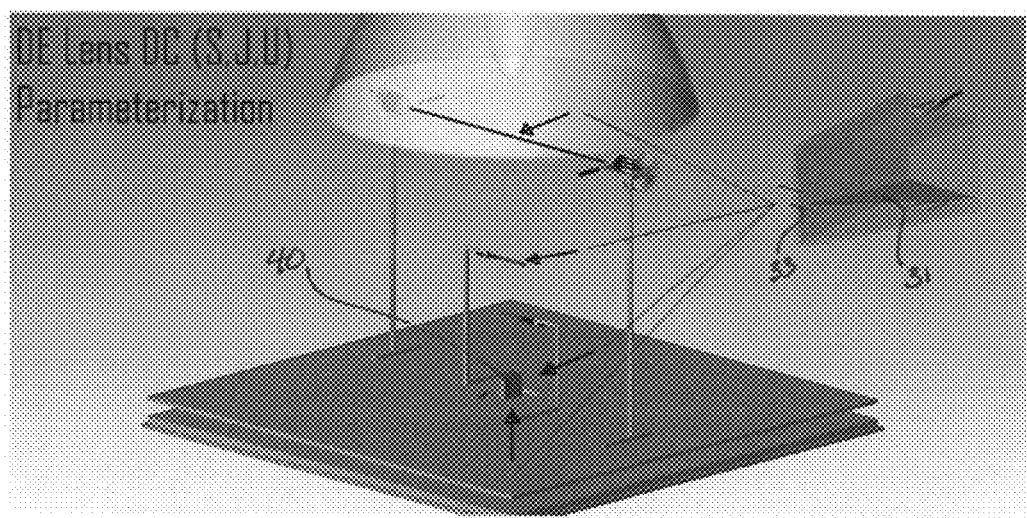
FIGS. 3F and 3G are schematics of the DE Lens assembly.
Figure 3G:
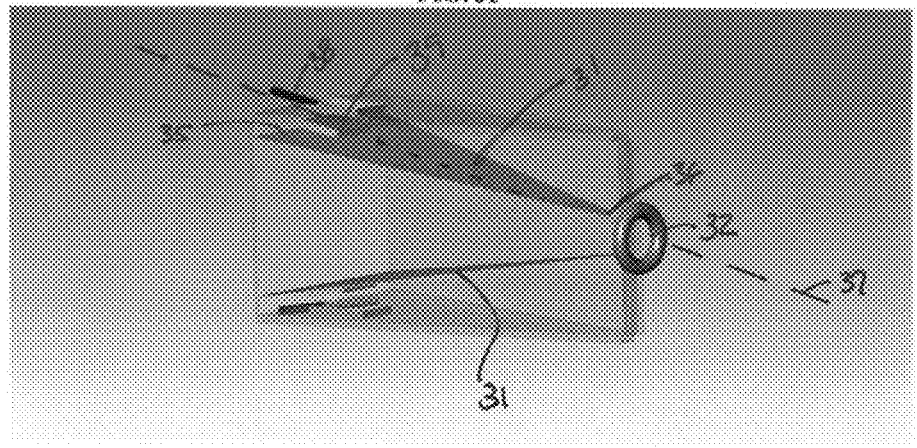

The invention also includes a device for focusing and directing energy. (See FIG. 3.) An embodiment of the invention includes a DE Lens, or apparatus, comprising two polarizers or columnators. Referring to FIG. 3G, the polarizers or columnators are conductive non-intersecting surfaces 31 and at least one phase modulator or polarizer, e.g., two electrodes (33 FIG. 3F) or a toroid 32, each operably connected to a DC and/or an AC power supply (not shown), wherein:

a. Each surface 31 has a distal end 35, a proximal end 36, a longitudinal axis 37 directed along the path connecting the distal and proximal ends and a latitudinal axes perpendicular to the longitudinal axis;

b. the surfaces spatially oppose each other;

c. the latitudinal axes are preferably parallel;

d. the longitudinal axes are preferably non-parallel;

e. the longitudinal axes are preferably linear and/or the surfaces are preferably planar;

f. the distance between the proximal ends of the surfaces is preferably less than the distance between the distal ends of the surfaces;

g. each modulator 32 (e.g., needle or toroid) is placed proximally to the proximal end of a surface while the conductive plate(s) are placed proximal to the distal end of the surface; and h. the positive termini 38 of the DC and AC power supplies are connected to the surfaces and the negative termini of the DC and AC power supplies (not shown)

are connected to the modulators or polarizers (e.g. the electrodes or toroid). Preferably, the DC supply, without AC supply, is connected to the distal end; AC supply, without DC supply, is connected to the toroid and DC supply with an AC power overlay is connected to the distal end. It will be appreciated that variations of this configuration is possible.

The preferred geometry is illustrated in the figures. The conducting surfaces are preferably made of copper (or are selected to be the same material as the material to be tailored) and are preferably planar. It would be noted that non-planar (e.g., convex or concave) surfaces can also be employed. Advantageously, the surfaces can be thin sheets of copper (e.g., less than 1 cm thick, e.g. about 5 mm thick). The surface area of the surfaces can vary widely and include small surfaces, as in the Micro Lens and Needle Lens, and large surfaces, as in the Macro Lens, relative to the material or target (e.g., radiation source) to be modified or tailored.

The power supplies that can be used in this apparatus can be the same as those discussed above and the contents of the above are incorporated herein by reference. As above, an AC frequency can be applied by the AC power supply and, preferably, overlayed on the DC power.

As shown in the illustrations, the distance between the proximal surfaces is less than about 20 cm, preferably less than about 10 cm, such as less than 5 cm. The distance between the distal surfaces is less than about 25 cm, preferably less than about 15 cm, such as less than 10 cm.

In a preferred embodiment, a tailored material operating as a forcing function 39 is attached to or incorporated into a polarizer and/or columnator. Preferred forcing functions are tailored materials, such as those made in accordance with U.S. Pat. No. 7,238,297, which is incorporated herein by reference in its entirety. The polarizer or columnator can be made from the tailored material, or forcing function. Alternatively, the forcing function can be layered on a part or all of the polarizer or columnator. The figures illustrate a rectangular element layered on the exterior, distal end of the DE Lens. In embodiments, the forcing function can be welded, glued, or attached using a compression fastener optionally using a conductive paste (e.g., silver paste) onto the polarizer or columnator.

As discussed above, the polarizer is connected (directly or indirectly) to a power supply. In one embodiment, the electrode from the power supply is connected to the forcing function thereby supplying power to the columnator.

The DE Lens is preferably configured such that the proximal ends of the surfaces are radially directed towards the material to be tailored 40. See FIG. 3F. The lens can be placed in, outside or above the CPT Cage, aligned along the radius, with the material to be tailored residing within the CPT Cage. In one embodiment, the surfaces are above the cylindrical space and the longitudinal axis is directed at the center of the material to be tailored. In another embodiment, the proximal ends of the surfaces are directed to the sides of the cylindrical space.

A method of modifying the electronic structure of a material within the apparatus comprising the steps of: (1) applying power in a sequence to one or more rings and/or surfaces of an apparatus as described herein, and (2) applying power in a sequence to one or more of the radiation sources.

The following table provides examples of suitable power supplies and frequency generation arrangements.

Figure 7A:
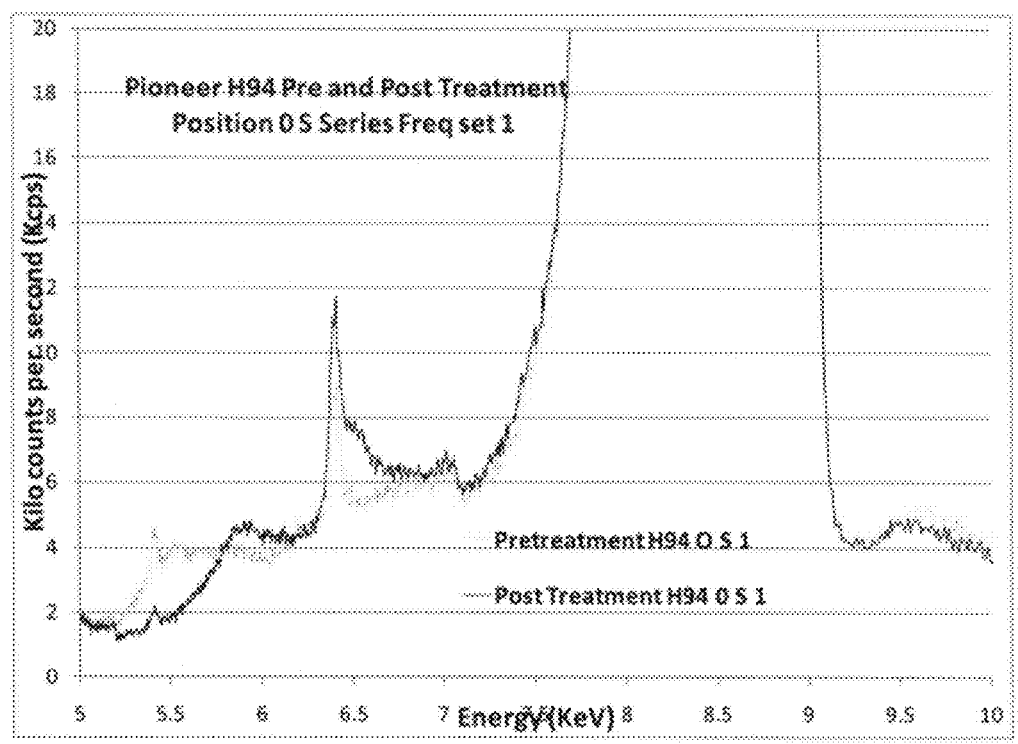
FIGS. 7A-7P represent the XRF analysis of embodiments employing the DE Lens.
Figure 7B:
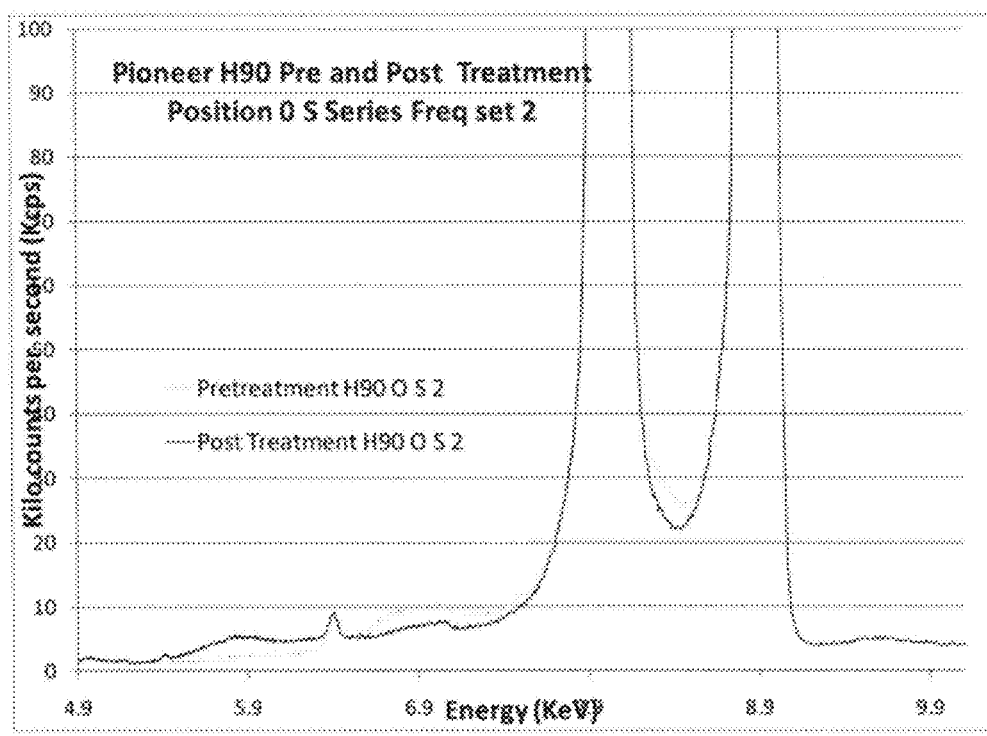
Figure 7C:
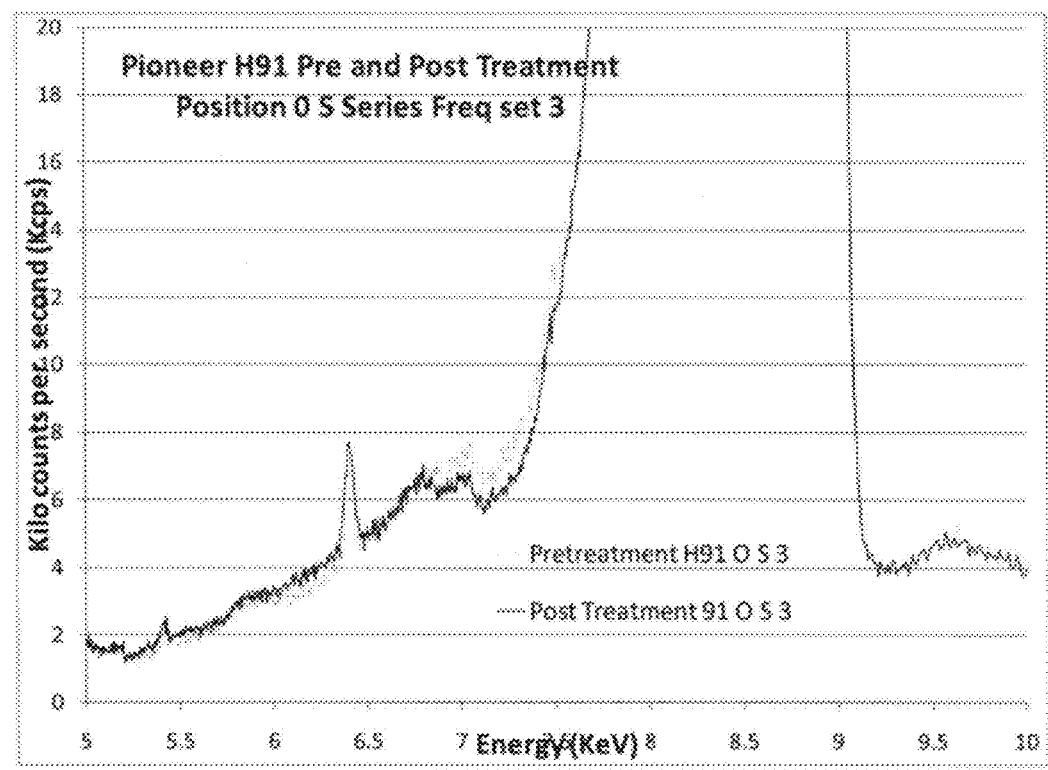
Figure 7D:
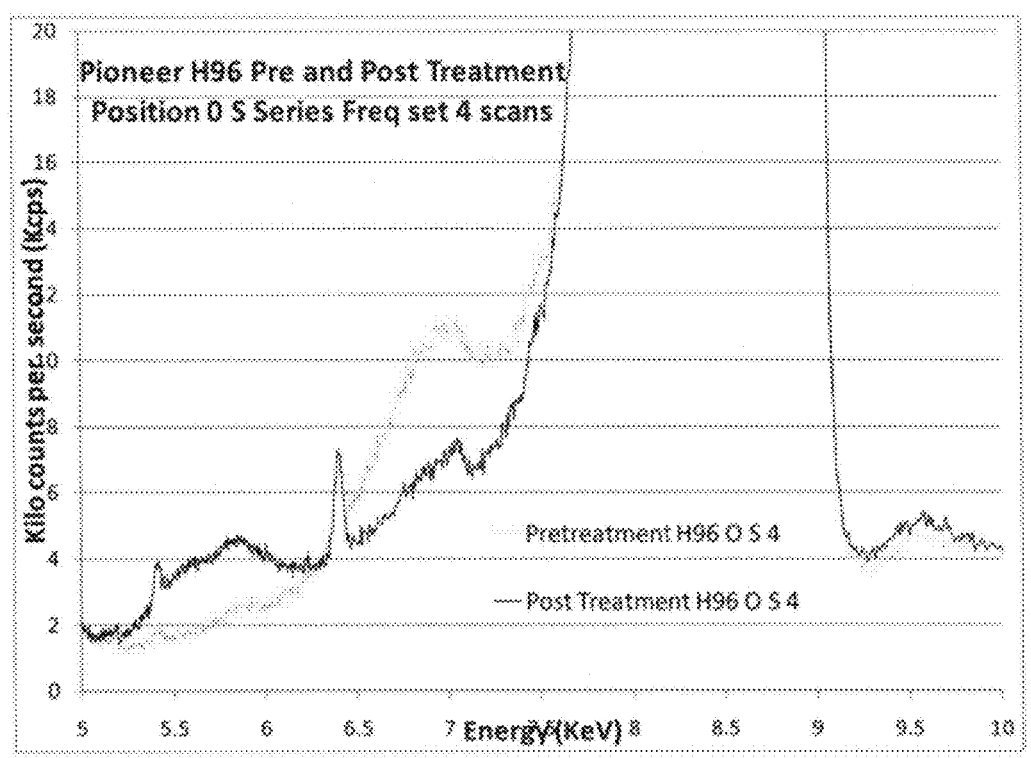
Figure 7E:
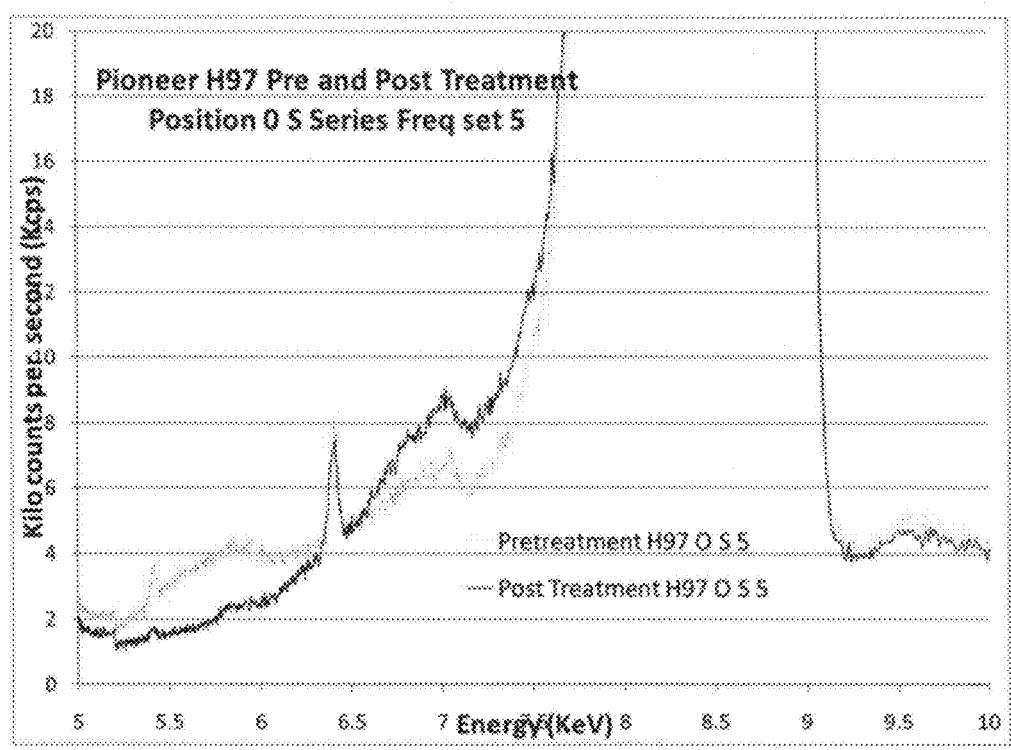
Figure 7F:
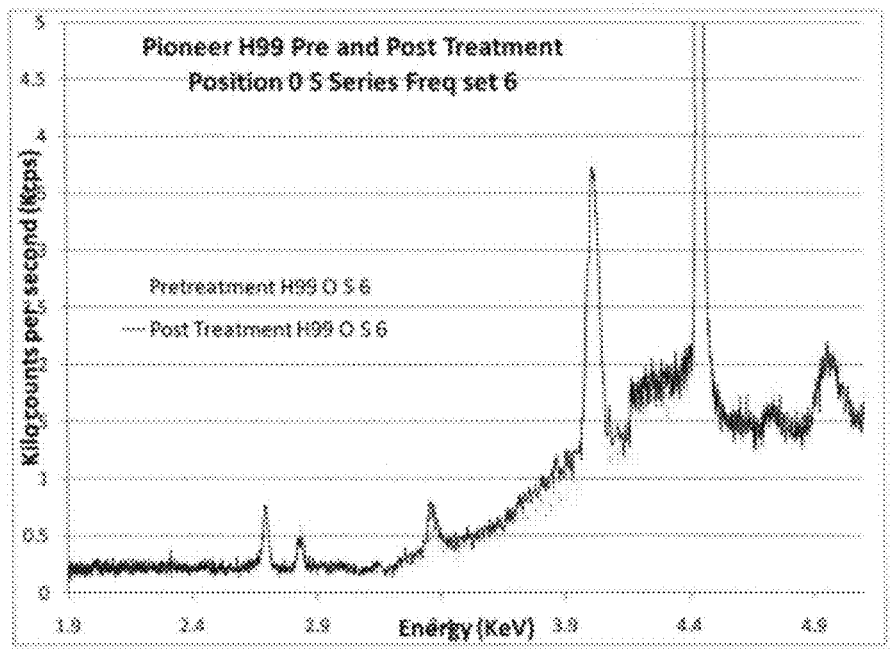
Figure 7G:
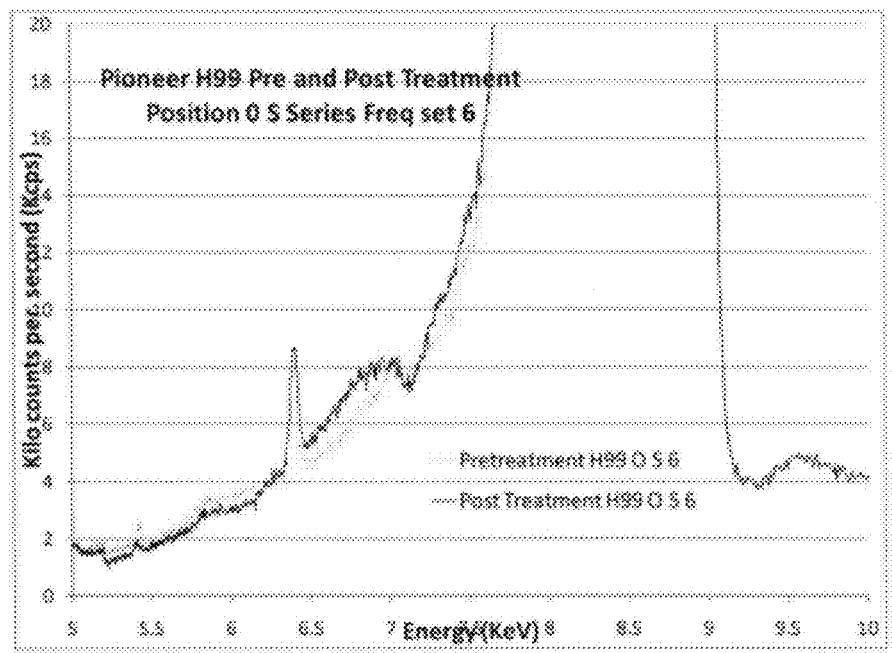
Figure 7H:
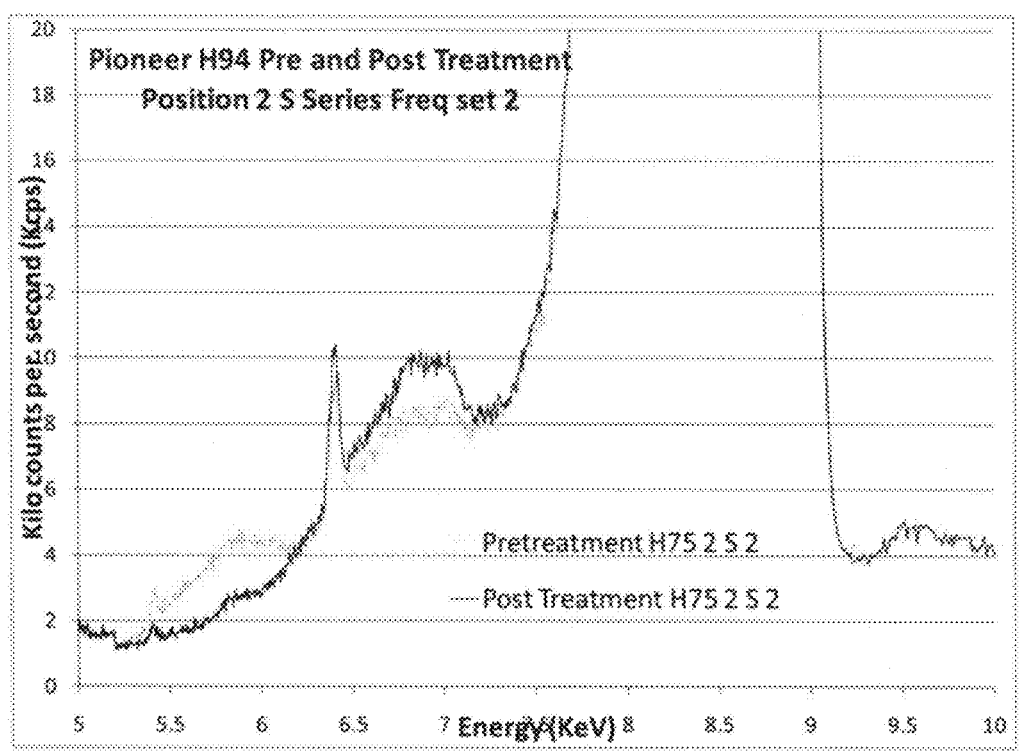
Figure 71:
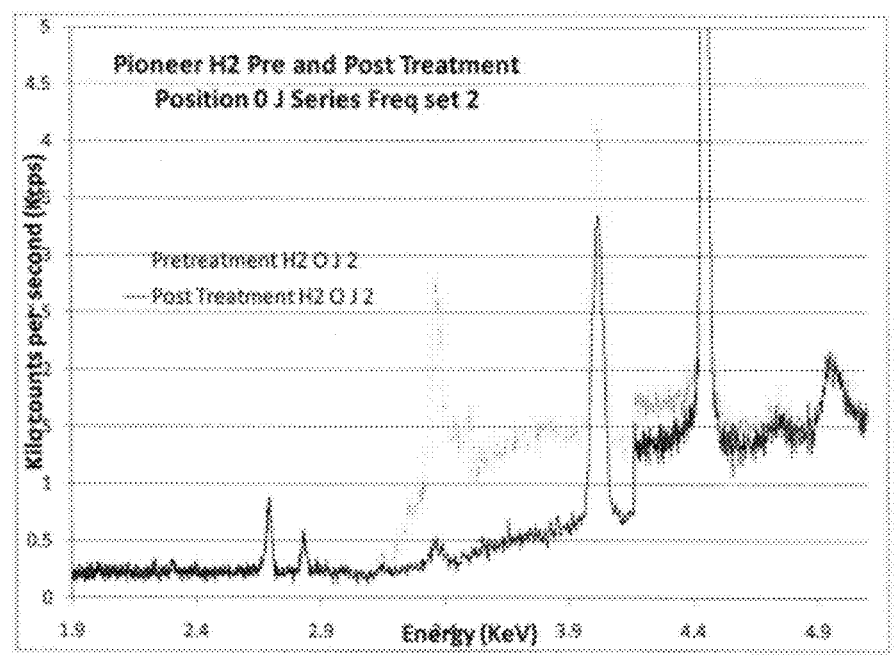

| Experimental Protocol | | | | |
|---|---|---|---|---|
| DE Lens Position | DC Pattern | AC Freq Set | Experimental Sample | Experimental Results |
| 0 | S | 1 | 14-07-03-H94 | Spectral Changes:<br>Peak Modulation (same centroid)<br>Peak Broadening/Narrowing<br>Illustration:<br>See FIG. 7A |
| 0 | S | 2 | 14-07-03-H90 | Spectral Changes:<br>Peak Broadening/Narrowing<br>Illustration:<br>See FIG. 7B |
| 0 | S | 3 | 14-07-03-H91 | Spectral Changes:<br>Peak Modulation (same centroid)<br>Illustration:<br>See FIG. 7C |
| 0 | S | 4 | 14-07-03-H96 | Spectral Changes:<br>Peak Modulation (same centroid)<br>Peak Broadening/Narrowing<br>Illustration:<br>See FIG. 7D |
| 0 | S | 5 | 14-07-03-H97 | Spectral Changes:<br>Peak Modulation (same centroid)<br>Peak Broadening/Narrowing<br>Illustration:<br>See FIG. 7E |
| 0 | S | 6 | 14-07-03-H99 | Spectral Changes:<br>Peak Modulation (same centroid)<br>Peak Broadening/Narrowing<br>Illustration:<br>See FIGS. 7F and 7G |
| 2 | S | 2 | 14-07-03-H75 | Spectral Changes:<br>Peak Modulation (same centroid)<br>Peak Broadening/Narrowing<br>Illustration:<br>See FIG. 7H |
| 0 | J | 2 | 14-10-03-H2 | Spectral Changes:<br>Peak Modulation (same centroid) |

Figure 7J:
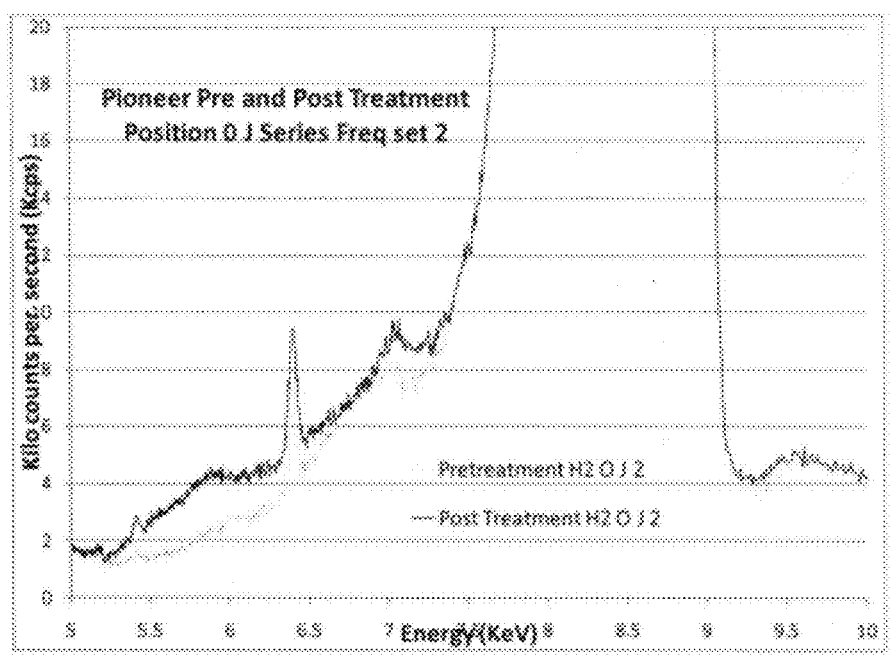
Figure 7K:
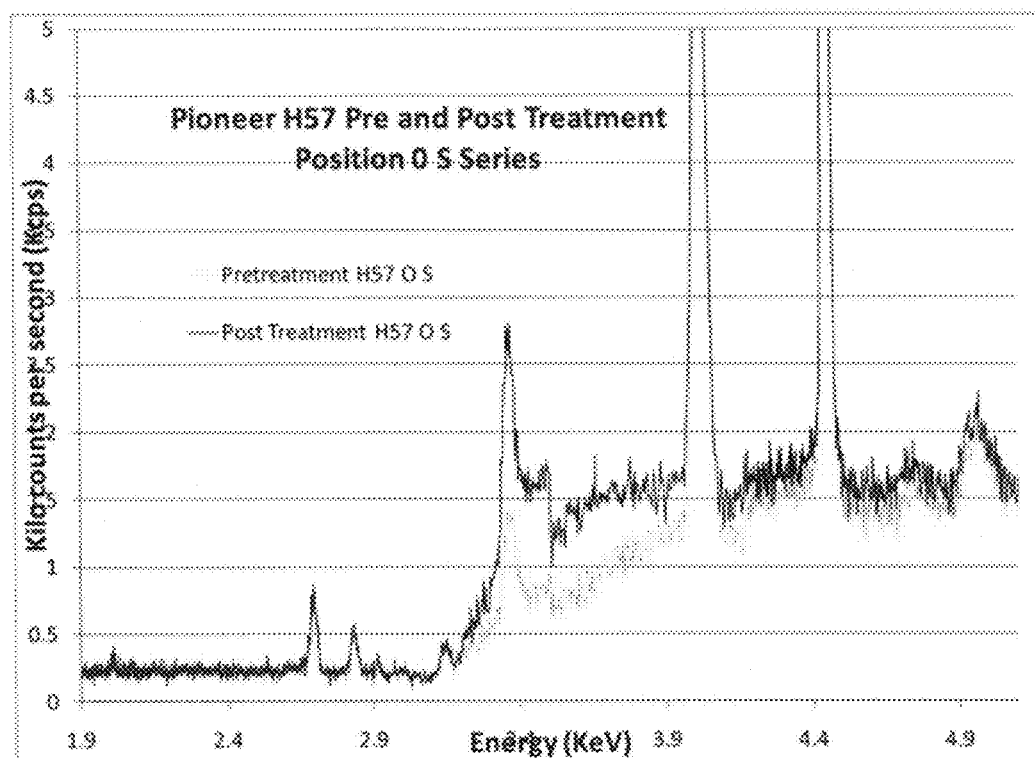
Figure 7L:
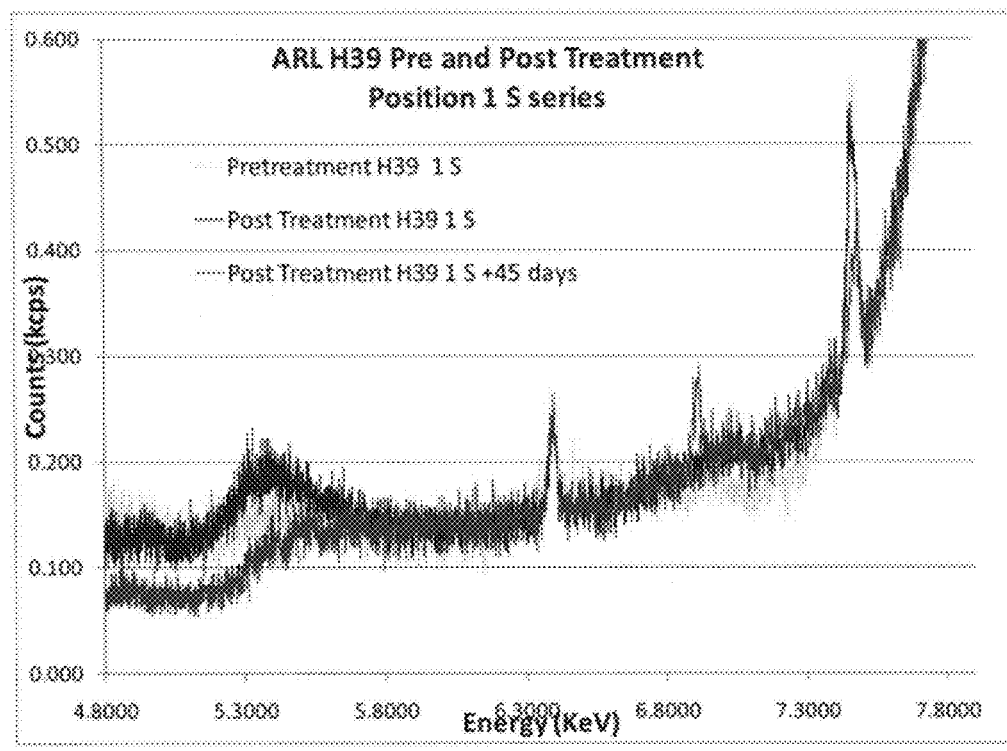
Figure 7M:
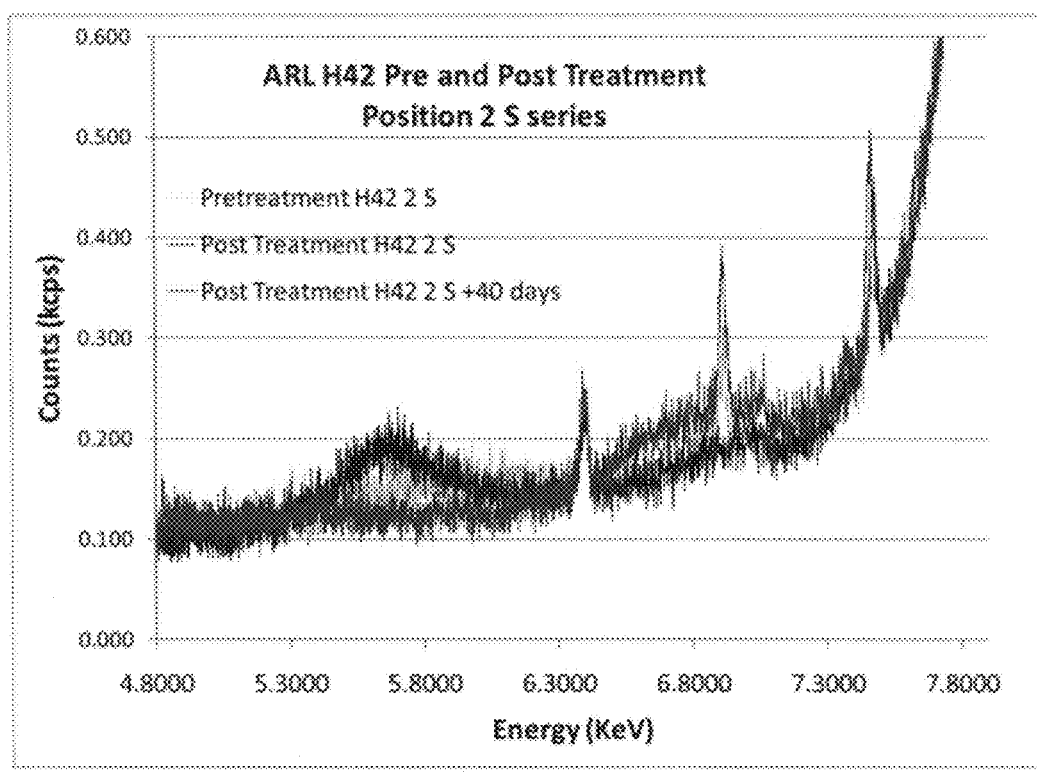
Figure 7N:
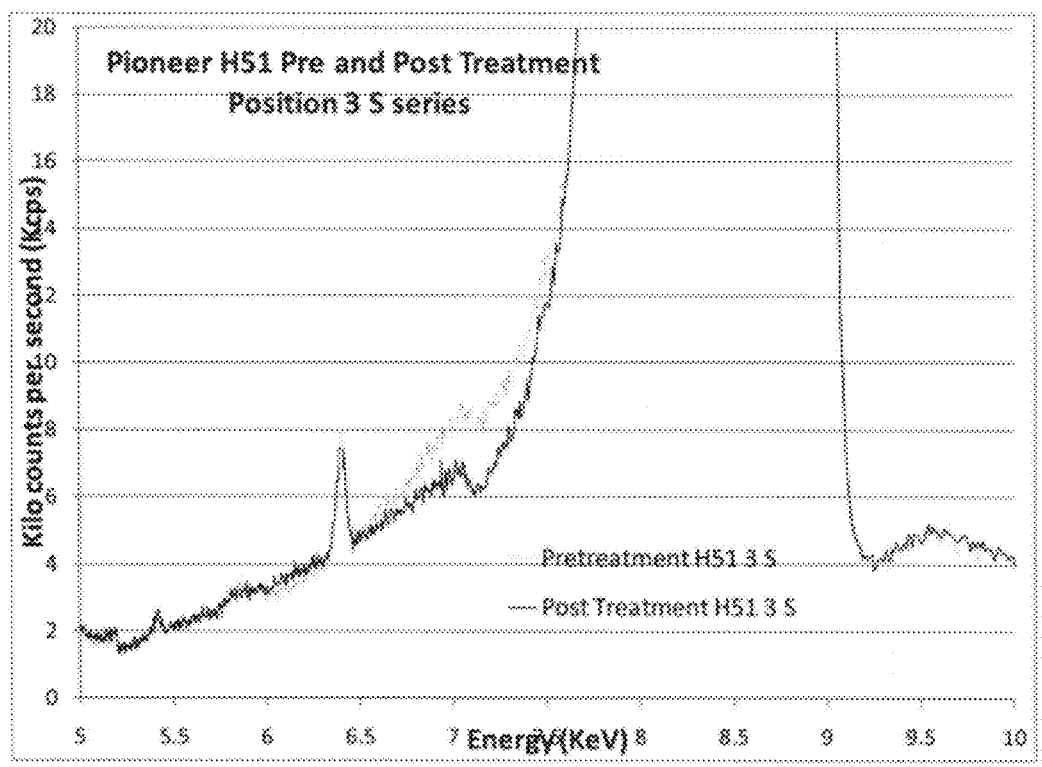
Figure 70:
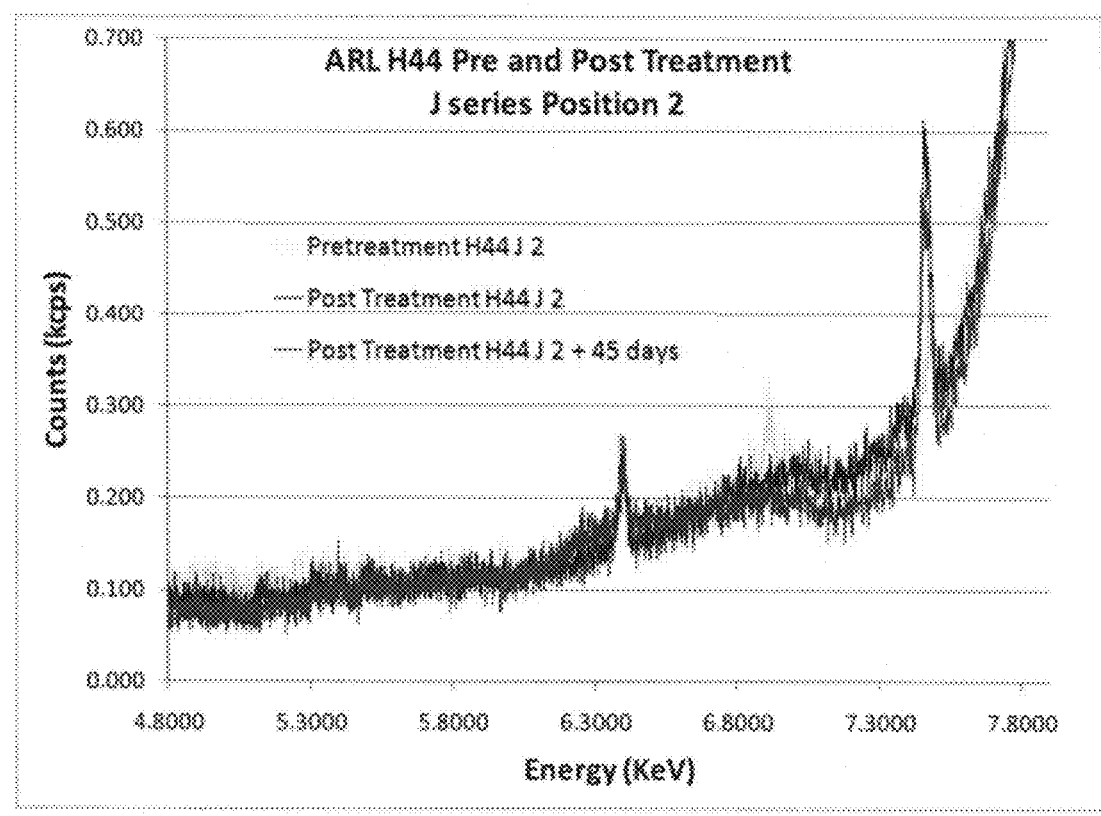
Figure 7P:
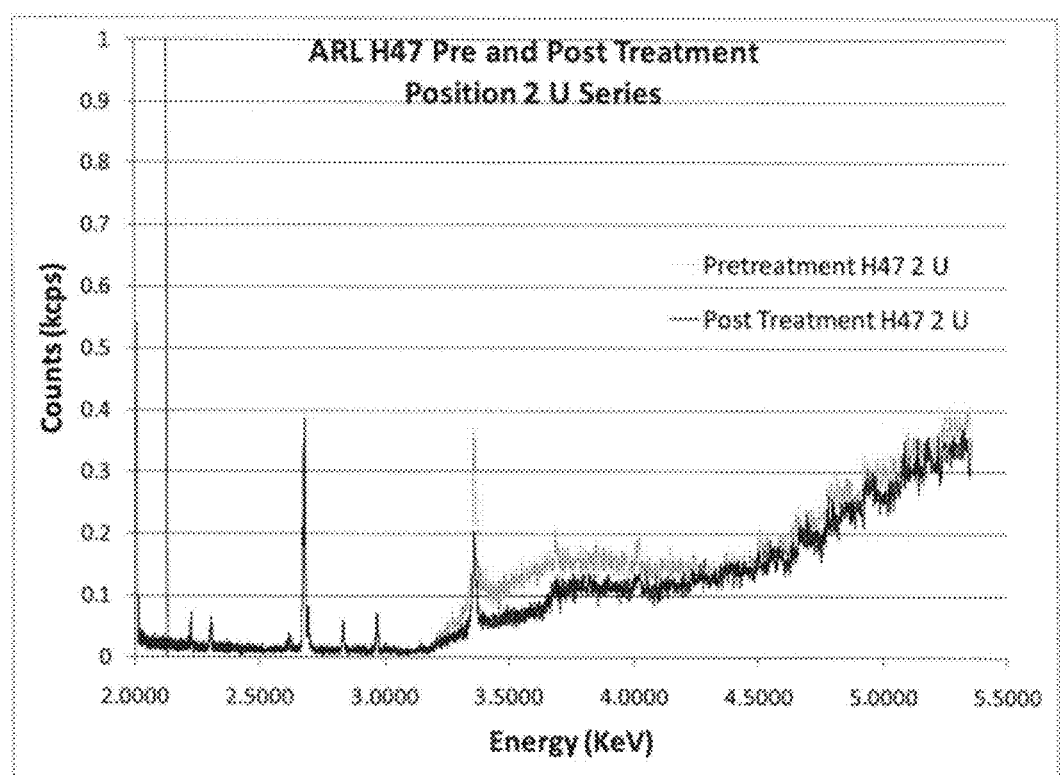

| | | | | |
|---|---|---|---|---|
| 0 | S | N/A | 14-07-03-H57 | Peak Broadening/Narrowing<br>Illustration:<br>See FIGS. 7I and 7J<br>Spectral Changes:<br>Peak Modulation (same centroid)<br>Peak Broadening/Narrowing<br>Illustration:<br>See FIG. 7K |
| 1 | S | N/A | 14-07-03-H39 | Spectral Changes:<br>Peak Broadening/Narrowing<br>Illustration:<br>See FIG. 7L |
| 2 | S | N/A | 14-07-03-H42 | Spectral Changes:<br>Peak Modulation (varying centroid)<br>Peak Disappearance/Creation<br>Peak Broadening/Narrowing<br>Illustration:<br>See FIG. 7M |
| 3 | S | N/A | 14-07-03-H51 | Spectral Changes:<br>Peak Modulation (same centroid)<br>Peak Broadening/Narrowing<br>Illustration:<br>See FIG. 7N |
| 2 | J | N/A | 14-07-03-H44 | Spectral Changes:<br>Peak Modulation (same centroid)<br>Peak Modulation (varying centroid)<br>Peak Disappearance/Creation<br>Illustration:<br>See FIG. 7O |
| 2 | U | N/A | 14-07-03-H47 | Spectral Changes:<br>Peak Modulation (same centroid)<br>Peak Broadening/Narrowing<br>Illustration:<br>See FIG. 7P |

Entire AC Frequency Set

| | | | | |
|---|---|---|---|---|
| Pattern 1 | Freq Sweep $f_1$ | Freq Sweep $f_2$ | | $f_1$ pattern immediately[1] followed by $f_2$ pattern then repeat immediately; run plan operations are occurring simultaneously and continuously |
| Pattern 2 | Freq Sweep $f_3$ | Freq Sweep $f_2$ | | $f_3$ pattern immediately followed by $f_2$ pattern then repeat immediately; run plan operations are occurring simultaneously and continuously |
| Pattern 3 | Freq Sweep $f_1$ | Freq Sweep $f_3$ | | $f_1$ pattern immediately followed by $f_3$ pattern then repeat immediately; run plan operations are occurring simultaneously and continuously |
| Pattern 4 | Freq Sweep $f_1$ | Freq Sweep $f_2$ | Freq Sweep $f_3$ | $f_1$ pattern immediately followed by $f_2$ pattern immediately followed by $f_3$ pattern then repeat immediately; run plan operations are occurring simultaneously and continuously |
| Pattern 5 | Freq Sweep $f_3$ | Freq Sweep $f_2$ | Freq Sweep $f_1$ | $f_3$ pattern immediately followed by $f_2$ pattern immediately followed by $f_1$ pattern then repeat immediately; run plan operations are occurring simultaneously and continuously |
| Pattern 6 | Freq Sweep $f_1$ | Freq Sweep $f_3$ | Freq Sweep $f_2$ | $f_1$ pattern immediately followed by $f_3$ pattern immediately followed by $f_2$ pattern then repeat immediately; run plan operations are occurring simultaneously and continuously |

-continued

| | Final Frequency Sweep Selection Patterns | | | |
|---|---|---|---|---|
| Sweep Pattern | Frequencies | Wave Pattern | Up (Sec) | Down (Sec) |
| $f_1$ | 10.1 Hz to 1.4 kHz | Triangle Wave | 5 | 3 |
| $f_2$ | 557 Hz to 474 kHz | Sinusoidal Wave | 6 | 6 |
| $f_3$ | 626 kHz to 2.83 MHz | Square Wave | 9 | 6 |

| Representative Signal Patterns (S, J, U) | | | | | | | | | | |
|---|---|---|---|---|---|---|---|---|---|---|
| Frequency (AC) | Ln (f) | Log (f) | Linear_Norm_e, 10 | Linear | Hold_T | SWT_Up | SWT_Down | Up_Cycle | Down_Cyle | |
| S_Pattern | | | | | | | | | | |
| 200 | 5.30 | 2.30 | 35 | 0 | 10.0 | 2.00 | 3.00 | 7.00 | | 10 sec hold |
| 1,700,000 | 14.35 | 6.23 | 95 | 49 | 5.0 | 2.00 | 3.00 | 7.00 | 13.00 | |
| 157,000 | 11.96 | 5.20 | 79 | 4 | 5.0 | 2.00 | 3.00 | 12.00 | 8.00 | |
| 2,830,000 | 14.86 | 6.45 | 99 | 81 | 10.0 | 2.00 | 3.00 | | 8.00 | 10 sec hold |
| | | | | | | | | Total Time | 55.00 | (+/−) 5 sec |
| J_Pattern | | | | | | | | | | |
| 200 | 5.30 | 2.30 | 352 | 0 | 10.0 | 2.00 | 3.00 | 7.00 | | 10 sec hold |
| 10.1 | 2.31 | 1.00 | 153 | 0 | 5.0 | 2.00 | 3.00 | 7.00 | 13.00 | |
| 1,400 | 7.24 | 3.15 | 481 | 0 | 5.0 | 2.00 | 3.00 | 12.00 | 8.00 | |
| 557,000 | 13.23 | 5.75 | 878 | 159 | 10.0 | 2.00 | 3.00 | | 8.00 | 10 sec hold |
| | | | | | | | | Total Time | 55.00 | (+/−) 5 sec |
| U_Pattern | | | | | | | | | | |
| 1,700,000 | 14.35 | 6.23 | 476 | 243 | 10.0 | 2.00 | 3.00 | 7.00 | | 10 sec hold |
| 200 | 5.30 | 2.30 | 176 | 0 | 5.0 | 2.00 | 3.00 | 7.00 | 13.00 | |
| 987 | 6.89 | 2.99 | 229 | 0 | 5.0 | 2.00 | 3.00 | 12.00 | 8.00 | |
| 235,500 | 12.37 | 5.37 | 410 | 34 | 10.0 | 2.00 | 3.00 | | 8.00 | 10 sec hold |
| | | | | | | | | Total Time | 55.00 | (+/−) 5 sec |

| | | |
|---|---|---|
| S_Max Voltage, Vdc | 100 | |
| J_Max Voltage, Vdc | 1,000 | |
| U_Max Voltage, Vdc | 500 | |
| Max Std Freq, AC | 3,500,000 | |
| Sweep Up, sec | 6 | (factors of 3) |
| Sweep Down, sec | 9 | (factors of 3) |
| Initial Conditions | 1,000 | Volt |
| Hold at Initial Conditions | 240 | seconds |
| Ramp to Pattern | 10 | seconds |

[1] Time to repeat reportedly <0.5 sec. Continue frequency sweep repetitions until run is complete, e.g., run sequence: DC component initiated, AC component initiated, AC component complete, DC component complete.

The invention further relates to the integration of a resonant modulator. Thus, the CPT Cage can be optionally coupled to a resonant modulator and a collector 43.

Figure 4A:
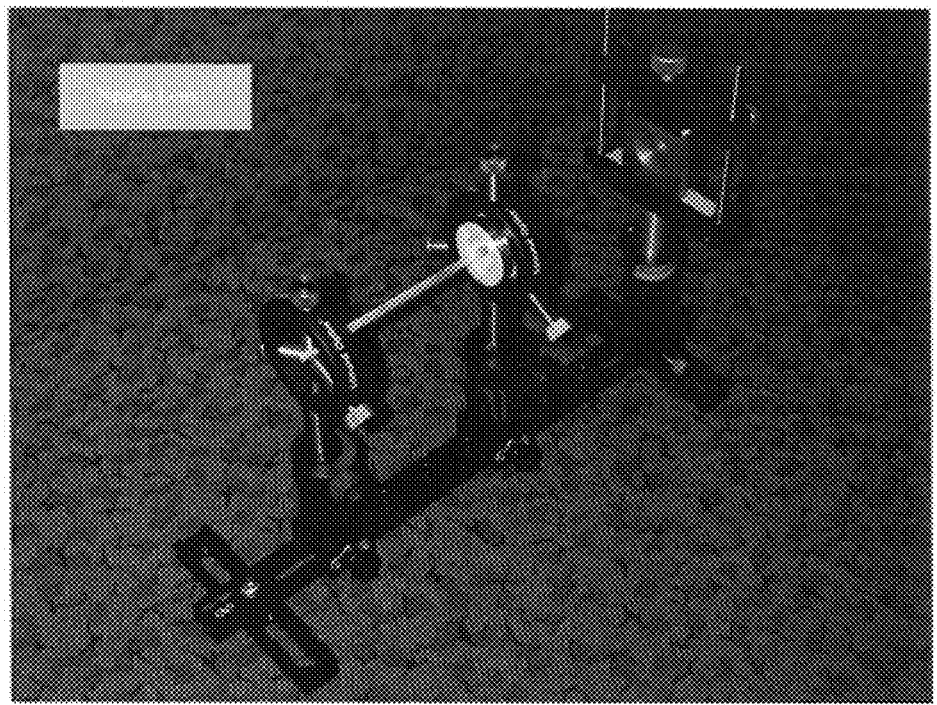
FIGS. 4A-4C are illustrations of the Needle Lens.
Figure 4B:
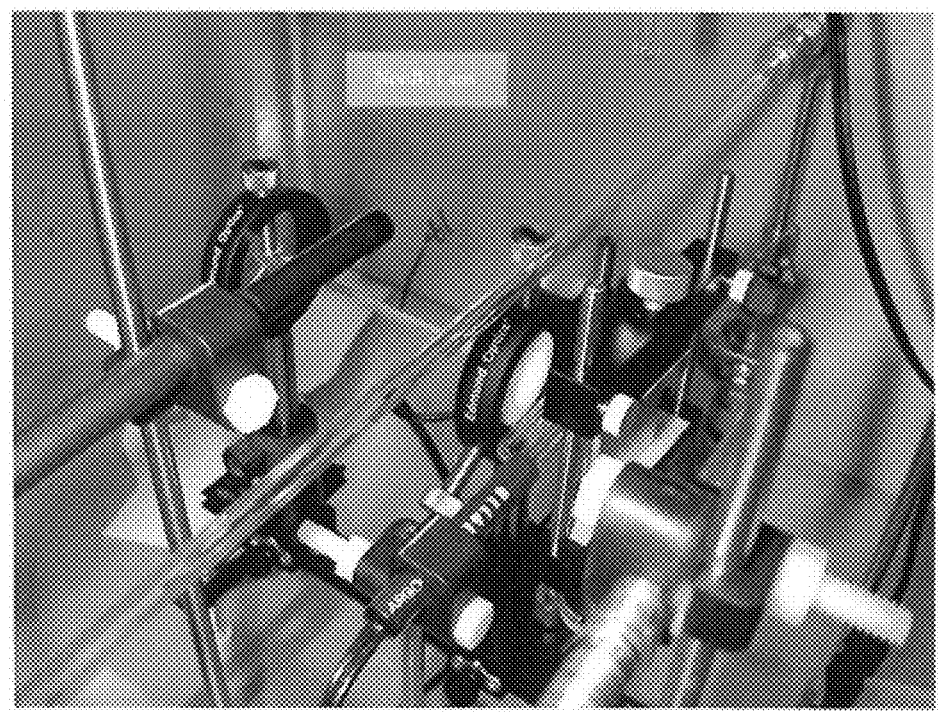
Figure 4C:
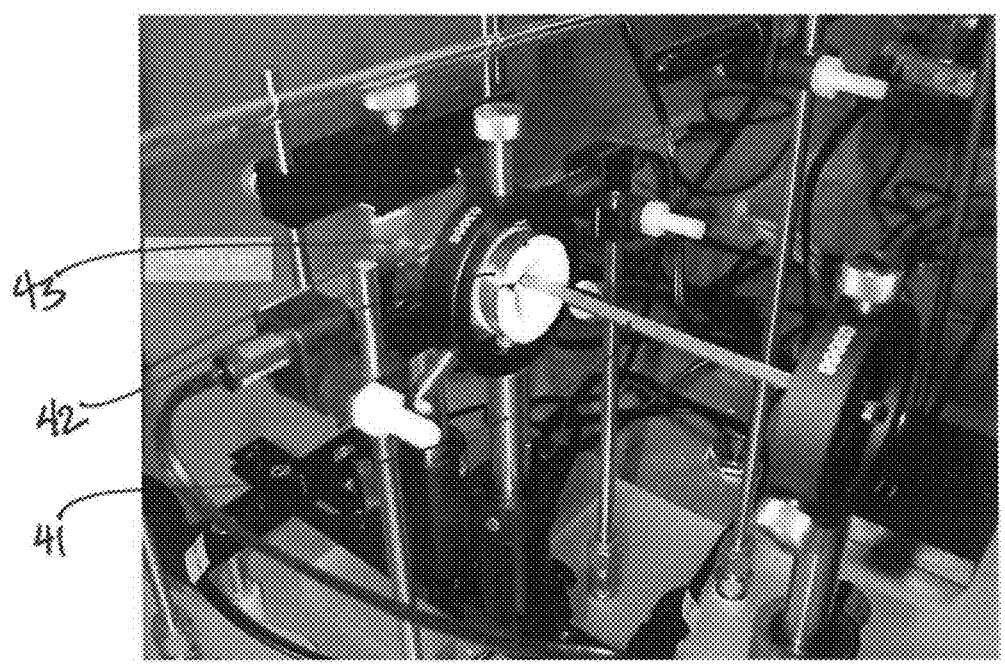
Figure 5A:
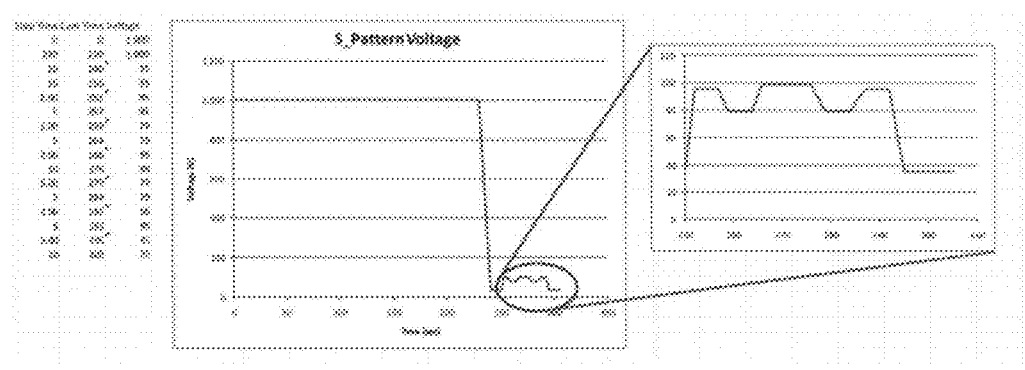
Figure 5B:
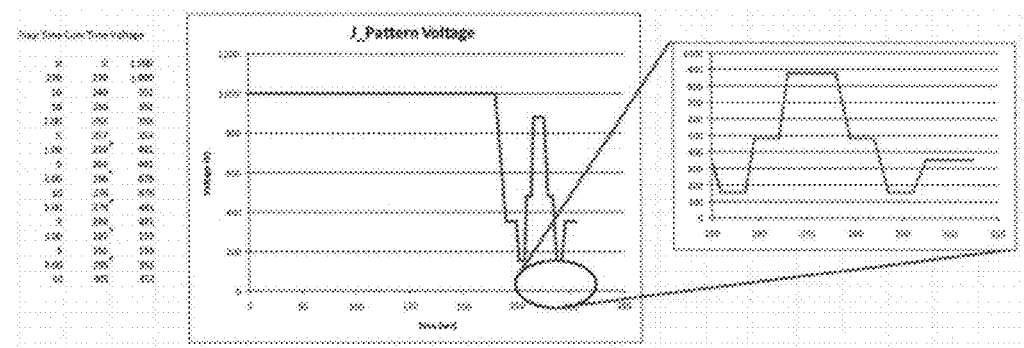

As illustrated in FIG. 4C, the resonant modulator can include a toroid coil 42 and an exciter 41. In one embodiment, the exciter is an elongated conducting material connected to DC source with AC overlay. In a preferred embodiment, the elongated conducting material is shaped as a rod and is manufactured from copper, including tailored copper. In one embodiment, the exciter is needle shaped and is placed at or near the toroid axis. In referring to the exciter, the end that is closer to the toroid coil is considered the proximal end and the end that is farther away from the coil is considered the distal end. In a preferred embodiment, a power supply is connected to the exciter in which the cathode is connected to the distal end of the exciter and the anode is connected to the collector. A frequency can be applied to the toroid continuously or in varying pattern. The toroid is typically placed at the proximal end of the exciter.

In a preferred embodiment, the toroid coil is copper and is operably connected to an AC, DC or an AC current with DC overlay, such as those used above with respect to the CPT Cage. In a preferred embodiment, the toroid coil and/or the exciter are composed of hot metal tailored material, more preferably hot metal tailored copper, such as those described in U.S. Pat. No. 7,238,297, which is incorporated herein by reference.

In a preferred embodiment, the collector and excitor are made from a conducting material. Preferably the material used to make the collector and exciter are the same and are, preferably copper. In a preferred embodiment, the collector has a concave side.

In an embodiment, the resonant modulator comprising a ring resonator and the exciter are positioned on one side of the CPT Cage while the collector is positioned on the opposite side. In one embodiment, both the resonant modulator and collector are placed outside the CPT Cage. In a preferred embodiment, the collector is placed opposite to the resonant modulator assembly in which the concave face of the collector is facing the CPT Cage or radiation source. Again, the apparatus can be placed in a closed system or box, as shown in FIGS. 2C and 4B.

Each apparatus described herein can be used with a tailoring device which provides electromagnetic energy to a material such that the material is tailored. Such devices are described in U.S. Ser. No. 11/063,694, for example. Preferably, such devices comprise steps of contacting a material, such as a tailored material or a gas, with at least two light, or radiation, sources. Such devices that do not rely upon molten metal processing include photonic tailoring devices. The radiation sources can be selected to provide a broad range of emitted wavelengths. For example, the radiation can range from infrared to ultraviolet wavelengths. In one embodiment, examples of preferred radiation sources emit into the range of 160 nm to 1000 nm; in another embodiment, examples of preferred radiation sources emit and into the range of 180 nm to 1100 nm; and in a more preferred embodiment examples of preferred radiation sources emit into the range of 200 nm to 900 nm. Preferably the radiation sources emit a wavelength within a range of 100 nm of the peak emission. The radiation can be conveniently supplied by short arc lamps, high intensity discharge lamps, pencil lamps, lasers, light emitting diodes, incandescent, fluorescent, and/or halogen lamps for example. Examples of suitable high intensity discharge lamps include mercury vapor, sodium vapor and/or metal halide. Short-arc lamps include mercury, xenon or mercury-xenon lamps. Pencil lamps include neon, argon, krypton, xenon, short wave ultraviolet, long wave ultraviolet, mercury, mercury/argon, mercury/neon, and the like. The radiation can also include (or exclude), incandescent or fluorescent light and/or natural sources of light, such as electromagnetic radiation emitted by celestial bodies.

The radiation sources can optionally be used in combination with light shields or wavelength filters. Examples of suitable shields and filters can be obtained from UVP, Inc. (Upland, Calif.). The filters and shields can direct or modify the emission output. Examples of UVP Pen-Ray Filters include the G-275 filter which absorbs visible light while transmitting ultraviolet at 254 nm and the G-278 filter which converts shortwave radiation to long wave radiation at 365 nm. Pen-Ray Shields include Shield A which has a 0.04 inch ID hole for point-like source, Shield B which has a 0.31× 0.63 inch window, and Shield C which has a 0.19×1.5 inch window. Filters and shields can also be obtained from Newport Corp. (Irvine, Calif.). The Newport 6041 Short Wave Filter absorbs visible lines; the 6042 Long Wave Conversion Filter attenuates the 253.7 nm Hg line and fluoresces from 300-400 nm; and the 6057 Glass Safety Filter absorbs the 253.7 nm Hg line and attenuates the 312.6 nm line. The Aperture Shields offered by Newport include the 6038 Pinhole Shield which has a 0.040 inch (1 mm) diameter, the 6039 Small Aperture Shield which has a 0.313×0.375 inch window and the 6040 Large Aperture Shield with a 0.188×1.50 inch window. Filters and shields can also be obtained from Edmund Industrial Optics Inc. (Barrington, N.J.). The Edmund UV Light Shield A has a 1 mm inner diameter drilled hole; Shield B has a 7.9 mm×15.9 mm aperture; and Shield C has a 4.8 mm×38.2 mm aperture.

The orientation of the lamp with respect to the material can also impact upon the result obtained. Thus, in the embodiment where a gas is subjected to a radiation source, the radiation source can be fixed to direct the radiation directly towards, perpendicular or orthogonal, away or parallel to the conduit directing the gas, or its entry or exit point. The gases can be those discussed above or other gases, such as air, CO or oxygen. The radiation source can be positioned horizontally, vertically and/or at an angle above, below, across or from the conduit. For example, the base of a pencil lamp (or other radiation source) can be set at the same height of the conduit and the tip of the lamp directed or pointed toward the conduit. Alternatively, the base of the pencil lamp (or other radiation source) can be set at the height of the conduit and the lamp directed at a 30° (40°, 45°, 50°, 55°, 60°, or 90°) angle above or below the conduit. Alternatively, the base of the pencil lamp can be fixed above or below the level of the conduit. The tip of the pencil lamp can be pointed up or down, in the direction of the gas flow or against the gas flow or at another angle with respect to any of the above. Further, more than one of the same or different pencil lamps alone or in combination with other radiation sources can be used, set at the same or different heights, orientations and angles. The lamps can be presented in alternative orders (first xenon, then mercury or vice versa).

LEDs are a preferred addition due to their ability to pin and control the harmonics emitted. "LED", as used herein, is intended to include a light source wherein at least 90% of the emissions are +/−30 nm from a peak wavelength. Both light emitting diodes and laser diodes are intended. For example, LEDs emitting 530 nm, 740 nm and 365 nm wavelengths were used in the examples below and are illustrated in FIG. 1. In the example below, the 530 nm LED was positioned outside the cylindrical space and directed towards the $5^{th}$ ring, in a plane directed through the central axis of the cylindrical space and defined as being 0°. The 740 nm LED was also position outside the cylindrical space and directed towards the $3^{rd}$ ring, offset at 120° from the 530 nm LED. The 365 nm LED was also position outside the cylindrical space and directed towards the 1st ring, offset at 120° from each the 530 nm and 740 nm LEDs. The wavelengths selected can be modified. Preferably, the LED emitting the highest wavelength will be directed towards the center ring. In general, it will be desirable to place the LED close to the ring, for example, such as can occur if the lens of the LED is touching the ring.

It can be advantageous to employ additional light or radiation sources. For example, one or more pencil lamps can be used in addition to or alternatively with the LEDs. In an apparatus exemplified herein, several pencil lamps are illustrated. Two can be placed below the base, one parallel to the axis of the cylindrical space and perpendicular to it. Three can be placed above the cylindrical space, one parallel to the axis and two perpendicular, or orthogonal, to the axis. As shown in the figures, the orthogonal lamps do not intersect with the axis of the cylindrical space. This embodiment is particularly beneficial when matter is a gas or fluid that flows along the axis through a transparent conduit or tube during the process. These "exterior pencil" lamps can be symmetrically placed and/or equidistantly placed relative to the center ring.

Additionally or alternatively, the pencil lamps can be placed perpendicular to and intersecting with the axis of the cylindrical space. This embodiment may be particularly useful where the matter is a solid, such as a metal or a tailored metal.

Short arc lamps, e.g., the SHA-1 referred to herein, can also be added. In one embodiment, the SHA can be centered above the center ring. Such a device can be particularly useful where a solid material, such as a tailored ingot as described in U.S. Pat. No. 7,238,297, is disposed within the CPT Cage.

As discussed above, the present invention relates to tailoring matter and generating AEs or materials comprised of AEs. "Manufactured" or tailored matter, such as metals or alloys, exhibit a change in electronic structure, such as that seen in a fluid XRF spectrum. The word "fluid" is defined herein to mean changing or tending to change.

Metals that can be tailored according to the present invention are classified as p, d, or f block metals. Metals include transition metals such as Group 3 metals (e.g., scandium, yttrium, lanthanum), Group 4 metals (e.g., titanium, zirconium, hafnium), Group 5 metals (vanadium, niobium, tantalum), Group 6 metals (e.g., chromium, molybdenum, tungsten), Group 7 metals (e.g., manganese, technetium, rhenium), Group 8 metals (e.g., iron, ruthenium, osmium), Group 9 metals (e.g., cobalt, rhodium, iridium), Group 10 metals (nickel, palladium, platinum), Group 11 metals (e.g., copper, silver, gold), and Group 12 metals (e.g., zinc, cadmium, mercury). Metals of the present invention also include alkali metals (e.g., lithium, sodium, potassium, rubidium, and cesium) and alkaline earth metals (e.g., beryllium, magnesium, calcium, strontium, barium). Additional metals include lanthanides, aluminum, gallium, indium, tin, lead, boron, germanium, arsenic, antimony, tellurium, bismuth, thallium, polonium, astatine, and silicon.

The present invention also includes alloys of metals. Alloys are typically eutectic or ternary mixtures of metals. Alloys of the present invention can be formed, for example, by melting together two or more of the metals listed above. Preferred alloys include those comprised of copper, gold, and silver; tin, zinc, and lead; tin, sodium, magnesium, and potassium; iron, vanadium, chromium, and manganese; nickel, tantalum, hafnium, and tungsten; copper and ruthenium; nickel and ruthenium; cobalt and ruthenium; cobalt, vanadium and ruthenium; and nickel, vanadium and ruthenium. Materials other than metals can also be tailored in accordance with the invention.

The present invention also includes alloys of metals or mixtures of other materials. Alloys are typically mixtures of metals. Alloys of the present invention can be formed, for example, by melting together two or more of the metals listed above.

In one embodiment, the matter has been tailored previously, as in accordance with the methods described in U.S. Pat. Nos. 6,572,792 and 7,238,297.

Additionally, the invention can be used to tailor gases, such as oxygen, carbon dioxide, nitrogen, halogen and noble gases. Gas, such as nitrogen, hydrogen or a noble gas, can be added during a cycle or iteration, except where it is specified that gas addition is ceased prior to that cycle or iteration. The gas provides a third body effect for the reaction facilitating energy exchange. For example, hydrogen, helium, nitrogen, neon, argon, krypton, xenon and carbon monoxide can be added. Oxygen, halides, gaseous halides, and/or sulfur containing compounds can also be added (e.g., $CO_2$, $F_2$, HCl, $H_2S$, $SiCl_4$). In a preferred embodiment, the gas is added as a mixture. A preferred mixture comprises argon, helium, neon and/or krypton. Preferably, at least 50%, more preferably at least 80% such as at least 90% by volume argon, helium or hydrogen is present in the mixture. Particularly preferred mixtures, by volume, include (1) 93% argon, 5% helium and 2% neon; (2) 92% argon, 5% helium and 3% neon; (3) 95% argon and 5% helium or neon; (4) 95% helium and 5% krypton; (5) 95% nitrogen and 5% helium; (6) 97% helium and 3% neon (optionally trace amounts of krypton); (7) 97% argon and 3% neon; (8) 60% argon and 40% helium (optionally trace amounts of neon, hydrogen and/or krypton); (9) 49.5% hydrogen, 49.5% helium and 1% neon. In selecting the specific combination and concentrations of the gases, the following factors should be considered: spectral line position, momentum/energy exchange requirements, and spectral sequence constraints.

In one embodiment, the gas and/or material are exposed to electromagnetic radiation. The exposure can be applied in a continuous or batch mode. For example, the radiation source can be applied as the gas or material moves through a conduit. The conduit is preferably not opaque and is more preferably translucent or transparent. The radiation can be applied to the material in an open or closed system. A closed system entails exposing the gas to the specified radiation in the substantial absence of other radiation sources (e.g., visible light, magnetic fields above background). This can be easily accomplished by building a black box surrounding a segment of the conduit and placing the radiation source(s) within the black box. An open system can also be employed where the radiation source(s) are not shielded from ambient light. However, a closed system is preferred.

The matter to be tailored can be placed in or directed through the apparatus. For example, a metal ingot can be placed in the center of the cylindrical space of a CPT Cage. For example, the matter can be placed on the base or supported in the center. Alternatively, if the matter to be tailored is a gas or fluid, it can be directed through the apparatus, such as along the central axis of the cylindrical space in a tube, such as transparent or translucent tubing 21 (FIG. 2C).

The distance between the radiation source 22 and the material and/or gas conduit can impact the results achieved. For example, the lamps can be placed between about 5 and 100 cm or more from the conduit and/or material. In other embodiments, the distance between the radiation source and the material and/or gas conduit can be between about 100 cm and 1 meter or more.

In other instances, the radiation can be filtered. Filters, such as colored optical glass filters, available from photography supply shops, for example, can be used. In yet other embodiments, the filter can be other materials, such as water, gas (air or other gas), a manufactured or tailored material, such as those materials described or made herein, or a material of selected density, chemical make-up, properties or structure. In one embodiment, the filter can be placed between the radiation source(s) and the target metal or alloy or gas used in the method. Filters can also be called "forcing functions." Forcing functions can be used in conjunction with electromagnetic radiation sources to induce or affect a change in a material. Forcing functions can be manufactured from tailored and natural materials and include metals and non-metals. The materials used to make forcing functions can be inorganic or organic compounds, such as biological materials, as well. A preferred organic, biological material is wood. For example, a tailored material as described in U.S. Pat. No. 6,921,497, which is incorporated herein by reference in its entirety can be used. In addition, gases may be injected into apparatus containing a forcing function to modify the performance of the assembly.

In one embodiment, the radiation source has an environment which is different from that of the material to be tailored. This can be accomplished by directing a gas flow into the lamp environment. Where the radiation source is a pencil lamp within a box to radiate a gas, this can be accomplished by direct gas flow into the box. In other embodiments, the radiation source can be a short arc lamp or a short arc lamp assembly. In such embodiments, the gas can be introduced into the reflector proximate to the lamp. The gas includes those gases discussed above.

The radiation can be applied continuously or discontinuously (e.g. pulsed or toggled) and its intensity can be modulated. Where the radiation is applied continuously, the radiation can begin prior to introduction of the gas into the conduit or after. It can be applied for the duration of a cycle or series of cycles. Where the radiation is pulsed, the length of each pulse can be the same or different. This is conveniently accomplished by controlling the lamps with a computer. The factors to be considered in radiation source placement, exposure and sequence include the desired wavelength, intensity, and energy characteristics, the angle of incidence, and the harmonic profile to be injected into the targeted material (e.g. gas, metal, tailored metal, radiated gas and the like).

In some instances, the radiation source and/or pencil lamp(s) and/or filters and/or target material or gas are advantageously cooled. For example, where a high intensity discharge lamp is used in combination with a pencil lamp(s), it may be advantageous to cool the pencil lamp to prevent damage. Alternatively, where a short arc lamp is used in combination with pencil lamps and/or glass filters it may be advantageous to cool the pencil lamps to prevent damage as well as the glass filter to prevent breakage.

Other sources of energy can be used to apply an oscillating electromagnetic field and tailor the materials of the invention. For example, DC current can be applied continuously or the amperage varied, for example between 0-300 amps, such as 0-150 amps. AC current can be applied continuously or varied, e.g., in a wave pattern, such as a sinusoidal wave, square wave, or triangle wave pattern of a selected frequency and amplitude. Typically, 10 volts, peak to peak, is used at 0-3.5 MHz, 0-28 MHz, or 0-50 MHz. In other embodiments, the peak to peak voltage was less that about 15 vdc, 10 vdc, 8 vdc, 7.2 vdc, 5 vdc, 1.7 vdc, and 1 vdc. A frequency generator can be used. In one embodiment, electrodes can be placed in the reactor, such as below the surface of the material, and current applied. As with the radiation discussed above, the current can be applied to coincide with a cycle or series of cycles or during all or a part of a single step of the process. Often the power supply is turned on prior to attachment to the electrodes to avoid any power surge impacts.

A new composition of matter of the present invention can manifest itself as a transient, temporal, adjustable, and/or permanent change in energy and/or associated properties. Property change can be exhibited as or comprise a change in: (1) structural atomic character (e.g., XES/XRF peak creation, peak fluidity, peak intensity, peak centroid, peak profile or shape as a function of material/sample orientation, atomic energy level(s), and TEM, STM, MFM scans); (2) electronic character (e.g., SQUID, scanning SQUID, scanning magnetoresistive microscopy, scanning magnetic microscope, magnetometer, non-contact MFM, electron electromagnetic interactions, quantum (or topological) order, quantum entanglement, Jahn-Teller effect, ground state effects, electromagnetic field position/orientation, energy gradients, Hall effect, voltage, capacitance, voltage decay rate, voltage gradient, voltage signature including slope of decay and/or change of slope decay, voltage magnitude, voltage orientation); (3) structural molecular or atomic character (e.g., SEM, TEM, STM, AFM, LFM, and MFM scans, optical microscopy images, and structural orientation, ordering, long range alignment/ordering, anisotropy); (4) physical constants (e.g., color, crystalline form, specific rotation, emissivity, melting point, boiling point, density, refractive index, solubility, hardness, surface tension, dielectric, magnetic susceptibility, coefficient of friction, x-ray wavelengths); (5) physical properties (e.g., mechanical, chemical, electrical, thermal, engineering, and the like); and, (6) other changes that differentiate naturally occurring materials from manufactured materials created by inducing a change in matter.

A preferred analytical method is x-ray fluorescence spectrometry. X-ray fluorescence spectrometry is described in "X-Ray Fluorescence Spectrometry", by George J. Havrilla in "Handbook of Instrumental Techniques for Analytical Chemistry," Frank A. Settle, Ed., Prentice-Hall, Inc: 1997, which is incorporated herein by reference. XRF spectrometry is a well-known and long-practiced method, which has been used to detect and quantify or semi-quantify the elemental composition (for elements with $Z \geq 4$) of solid and liquid samples. This technique benefits from minimal sample preparation, wide dynamic range, and being nondestructive. Typically, XRF data are not dependent on which dimension (e.g., axial or radial) of a sample was analyzed. Accuracy of less than 1% error can generally be achieved with XRF spectrometry, and the technique can have detection limits of parts per million.

XRF spectrometry first involves exciting an atom, such that an inner shell electron is ejected. Upon ejection of an electron, an outer shell electron will "drop" down into the lower-energy position of the ejected inner shell electron. When the outer shell electron "drops" into the lower-energy inner shell, x-ray energy is released. Typically, an electron is ejected from the K, L, or M shell and is replaced by an electron from the L, M, or N shell. Because there are numerous combinations of ejections and replacements possible for any given element, x-rays of several energies are emitted during a typical XRF experiment. Therefore, each element in the Periodic Table has a standard pattern of x-ray emissions after being excited by a sufficiently energetic source, since each such element has its own characteristic electronic state. By matching a pattern of emitted x-ray energies to values found in tables, such as those on pages 10-233 to 10-271 of "Handbook of Chemistry and Physics, $73^{rd}$ Edition," edited by D. R. Lide, CRC Press, 1992, which is incorporated herein by reference, one can identify which elements are present in a sample.

There are two standard variations of the XRF technique. First, as an energy-dispersive method (EDXRF), the XRF technique uses a detector such as a Si(Li) detector, capable of simultaneously measuring the energy and intensity of x-ray photons from an array of elements. EDXRF is well-suited for rapid acquisition of data to determine gross elemental composition. Typically, the detection limits for EDXRF are in the range of tens to hundreds of parts-per-million. A wavelength-dispersive technique (WDXRF) is generally better-suited for analyses requiring high accuracy and precision. WDXRF uses a crystal to disperse emitted x-rays, based on Bragg's Law. Natural crystals, such as lithium fluoride and germanium, are commonly used for high-energy (short wavelength) x-rays, while synthetic crystals are commonly used for low-energy (longer wavelength) x-rays. Crystals are chosen, in part, to achieve desired resolution, so that x-rays of different energies are dispersed to distinguishable $2\theta$ angles. WDXRF can either measure x-rays sequentially, such that a WDXRF instrument will step through a range of $2\theta$ angles in recording a spectrum, or there will be detectors positioned at multiple $2\theta$ angles, allowing for more rapid analysis of a sample. Detectors for WDXRF commonly include gas ionization and scintillation detectors. A further description of the use of WDXRF technique in the present invention can be found in Example 1. Results from EDXRF and results from WDXRF can be compared by determining the relationship between a $2\theta$ angle and the wavelength of the corresponding x-ray (e.g., using Bragg's Law) and converting the wavelength into energy (e.g., energy equals the reciprocal of the wavelength multiplied by Planck's constant and the velocity of light).

Analysis of emitted x-rays can be carried out automatically or semi-automatically, such as by using a software package (e.g., UNIQUANT® software, Thermo Fisher Scientific, Inc.) for either EDXRF or WDXRF. UNIQUANT® is used for standard-less, semi-quantitative to quantitative XRF analysis using the intensities measured by a sequential x-ray spectrometer. The software package unifies all types of samples into one analytical program. The UNIQUANT® software program is highly effective for analyzing samples for which no standards are available. Sample preparation is usually minimal or not required at all. Samples can be of very different natures, sizes and shapes. Elements from fluorine or sodium up to uranium, or their oxide compounds, can be analyzed in samples such as a piece of glass, a screw, metal drillings, lubricating oil, loose fly ash powder, polymers, phosphoric acid, thin layers on a substrate, soil, paint, the year rings of trees, and, in general, those samples for which no standards are available. The reporting is in weight % along with an estimated error for each element.

In software packages such as UNIQUANT®, an XRF spectrum is composed of data channels. Each data channel corresponds to an energy range and contains information about the number of x-rays emitted at that energy. The data channels can be combined into one coherent plot to show the number or intensity of emitted x-rays versus energy or $2\theta$ angle (the $2\theta$ angle is related to the wavelength of an x-ray), such that the plot will show a series of peaks. An analysis of the peaks by one skilled in the art or the software package can identify the correspondence between the experimentally-determined peaks and the previously-determined peaks of individual elements. For an element, peak location (i.e., the centroid of the peak with respect to energy or $2\theta$ angle), peak profile/shape, peak creation, and peak fluidity would be expected to be essentially the same, within experimental error, for any sample containing the element. If the same quantity of an element is present in two samples, intensity will also be essentially the same, excepting experimental error and matrix effects.

A typical software package is programmed to correlate certain data channels with the emitted x-rays of elements. Quantification of the intensity of emitted x-rays is accomplished by integrating the XRF spectrum over a number of data channels. Based on the measured intensities and the previously-compiled data on elements, the software package will integrate over all data channels, correlate the emitted x-ray intensities, and will then calculate the relative abundance or quantity of elements which appear to be present in a sample, based upon comparison to the standards. Composition of matter changes produced by the present invention will generally be characterized by an XRF spectrum that reports: (1) the presence of an element which was not present in the starting material and was not added during the process; (2) an increased amount of an element that was not added to the process in the amount measured; or, (3) a decreased amount of an element that was not removed during the process in the amount indicated. Examples of (3) include a reduction in identifiable spectra referencing the sum before normalization and/or reappearance of an element upon combustion. Products of the present invention can also be characterized by the difference between XRF UNI-QUANT® analysis such as by burning the sample (e.g., LECO® analysis), described in more detail below.

A "LECO®" analysis is meant to include an analysis conducted by the CS-300 Carbon/Sulfur determinator supplied by a LECO® computer. The CS-300 Carbon/Sulfur determinator is a microprocessor based, software driven instrument for measurement of carbon and sulfur content in metals, ores, ceramics and other inorganic materials.

Analysis begins by weighing out a sample (1 g nominal) into a ceramic crucible on a balance. Accelerator material is added, the crucible is placed on the loading pedestal, and the ANALYZE key is pressed. Furnace closure is performed automatically, then the combustion chamber is purged with oxygen to drive off residual atmospheric gases. After purging, oxygen flow through the system is restored and the induction furnace is turned on. The inductive elements of the sample and accelerator couple with the high frequency field of the furnace. The pure oxygen environment and the heat generated by this coupling cause the sample to combust. During combustion all elements of the sample oxidize. Carbon bearing elements are reduced, releasing the carbon, which immediately binds with the oxygen to form CO and $CO_2$, the majority being $CO_2$. Also, sulfur bearing elements are reduced, releasing sulfur, which binds with oxygen to form $SO_2$.

Sample gases are swept in the carrier stream. Sulfur is measured as sulfur dioxide in the first IR cell. A small amount of carbon monoxide is converted to carbon dioxide in the catalytic heater assembly while sulfur trioxide is removed from the system in a cellulose filter. Carbon is measured as carbon dioxide in the IR cells, as gases flow trough the IR cells.

Ideally, the relative abundances will total 100% prior to normalization. However, for a variety of reasons, such as improper or insufficient calibration, bumpy or irregular surfaces, and/or non-planar sample surface the relative abundances will not total 100% prior to normalization. Another reason that the relative abundances of elements do not total 100% prior to normalization is that a portion of the XRF spectrum falls outside of the data channels that the software package correlates with an element (i.e., a portion of the XRF spectrum is not recognized as belonging to an element and is not included in the relative abundance calculation). In this case, the relative abundances will likely total less than 100% prior to normalization. Further, the samples will often have anisotropic characteristics whereby an axial scan is distinct from a radial scan. Thus, products of the invention may be characterized by an XRF spectrum that is not recognized by the UNIQUANT® software (e.g., sum of known concentrations before normalization is less than 100%) described herein in an amount, for example, of less than 98%, such as less than 90%, such as less than 80%. In additional embodiments, the software package reports or detects one or more elements not detected by other methods or are detected in different quantities.

X-ray emission spectrometry (XES), a technique analogous to XRF, also provides electronic information about elements. In XES, a lower-energy source is used to eject electrons from a sample, such that only the surface of the sample is analyzed. Similar to XRF, a series of peaks is generated, which corresponds to outer shell electrons replacing ejected inner shell electrons. The peak shape, peak fluidity, peak creation, peak intensity, peak centroid, and peak profile are expected to be essentially the same, within experimental error and matrix effects, for two samples having the same composition.

Thus, XES analysis of the control standard compared to the atomically altered (i.e., manufactured or tailored) state can also be analyzed. Manufactured copper in the axial direction exhibits similar composition to natural copper (i.e., 99.98% wt), but radial scans exhibit new peaks in the region close to naturally occurring S, Cl, and K. The shifting centroid of the observed peaks from the natural species (i.e., S, Cl, and K) confirms electronic change in the atomic state of the base element. Conventional chemical analysis performed using a LECO® (IR) analyzer to detect $SO_x$ in the vapor phase post sample combustion confirmed the absence of sulfur at XES lower detection limits.

Non-contact, magnetic force microscopy image or scanning tunneling microscopy (STM) scan can also confirm the production of a new composition of matter or manufactured or tailored material, identified by an altered and aligned electromagnetic network. Individually, and from differing vantage points, these scans show the outline of the changed electromagnetic energy network. Change can be identified by radially and axially anisotropic images.

New compositions of matter can be electronically modified to induce long range ordering/alignment or the materials which can be identified by radially and axially anisotropic images. Optical microscopy and SEM imaging of the material verifies the degree and extent of long range ordering achieved.

Non-contact, magnetic force microscopy image or scanning tunneling microscopy (STM) scans can also confirm the production of a new composition of matter or manufactured or tailored material, identified by an altered and aligned electromagnetic network. Individually, and from differing vantage points, these scans can show the outline of the changed electromagnetic energy network. Non-contact MFM imaging can show that products of the invention often possess clear pattern repetition and intensity of the manufactured material when compared to the natural material, or starting material. Products of the invention can be characterized by the presence of magnetic properties in high purity, non-magnetic metals, such as elemental copper (e.g., 99.98% wt).

Products can also be characterized by color changes. The variation in color of copper products ranged from black, copper, gold, silver and red. Other visual variations included translucency and near transparency at regions. While not being bound by theory, the alteration of the metal's electronic state enables the new composition of matter's color to be adjusted or altered.

Other products of the processes are characterized by changes in hardness. The variation in diamond pyramid hardness between different manufactured copper samples ranged from about 25 to 90 (or 3 to 9 times higher than natural copper). Hardness change can be radially and axially anisotropic.

Manipulation of the electrodynamic components affecting the orientation of a manufactured metal's or alloy's electromagnetic field can enable the observance of a Hall voltage ($V_H$). Manipulation of the electrodynamic components enables intensification of electromagnetic field affording charge concentration on the surface of the atoms within the bulk as opposed to the bulk surface of the bath. Properties that reflect field repositioning can include changing capacitance and voltage decay rate and voltage gradients within a conducting bulk media.

The products produced by the process have utilities readily apparent to those skilled in the art. Indeed, materials which comprise metals can be used to manufacture products having differing chemical properties (e.g., regioselectivity, regiospecificity, or reaction rate), electronic properties (e.g., band gap, susceptibility, resistivity, or magnetism), mechanical properties (e.g., ductility or hardness) and/or optical properties (e.g., color).

The products of this invention are preferably essentially carbon free or essentially free of additional or added carbon. In contrast, the products as described in U.S. Pat. No. 7,238,297, for example, are characterized by carbon at saturation levels or above. "Essentially carbon free", as defined in this case, means that the product has no more than the amount of carbon present in the starting material. That is, it is unnecessary to add carbon to the process in order to achieve tailoring. The prior art products generally contained carbon in amounts that equal or exceed saturation. For example, in the case of aluminum, carbon saturation is between approximately 0.22 and 0.71 atomic %. In the case of copper, carbon saturation is about 0.04 atomic %. In the case of silicon, carbon saturation is about 0.18 atomic %. Thus, in one embodiment, the products of the invention are characterized by one or more electronic and/or physical characteristics described above in addition to having a carbon percentage less than saturation. In a preferred embodiment, the product has no more than the carbon content of the starting material added to the process. In another embodiment, the product is essentially free of carbon and, in one embodiment, contains no detectable carbon.

As discussed above, analysis of the composition by X-ray fluorescence is a convenient method for detecting tailoring of a material. Tailoring is detected if the report generated detects the presence of an element that (1) was not present in the starting material and was not added or (2) was present in the starting material and (a) additional elements was not added or (b) was not removed or diluted. Thus, in preferred embodiments, the invention relates to compositions, essentially free of carbon, wherein the composition (e.g., a metal, such as copper) comprises a material characterized by an X-ray fluorescence analysis report wherein the report recites the presence of an element in the periodic table wherein said composition has not been in contact with said element; or comprises a material characterized by an X-ray fluorescence analysis report wherein the report recites a concentration of an element in the periodic table that exceeds the concentration of said element added to the composition; or comprises a material characterized by an X-ray fluorescence analysis report wherein the report recites a concentration of an element in the periodic table that is less than the concentration of said element added to the composition.

Experimental Section

Tailoring protocols can be broken into three conceptual steps: 1) application of wavelength specific electromagnetic radiation considered standardization of states; 2) alteration of electrodynamic interactions considered meta-arrangements of geometric symmetries; and 3) structural stabilization through the systematic removal of energy/radiation termed dynamic exiting. These steps enable new low energy routes for the manipulation of matter and energy. Furthermore, these routes appear engineerable if cohomologous structures and associated relationships are properly maintained.

For photonic tailoring (PT), either a natural metal or a previously tailored metal is exposed to specific sequenced forms of electromagnetic radiation. The addition of sequenced electromagnetic radiation is typically in the visible light range. For photonic tailoring, the degree of material modification is dependent upon the following variables: (1) wavelengths of the electromagnetic radiation, (2) the half-width of the bands, (3) their intensity, (4) modulation, (5) timing sequences, and (6) the specific combination of bands used. These are controlling variables that are used during the tailoring process. Lights used may include long-wave and short-wave ultraviolet, neon, mercury vapor, xenon, argon, sodium vapor, metal halide, mercury/xenon and the like. Each of these sources induced a unique mixing of harmonic forms. Simultaneous with this photonic treatment, the metal may be immersed in liquid such as condensed gases (e.g., liquid nitrogen to achieve temperatures of 77K) or deionized water to facilitate a change in harmonic ratios. A signal probe may be attached to the metal under treatment to deliver unique harmonic forms for similar purpose. The following examples delineate representative treatment protocols.

Example 1. Analytical Methods

Analytical Overview

A material previously treated via hot metal tailoring is selected for further material modification via photonic tailoring (alternatively a natural material may be chosen). The tailored material may include, but is not limited to, copper, magnesium, aluminum, or silicon. Changes to the material affected by photonic tailoring are monitored using wave-dispersive X-ray fluorescence spectroscopy (XRF). Two separate WD-XRF instruments are employed: an ARL 8410 sequential wavelength dispersive spectrometer and the Bruker Pioneer WD-XRF. The ARL is equipped with a standardless UNIQUANT® algorithm used to detect and quantify the presence of various elements. This instrument detects elements from Na to U, with typical lower detection limits of 20 ppm and an energy resolution of ~1 eV per angular step. Crystal and angular range are chosen to minimize energy step size. The S4 PIONEER® utilizes a very thin beryllium tube window in combination with multiple primary beam filters, collimators and crystals enabling 29 different scan combinations. Crystal and angular range are chosen to minimize energy step size. The Pioneer instrument detects elements from Be to U. Typically, a 29 mm elliptical mask is also used. In addition to XRF monitoring of the tailored materials, the XRF is repetitively applied to known "control" standards to confirm the stability and accuracy of the instruments. The standards are listed in the table below:

| Tailored Material | Control Standards Used to Validate WD-XRF |
|---|---|
| Cu | NIST SRM 1122 (certified composition % wt: 97.45 Cu, 0.16 Fe, 0.22 Co, 0.004 Mn, 0.002 Cr, 0.17 Al, and 0.17 Si) Cu sputtering target (≥99.999%$_{wt}$) Melted Cu control blank (≥99.98%$_{wt}$) |
| Mg | Mg sputtering target (≥99.999%$_{wt}$) Melted Mg (≥99.98%$_{wt}$) control blank, generated from the same starting material used to produce the tailored materials. This starting material is melted in the same crucible and reactor as the tailored materials, but no tailoring protocols are applied. |
| Al | Al sputtering target (≥99.999%$_{wt}$) Melted Al (≥99.99%$_{wt}$) control blank |
| Si | Si sputtering target (≥99.999%$_{wt}$) Melted Si (≥99.99%$_{wt}$) control blank |

Procedural Overview:

Prior to performing any photonic tailoring, the hot metal tailored material or natural material is analyzed via ARL UNIQUANT® ten times to provide a sufficient distribution of data for statistical analysis. In all cases the samples and control standards are handled and cleaned using industrially-accepted protocols validated via WD-XRF (e.g., flycut samples, polishing, gloves, etc.). Immediately following these ARL sample analyses, ten control standards are run on the ARL. Line scans are then preformed on both the sample and the standard using either the ARL, or the Pioneer, or both. Typically, the ARL is used to perform line scans in addition to the UNIQUANT® analysis. When line scans are performed on the sample using the ARL, the same line scans are performed on a control sample. Photonic tailoring routine is then applied to the sample. At the completion of the photonic tailoring, these same analytical protocols are employed.

The UNIQUANT® results from the pre-run and post-run samples are statistically compared. In most cases, statistically-significant changes occur. In addition, the samples are monitored for temporal sensitivity. Again, statistically-significant changes often occur. Simultaneously the actual spectra of the tailored material are compared pre- and post-run. Changes in the spectra include but are not limited to: peak broadening, peak shoulders, movement of centroids, existence of primary peaks with missing secondary peaks, etc. In addition, changes occur to the spectra in time. Similarly, the standards are monitored. No statistically-significant changes have been observed in the reported composition of the standards via UNIQUANT® analysis validating the stability of the analytical equipment. In addition, the spectra of the standard materials remain constant in time.

Analytical Protocol:

The following analytical protocol was followed. The ARL WD-XRF is programmed to perform ten (10) UNIQUANT® elemental analysis scans for both the tailored sample and a NIST standard with similar high purity composition. For example, in the case of Cu, C1122 is employed. C1122 is a Beryllium Copper standard. The major components of this Cu standard are Be 1.75, Fe 0.16, Si 0.17, Al 0.17, Co 0.22 wt % and the composition is not expected to deviate by more than ±1 in the last significant figure. A scan of each spectral region of interest (ROI) (e.g., Al—Si, Ga—Se, P—Ti, and V—Zn) is arbitrarily chosen as an energy range in which elemental emissions may be detected and is performed for both the NIST standard and the tailored sample to provide a full XRF spectrum. For example, a scan can include Al—Si: 1.45-2.05 KeV, P—Ti: 2.00-5.5 KeV, V—Zn: 4.8-9.1 KeV, and Ga—Se: 8.9-11 KeV. The Photonic Tailoring experiment is executed. Immediately following the room temperature light triggering, the entire sample protocol is repeated: 10 UNIQUANT® analyses of both the tailored sample and the standard, and a full spectral analysis of both the tailored sample and the NIST standard. This protocol is then repeated at 24 hour intervals up to 96 hours and may be repeated at longer intervals (e.g., 30, 60, 90, and/or 120 days). The protocols and the times for a representative series of experimentation are delineated in the following table.

| Pre run procedures (standard handling/cleaning protocols) |
|---|
| 10x UniQuants of freshly flycut sample |
| 10x UniQuants of standard (e.g., NIST 1122) |
| 1x ARL line scan of sample over ROIs (Region of Interests) |
| 1x ARL line scan of standard over ROIs |
| 1x Pioneer line scans of sample |
| 1x Pioneer line scans of standard |
| Execute Photonic Tailoring |
| Post procedures (standard handling/cleaning protocols) |
| 10x UniQuants of sample |
| 10x UniQuants of standard |
| 1x Pioneer line scan of sample |
| 1x Pioneer line scan of standard |

-continued 4 line scan regions (Al—Si, P—Ti, V—Zn and Ga—Se)
(approx 3 hours for all 4)
1x ARL line scan of sample over ROIs
1x ARL line scan of standard over ROIs
Repeat ROI line scans for 72~96 hours
10x UniQuants of sample
10x UniQuants of standard
1x Pioneer line scan of sample
1x Pioneer line scan of standard For experimental expediency, at times the number of Pioneer and/or ARL scans may be decreased or the ROI modified to target a specific KeV range. Also at times, the sequence of analyses (e.g., ARL vs Pioneer) may be changed. At all times, a standard or control sample is run simultaneous to the tailored sample.

Example 2. CPT Cage Configuration

The CPT Cage is assembled as shown in FIG. 1. The terms are as defined below:

Definitions

Radiation center: The term radiation center refers to the physical center spot at base level from which all other positioning measurements are made.
Motive lamp: Motive lamp is a descriptor of a 250 watt mercury vapor lamp with a reflector normally used in industrial applications for lighting large spaces such as warehouses.
Pencil lamp: Cylindrical gas filled lamp used for creating specialty light spectrums based on the gas used (e.g., Hg, Ne, etc.). Pencil lamps are commonly used in the calibration of optical equipment.
Diode lamp: A lamp using a light emitting diode (LED) to output a particular wavelength.
SUV: Short wave ultraviolet irradiation is generated using a pencil lamp having a primary energy emission of 254 nm.
LUV: Long wave ultraviolet irradiation is generated using a pencil lamp having a principal emission of 365 nm.
Timing sequence: Timing for each step (i.e., ring activation, step 1, step 2, and step 3) follows a Fibonacci sequence multiplied by the base of choice. For example, if the base of choice is one minute, the timing sequence is 1, 1, 2, 3, 5, 8, etc. expressed in minutes.
Equipment Design
Ring assembly (see FIG. 2)
Argon '2×4' assembly
Xenon '2×4' assembly
Maskit Boundary: Derivative Index-2S (CPT Cage)

After pre-run analytical protocols are complete (e.g., WD-XRF as delineated in prior table), the sample to be photonically tailored is positioned inside the CPT Cage of FIG. 2 at the radiation center on a white liner/towel. All external sources of light are turned off. After 10 minutes in darkness (i.e., t=10 m:00 s), the rings on the CPT Cage are activated sequentially.
Step 1: Standardization of States.
　Step 1.1: Ring Assembly Energizing Sequence.
　Turn on 365 nm ring LED 1. Immediately energize the $1^{st}$ coil (bottom coil) and turn the counter to t=0 (time zero). After 1 minute (t=1 min) energize the $2^{nd}$ coil. After an additional minute (t=2 min), turn on the 740 nm ring LED 1 and energize the $3^{rd}$ coil. After 2 additional minutes (t=4 min), turn the $3^{rd}$ coil off. After 3 additional minutes (t=7 min), energize the $4^{th}$ coil. After 5 additional minutes (t=12 min), turn the $3^{rd}$ coil on again. After 8 additional minutes (t=20 min), turn on the 530 nm ring LED 1 immediately followed by energizing the $5^{th}$ coil. After 13 additional minutes (t=33 minutes) position a preheated overhead mercury vapor motive above the radiation center centered axially with respect to the ring assembly. Reset counter to zero (t=0 minutes).
　Step 1.2: Meta-Arrangement of Symmetries.
　After 1 min (t=1 min) turn on the xenon 2×4 assembly (e.g., xenon and 530 nm RC LED simultaneously). After an additional minute (t=2 min), turn on argon 2×4 assembly (e.g., argon and 365 nm LED simultaneously). After 2 additional minutes (t=4 min), turn on a neon pencil lamp centered over the sample and positioned between the sample and the 2×4 assemblies. After 3 additional minutes (t=7 min), turn on a long wave ultraviolet pencil lamp centered over the sample and positioned between the sample and the neon pencil. Reset counter to zero (t=0 minutes).
　Step 1.3: Dynamic Exiting.
　After a 5 minute hold (t=5 minutes), retrieve the sample from the radiation center and place the sample in a liquid $N_2$ bath that is in close proximity to the radiation center.
Step 2: Meta-Arrangement of Symmetries.
　When the sample reaches 77K, reset the counter to zero (t=0 min). Pass at least 1 mA at 1700 kHz through liquid $N_2$ for 2 minutes in a sinusoidal waveform. Then pass ≥3 mA DC through the sample for ≥10 seconds. Reset counter to zero (t=0 min). Now pass at least 1 mA at 3500 kHz through liquid $N_2$ for 3 minutes in a triangular waveform. Then pass ≥3 mA DC through the sample for ≥10 seconds. Reset counter to zero (t=0 min). Finally, pass at least 1 mA at 200 Hz through liquid $N_2$ for 5 minutes in a square waveform. Then pass ≥3 mA DC through the sample for ≥10 seconds. Reset counter to zero (t=0 min). Turn on the laboratory lighting (e.g., fluorescence lights). Pass ≥1 mA at 200 Hz through liquid $N_2$ for 8 minutes in a square waveform.
Step 3: Dynamic Exiting.
　Retrieve the cold sample and place into a glass jar containing deionized water, then position the glass jar within the ring assembly at the radiation center (elevate the glass to achieve standard ring cage positioning, centered vertically relative to the $3^{rd}$ ring). After the sample reaches ambient conditions, turn off all lamps simultaneously. Hold in darkness for approximately 10 minutes. Turn on the fluorescence lights then turn off all power sources to the ring assembly. Remove the sample with clean gloves; pat dry with Kimwipes EX-L, and hold for approximately 10 minutes under fluorescence lights. Transfer the sample to a WD-XRF for spectral analysis.

Example 3. DE Lens Operations

DE Lens (See FIG. 3, Particularly 3F)
　Tailored Plate: A macro lens with thin square samples, defined as forcing functions, extracted axially from a tailored ingot. One sample (forcing function) is attached to the top plate of the DE Lens even with the base and along the centerline. The other sample (forcing function) is attached to the bottom plate even with the base and along the centerline. The samples are attached using silver conducting paste and a removable Teflon fastener. The samples are attached on the outside of the plates.
　DC Wire: Wire must maintain opposite polarity from the plate. For example, if the plate has positive polarity, the top wire has negative polarity with the same voltage as the plate.
Argon '2×4' assembly Xenon '2×4' assembly
Material Selection
Tailored Metal of Choice
Positioning: Centered at the radiation center with the narrow sides directed towards the 2×4 assemblies. Sample should be placed in the upright position (with narrow edges on surface).
DE Lens Operational Procedures
DE Lens Positioning Position 1: DE Lens horizontal with aperture/nose 1.5 inches from the sample surface. DE lens centered with respect to sample. (Note: when the sample is put into DI water, the lens tip will be 2.5 inches from the sample, near the side of the beaker).

Position 2: DE Lens is horizontal and orthogonal to the neon pencil lamp with the aperture/nose 1.5 inches from the bulb. The DE lens is centered with respect to the bulb.

Position 3: DE Lens is horizontal (in plane with) and orthogonal to the 2×4s. The DE Lens is centered between the 2×4 assemblies with the aperture/nose 1.5 inches from the bulb tips when measured from an imaginary plumb line connecting them (i.e., approximately 10 inches vertical of Position 2).

Position 0: DE Lens is vertical and under the table with the aperture/nose ~1.5 inches from the sample surface and collinear with the vertical radiation centerline. The DE Lens is centered with respect to the sample.

DE Krypton and Argon Pencil Lamp Positioning with Respect to Forcing Functions

Top Side: Kr DE pencil lamp is placed above the forcing function (wafer-like tailored sample), with the bulb parallel to the forcing function with the tip pointing towards the lens tip. Bulb arc should be even with the front of the forcing function. The bulb is approximately ½ inch above the forcing function as measured to the bottom of the glass bulb.

Bottom Side: Ar DE pencil lamp is placed below forcing function, with the bulb parallel to the forcing function with the tip pointing towards the lens tip. Bulb arc should be even with the front of the forcing function. The bulb is approximately ½ inch above the forcing function as measured to the bottom of the glass bulb.

Sequenced DE Pencil Operation

Initiate Operations: Turn DC voltage to 1000 V. Approach Voltage 1 (V-1) of pattern S, J, or U (see Attachment 1 for S, J, U voltage patterns) over 10 seconds. DE-Krypton and DE-Argon pencil lamps are on. See also the tables outlined above.

Sequenced Operations:
Step Up (V-1): DE Krypton on, DE Argon on, 2× hold, DE Krypton off.
Step Up (V-2): DE Krypton off, DE Argon on, hold.
Step Up (V-3): DE Krypton off, DE Argon on, hold, DE Krypton on.
Step Up (V-4): DE Krypton on, DE Argon on, 2× hold, DE Argon off.
Step Down (V-3): DE Krypton on, DE Argon off, hold.
Step Down (V-2): DE Krypton on, DE Argon off, hold.
Step Down (V-1): DE Krypton on, DE Argon on, 2× hold, DE Krypton off.
Step Up (V-2): DE Krypton off, DE Argon on, hold.
Note: Other pencil lamp patterns may be used.

DC Pattern Operations
Voltage Series S, J, and U (as above).
Sweep Up: V-1→V-2→V-3→V-4.
Sweep Down: V-4→V-3→V-2→V-1.
Typical Sweep Rate Up (excluding hold times): 5 seconds.
Typical Sweep Rate Down (excluding hold times): 8 seconds.
Hold times: 5 seconds or multiples thereof.
S Series: 35 Vdc-1, 95 Vdc-2, 79 Vdc-3, 99 Vdc-4. Max: 100 Vdc.
J Series: 352 Vdc-1, 153 Vdc-2, 481 Vdc-3, 878 Vdc-4. Max: 1000 Vdc.
U Series: 476 Vdc-1, 176 Vdc-2, 229 Vdc-3, 410 Vdc-4. Max: 500 Vdc.

Figure 8C:
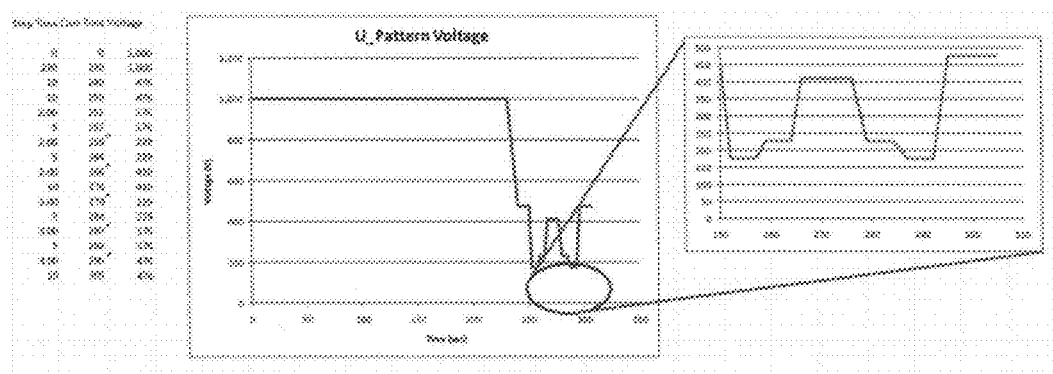
FIGS. 8A, 8B and 8C illustrate DE Lens Operation Voltage patters S, J and U, respectively.
Figure 8A:
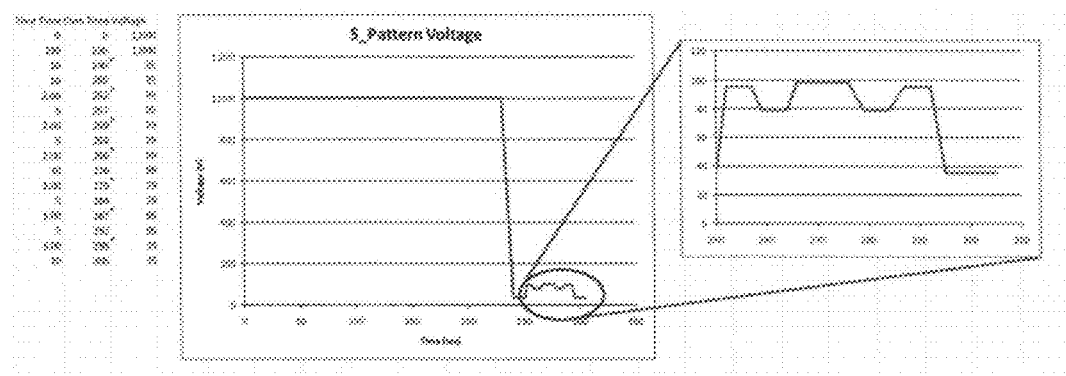
Figure 8B:
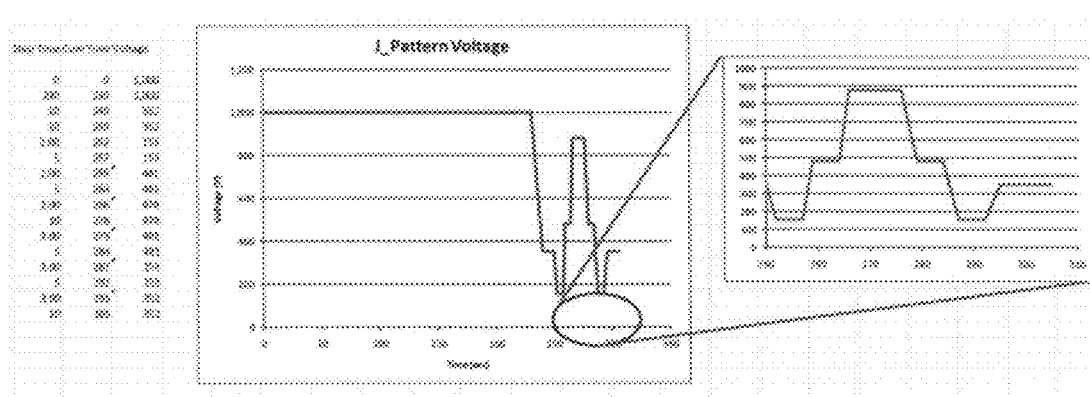
Figure 8C:
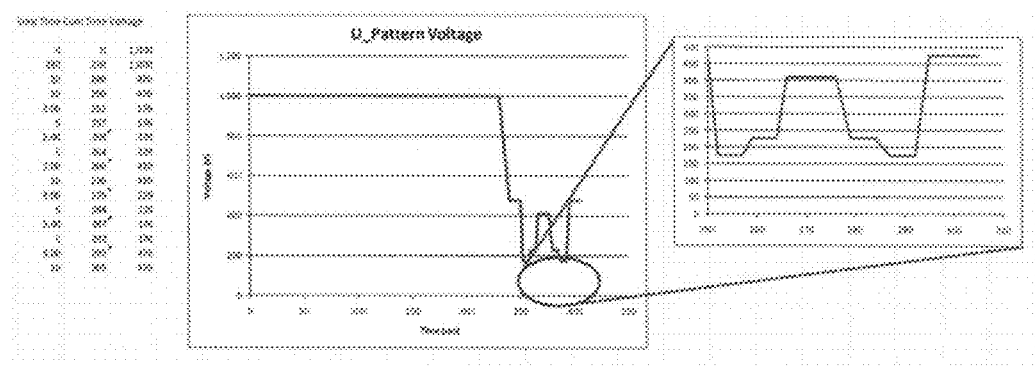

FIGS. 8A-8C illustrate the patterns.

Step 0: Preparation
Hold sample in darkness (no fluorescent lab lights)
Initiate operations:
  At counter=1 m:00 s, energize DE lens to Max_Vdc (Pattern S, J, or U) then turn on DE Krypton pencil lamp (DE Lens position 1, 2, 3 or 0)
  At counter=4 m:50 s, turn on DE-Argon pencil lamp then commence down ramp to V-1 over 10 seconds
  At counter=5 m:00 s, commence patterned operation (S, J, or U)
    Staged Voltage (Vdc-n), Hold time 5 seconds
    Staged Rate Up (excluding hold times): 5 seconds
    Staged Rate Down (excluding hold times): 8 seconds
  If AC tailoring is desired
  After one complete DC cycle, energize and initiate AC frequency set (e.g., 1-6) while maintaining DC operations on the plates (repeating cycles).
  At counter=10 m:00 s, Reset Counter to $T_0$.
  At T=13 m:00 s, position (centered) a preheated overhead mercury vapor motive above the radiation center.

Step 1: Standardization of States
  Set Counter=$T_0$
  At Counter=1 m:00 s, turn on the xenon 2×4 assembly (e.g., xenon and 530 nm LED simultaneously); Set Counter=$T_0$
  At Counter=1 m:00 s, turn on the argon 2×4 assembly (e.g., argon and 365 nm LED simultaneously); Counter=$T_0$
  At Counter=2 m:00 s turn on a neon pencil lamp centered over the sample and positioned between the sample and the '2×4' assemblies; Counter=$T_0$
  At Counter=3 m:00 s turn on a long wave ultraviolet pencil centered over the sample and positioned between the sample and the neon pencil lamp; Set Counter=$T_0$
  At Counter=5 m:00 s, retrieve the sample from the radiation center and place in a liquid nitrogen bath that is in close proximity to the radiation center. DE Lens assembly remains on.

Step 2: Meta-Arrangement of Symmetries
  After the sample reaches 77K, Set Counter=$T_0$
  Pass at least 1 milliamp at 1700 kHz through the liquid nitrogen for 2 minutes (sinusoidal wave form) followed be passing ≥3 milliamps DC of current through the sample for ≥10 seconds; Set Counter=$T_0$
  Pass at least 1 milliamp at 3500 kHz through the liquid nitrogen for 3 minute (triangular wave form) followed be passing ≥3 milliamps DC of current through the sample for ≥10 seconds; Set Counter=$T_0$
  Pass at least 1 milliamp at 200 Hz through the solution for 5 minutes (square wave form) followed be passing ≥3 milliamps DC of current through the sample for ≥10 seconds; Set Counter=$T_0$
  Turn on laboratory lighting (e.g., fluorescence lights)
  Pass ≥1 milliamp at 200 Hz through the solution for 8 minutes (square wave form)

Step 3: Dynamic Exiting
Retrieve the cold sample and place into a glass jar containing DI water, then position the glass jar at the radiation center. [Elevate to achieve standard positioning]
After the sample reaches ambient conditions, commence lamp removal
Turn off Xenon 2×4 LED system
Turn off the neon, simultaneously
Turn off the argon 2×4 LED system
Turn off the fluorescent (lab) lights
Turn off the LUV
Remove the hot mercury vapor motive
Commence DE Lens Deactivation
Set Counter=$T_0$
At Counter=5 m:00 s AND the completion of the DC cycle (i.e., returned to Vdc-1), turn off the DC power to the DE lens, the DE Krypton and DE Argon pencil lamps remain on.
After 10 additional AC complete cycles (if AC tailoring desired), turn off the AC frequency set.
Immediately turn off the DE-Krypton and the DE-Argon pencil lamps simultaneously.
Hold in darkness for approximately 10 minutes
Turn on the fluorescence lights
Hold for approximately 10 minutes under fluorescence lights then transfer to a WD-XRF for analysis.

Example 4. Maskit Boundary: Derivative Index-2S (CPT Cage, DE)

A DE Lens can be used to enhance and refine the performance of the tailoring protocol. Schematics and photos of the DE Lens assembly are shown in FIG. 3. Essentially, the protocols remain the same as above except for the use of the lens.
After pre-run analytical protocols are complete (e.g., WD-XRF as delineated in prior table), the sample to be photonically tailored is positioned inside the CPT Cage at the radiation center on a white liner/towel. All external sources of light are turned off. After 10 minutes in darkness (i.e., t=10 m:00 s), the rings on the CPT Cage are activated sequentially.
Step 1: Standardization of States:
Step 1.1: Ring Assembly Energizing Sequence.
Turn on 365 nm ring LED 1. Immediately energize the $1^{st}$ coil (bottom coil) and turn the counter to t=0 (time zero). After 1 minute (t=1 min) energize the After an additional minute (t=2 min), turn on the 740 nm ring LED 1 and energize the $3^{rd}$ coil. After 2 additional minutes (t=4 min), turn the $3^{rd}$ coil off. After 3 additional minutes (t=7 min), energize the $4^{th}$ coil. After 5 additional minutes (t=12 min), turn the $3^{rd}$ coil on again. After 8 additional minutes (t=20 min), turn on the 530 nm ring LED 1 immediately followed by energizing the $5^{th}$ coil. After 13 additional minutes (t=33 minutes) position a preheated overhead mercury vapor motive above the radiation center centered axially with respect to the ring assembly. Reset counter to zero (t=0 minutes).
Step 1.2: Meta-Arrangement of Symmetries.
After 1 min (t=1 min) turn on the xenon 2×4 assembly (e.g., xenon and 530 nm RC LED simultaneously, see reference drawing.) After an additional minute (t=2 min), turn on argon 2×4 assembly (e.g., argon and 365 nm LED simultaneously, see reference drawing). After 2 additional minutes (t=4 min), turn on a neon pencil lamp centered over the sample and positioned between the sample and the 2×4 assemblies. After 3 additional minutes (t=7 min), turn on a long wave ultraviolet pencil lamp centered over the sample and positioned between the sample and the neon pencil. Reset counter to zero (t=0 minutes).
Step 1.3: Dynamic Exiting.
After a 5 minute hold (t=5 minutes), retrieve the sample from the radiation center and place the sample in a liquid $N_2$ bath that is in close proximity to the radiation center.
Step 2: Meta-Arrangement of Symmetries.
When the sample reaches 77K, reset the counter to zero (t=0 min). Pass at least 1 mA at 1700 kHz through liquid $N_2$ for 2 minutes in a sinusoidal waveform. Then pass ≥3 mA DC through the sample for ≥10 seconds. Reset counter to zero (t=0 min). Now pass at least 1 mA at 3500 kHz through liquid $N_2$ for 3 minutes in a triangular waveform. Then pass ≥3 mA DC through the sample for ≥10 seconds. Reset counter to zero (t=0 min). Finally, pass at least 1 mA at 200 Hz through liquid $N_2$ for 5 minutes in a square waveform. Then pass ≥3 mA DC through the sample for ≥10 seconds. Reset counter to zero (t=0 min). Turn on the laboratory lighting (e.g., fluorescence lights). Pass ≥1 mA at 200 Hz through liquid $N_2$ for 8 minutes in a square waveform.
Step 3: Dynamic Exiting.
Retrieve the cold sample and place into a glass jar containing deionized water, then position the glass jar within the ring assembly at the radiation center (elevate the glass to achieve standard ring cage positioning, centered vertically relative to the $3^{rd}$ ring). After the sample reaches ambient conditions, turn off all lamps simultaneously. Hold in darkness for approximately 10 minutes. Turn on the fluorescence lights then turn off all power sources to the ring assembly. Remove the sample with clean gloves; pat dry with Kimwipes EX-L, and hold for approximately 10 minutes under fluorescence lights. Transfer the sample to a WD-XRF for spectral analysis.

Example 5. Maskit Boundary Formation: Derivative Index-4 (CPT Cage, DE)

After pre-run analytical protocols are complete (e.g., WD-XRF as delineated in prior table), the sample to be photonically tailored is positioned inside the CPT Cage at the radiation center on a white liner/towel. All external sources of light are turned off. After 10 minutes in darkness (i.e., t=10 m:00 s), the rings on the CPT Cage are activated sequentially.
Changes to the operation of the CPT Cage can have consequential impact on the tailoring results; operating conditions can be adjusted dependent on the material being tailored and the desired outcome. For example, the ring activation sequence, the frequency, the wave pattern, the timing, and the point of application can be altered. The run plan specified below was used on tailored copper to induce spectral change. However, this protocol was easily adapted and executed on tailored magnesium, aluminum, and silicon samples. For both magnesium and aluminum, the same ring activation sequence as that used for copper was employed however for aluminum, the frequency sweeps were applied to the $5^{th}$ coil, ranged from 500 kHz to 20.2 MHz and followed a sinusoidal pattern of 3 seconds up and 5 seconds down. For magnesium, a square frequency pattern ranging from 557 Hz to 157 kHz was applied to the first coil, following a symmetric timing of 9 seconds up, 9 seconds down. For silicon, the ring activation sequence was altered as well as the application of harmonics. A triangle wave was applied in the frequency range of 0 Hz to 3.5 MHz with a timing of 9 seconds up and 3 seconds down. These alterations to the protocol are illustrative of the type and range of changes that can occur on a material-specific basis.

CPT Ring Illumination:

Turn on 365 nm CPT_CED-1 immediately followed by energizing coil 1 (DC Power), the "bottom" ring closest to the countertop. After 3 sec, energize the $2^{nd}$ coil (from the bottom) using 60 Hz AC current. After 6 additional seconds, t=10 min 9 sec, turn on 740 nm CPT LED-1 immediately followed by energizing the nth coil ($3^{rd}$) using an AC frequency of 60 Hz. The counter is then reset to zero (t=0). After 9 minutes, 12 sec (t=9 m, 12 sec), the $n^{th}$ coil is turned off, while the 740 nm CPT_LED-1 remains on. The counter is again set to 0. After 9 sec, the $4^{th}$ coil is energized using a square wave at 1700 kHz through DC power with 2.5 V offset. The counter is again set to zero and after 9 sec, the 530 nm CPT_LED-1 is turned on immediately followed by energizing the $5^{th}$ coil using DC power. Ring illumination is complete. Counter reset to zero (t=0).

Step 1: Standardization of States.

After 10 minutes of ring illumination, a metal halide lamp is placed orthogonal to the apparatus. Note, the metal halide lamp is hot and has attained steady state conditions. After 2 additional minutes (t=12 min), the xenon 2×4 system (a xenon lamp and a 530 nm LED) is turned on. The 530 nm LED is centered on the xenon bulb in an orthogonal position (the LED faces towards and collinear with the 530 nm LED, facing towards the orthogonal argon 2×4 lamp). After 3 additional minutes (t=15 min), the argon 2×4 system (an argon lamp with a 365 LED) is turned on. The 365 nm LED is centered on the argon bulb in an orthogonal position (the LED faces towards and collinear with the 365 nm LED, facing towards the orthogonal xenon 2×4 lamp). The counter is reset to zero (t=0). After 3 minutes (t=3 min), the neon pencil lamp positioned 6 inches above the top CPT ring in a horizontal position is turned on. After 2 additional minutes (t=5 min), the LUV positioned 2 inches above the top CPT ring, also in a horizontal position, is turned on. After 2 additional minutes (t=7 min), the oval shielded SUV is turned on. The oval shield should be placed at 0° in a vertical position on the reflector radius of the motive lamp with the tip pointing up. The lamp is positioned half way between 2×4 and neon light. Next, the 740 nm LED is turned on with the bulb tip positioned at the reflector radius, collinear with the SUV oval opening. The $3^{rd}$ coil of the CPT Cage, is then energized with 60 Hz AC. Reset counter to zero (t=0). After 9 seconds, switch the $3^{rd}$ coil frequency conditions: 987 Hz to 2.83 MHz, with a sweep time of 15 sec up, 15 sec down (e.g., in copper), using a sinusoidal wave form. Set the counter to zero (t=0). After 9 min, 12 sec, change the frequency conditions on the $4^{th}$ coil of the CPT Cage (DC power with 2.5 V offset): 557 Hz to 157 kHz, with a sweep time of 3 seconds up, 5 seconds down (e.g., in copper), using a square wave form. Set counter to zero (t=0).

Step 2: Meta-Arrangement of Symmetries.

After 20 min (t=20 min) the LUV in the glove box is turned on. After one and a half minutes (t=21 min, 30 sec) the ingot is transferred to the glove box, placed in liquid nitrogen for cooling (liquid should be ~1 inch above sample surface), and positioned 6 inches below the LUV (in a horizontal orientation). The CPT Cage remains energized during ingot removal. After the ingot is in liquid $N_2$, terminate sweeping the $3^{rd}$ coil, returning to a 60 Hz sinusoidal wave form. When the ingot reaches 77K (approximately 10 minutes), pass at least 1 mA at 1700 kHz (sinusoidal waveform) through the liquid for 2 minutes (signal probes not in contact with tailored material). Place signal probes in contact with the ingot, on opposing axial positions within the outer ⅓ radius (e.g., axial probe position). Pass 2 mA DC through the system for 10 seconds. Now place probes in liquid and pass at least 1 mA at 2500 kHz through the liquid for 7 minutes in a triangular wave form. Pass 3 mA DC through the system (probes in axial position on ingot) for 10 seconds. Pass at least 1 mA at 200 Hz through the solution (probes in liquid) for 5 minutes. Pass 3 mA DC through the system (probes in axial position on ingot) for 10 seconds. Position hot mercury vapor lamp overhead and set counter to zero (t=0). After 3 minutes (t=3 min), pass 3 mA DC current through the system (axial probe position) using the 1(a) pattern defined below:

| 1(a) Pattern: | Apply DC for 3 sec, hold 3 sec |
| --- | --- |
| | Apply DC for 3 sec, hold 6 sec |
| | Apply DC for 3 sec, hold 3 sec |
| | Apply DC for 3 sec, hold 6 sec |

Turn on the fluorescence lights. Pass 3 mA DC current through the system (axial probe position on tailored material) using the a(1) pattern defined below:

| a(1) Pattern: | Apply DC for 9 sec, hold 9 sec |
| --- | --- |
| | Apply DC for 3 sec, hold 6 sec |
| | Apply DC for 3 sec, hold 3 sec |
| | Apply DC for 3 sec, hold 6 sec |

Pass at least 1 mA at 200 Hz through the liquid for 3 minutes in a square wave form. Remove signal probes. Re-energize the frequency generator to the $3^{rd}$ CPT Cage coil changing the sweep wave form to a triangle wave (1700 kHz). Place the tailored sample into a glass jar containing de-ionized water (DI $H_2O$). Place the sample system in the energized CPT Cage positioned at the radiation center. Insert DC probes into the DI water bath, halfway between the sample and the jar. Probe depth should be centered on the $1^{st}$ CPT ring (bottom). The voltage applied should be sufficient to create a water bath bridge. Position the hot metal halide lamp 8 to 10 inches closer to the sample system in an orthogonal position. Initiate a pulsed DC current pattern following 9 sec on, 3 sec off, repeating for 15 minutes. At 15 minutes, set counter to zero (t=0) and turn off the water bridge power supply.

Step 3: Dynamic Exiting.

Position the hot sodium vapor motive orthogonal and 15 inches from the radiation center. After 30 minutes (t=30 min) commence lamp removal, allowing 30 seconds between sequential lamp removal. First, turn off the xenon 2×4 LED system. Next, simultaneously turn off the neon and 740 nm LED. Third, turn off the glove box LUV. Fourth, turn off the oval shielded SUV. Fifth, turn off the argon 2×4 LED system. Sixth, turn off the fluorescence lights. Remove the metal halide hot lamp (seventh) and the sodium vapor hot lamp ($8^{th}$). Ninth, turn off the LUV and finally remove the mercury vapor hot lamp ($10^{th}$). Set counter to zero (t=0). After 10 minutes (t=10 min) turn on the fluorescence lights, immediately turning off all ring energizing and ring LED power sources (simultaneously). At t=15 min, remove the ingot with composite rubber gloves and pat dry. Hold under fluorescence lights for an additional 15 minutes. Transfer sample for XRF analysis.

The data is taken from interior, fly cut, tailored copper sample H23 (ingot 14-07-03) which was then subjected to photonic tailoring and tracked over time via wave-dispersive X-ray fluorescence spectrometry (WD-XRF). These data were compared to control samples e.g., NIST Standard Reference material (SRM) of comparable composition or high purity sputtering targets. Preliminary data regarding the temporal behavior of the ingot over the initial 96 hours post-treatment was observed in the spectra in the 6.0 to 7.25 keV region. Post 0 represents immediately after room temperature treatment.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for tailoring materials comprising: a non-conductive support structure; a plurality of individual, substantially identically-sized single-loop wire rings of a conducting metal spaced apart from one another and stacked in alignment to form a cylindrical space within the rings sufficient to house a material to be tailored, the wire rings being fixed in place and supported by said non-conductive support structure; at least one power source operably connected to each wire ring; and at least one LED, positioned outside the space within the wire rings, with a lens that touches an outer diameter of a wire ring and is directed radially toward the space within the wire rings; and also wherein AC power can be supplied to power at least one wire ring and DC power can be supplied to power at least one other wire ring.

2. The apparatus of claim 1, wherein at least one wire ring is powered by a DC current power supply overlayed with an AC frequency supply.

3. The apparatus of claim 2, wherein the AC frequency supply is in the range of 5 Hz to 5 MHz.

4. The apparatus of claim 2, wherein the AC frequency supply is in the range of 100 to 1700 kHz.

5. The apparatus of claim 1, wherein at least one wire ring is made from a tailored material.

6. The apparatus of claim 5, wherein the wire rings are spaced evenly apart in a cylindrically defined space.

7. The apparatus of claim 1, wherein the number of aligned wire rings is 3 or more rings.

8. The apparatus of claim 1, wherein the wire rings are copper wire rings made with 14 to 30 gauge copper wire.

9. The apparatus of claim 8, wherein each wire ring is a wire winding 2 or more inches in diameter.

10. The apparatus of claim 8, wherein each wire ring is formed by winding the copper wire about 8 or more times.

11. An operating unit comprising an apparatus according to claim 1 and further comprising a material to be tailored disposed at a center location of at least one wire ring.

12. The operating unit of claim 11, wherein the distance between the at least one wire ring and the material to be tailored is sufficiently large such that, when power is supplied to the wire ring, arcing is avoided.

13. The apparatus operating unit of claim 11, wherein every portion of the at least one wire ring is at least 2 inches from the material to be tailored.

14. The operating unit of claim 11, wherein the material disposed at the center location of a wire ring has been at least partially tailored in the apparatus.

15. The operating unit of claim 11, wherein, after operation of the apparatus, a material disposed in the space within the rings has different mechanical, electrical, chemical, thermal, engineering and/or physical properties, than the material had before operation of the apparatus.

16. The operating unit of claim 15, wherein there are 3 or more wire rings.

17. The apparatus of claim 1, wherein AC power is provided to the at least one wire ring at 1 mAmp or more.

18. The apparatus of claim 1, wherein DC power up to 5 kv is provided to the at least one other wire ring.

19. The apparatus of claim 1, wherein current is supplied to the wire rings and the current flow in each of the wire rings is in the same direction.

20. The apparatus of claim 1, further comprising at least two additional LEDs, each directed radially toward the space within the wire rings.

21. The apparatus of claim 20, wherein each LED comprises a lens that is touching an outer diameter of a wire ring.

22. The apparatus of claim 1, further comprising at least one additional LED, positioned outside the space within the wire rings and directed radially toward the space within the wire rings.

23. The apparatus of claim 1, further comprising at least two additional LEDs directed radially toward the space within the wire rings, wherein the at least two additional LEDs have different frequency regions.

24. The apparatus of claim 1, wherein there are a plurality of LEDs, and each LED comprises a lens that is touching an outer diameter of a wire ring.

25. The apparatus of claim 1, wherein current is supplied to the wire rings and the current flow in some of the wire rings is in a different direction than the current flow in other wire rings.

26. The apparatus of claim 1, wherein the support structure and the wire rings comprise a CPT Cage.

27. The apparatus of claim 26, wherein the CPT Cage is an open CPT Cage.

28. The apparatus of claim 26, wherein the CPT Cage is a closed CPT Cage.

29. The apparatus of claim 26, wherein the CPT Cage is coupled to a resonant modulator and a collector.

30. The apparatus of claim 29, wherein the resonant modulator includes a toroid coil and an exciter.

31. The apparatus of claim 30, wherein the toroid coil is copper and is operably connected to an AC or DC current or to an AC current with DC overlay.

32. The apparatus of claim 30, wherein the collector and the exciter are made from the same conducting material.

33. The apparatus of claim 30, wherein the resonant modulator comprises a ring resonator, and the ring resonator and the exciter are positioned on one side of the CPT Cage while the collector is positioned on the opposite side of the CPT Cage.

34. The apparatus of claim 29, wherein the collector has a concave side.

35. The apparatus of claim 29, wherein the resonant modulator and the collector are positioned outside the CPT Cage.

36. The apparatus of claim 29, wherein the collector is positioned opposite to the resonant modulator such that a concave face of the collector is facing the CPT Cage.

37. An apparatus for tailoring materials comprising: a non-conductive support structure; a plurality of individual wire rings of a conducting metal spaced apart from one another and stacked in alignment to form a cylindrical space within the rings sufficient to house a material to be tailored, the wire rings being fixed in place by said non-conductive support structure; at least one power source operably connected to each wire ring; and a plurality of LEDs positioned outside the space within the rings and directed radially toward the space within the rings; wherein AC power is connected to at least one wire ring and DC power is connected to at least one other wire ring; and, further wherein there are at least three wire rings associated respectively with three separate LEDs each operating in a different frequency region.

38. The apparatus of claim 37, wherein a first of the LEDs is a LUV LED operating at 365 nm, a second of the LEDs is a green LED operating at 530 nm, and a third of the LEDs is a red LED operating at 740 nm.

39. The apparatus of claim 37, wherein the LED emitting the highest wave length is touching the center wire ring.

40. An apparatus for tailoring materials comprising: a non-conductive support structure; at least five individual wire rings of a conducting metal spaced apart from one another and stacked in alignment to form a cylindrical space within the rings sufficient to house a material to be tailored, the wire rings being fixed in place by said non-conductive support structure; at least one power source operably connected to each wire ring; and a plurality of LEDs positioned outside the space within the rings and directed radially toward the space within the rings; wherein AC power is connected to at least one wire ring and DC power is connected to at least one other wire ring; and, further wherein: a first LED operating at 395 nm is directed towards the first wire ring in the stack of five rings in a plane directed through the central axis of the cylindrical space, at an angle defined as being 0°; a second LED operating at 740 nm is directed towards the third wire ring in the stack of five rings at an angle offset at 120° from the orientation of the first LED; and a third LED operating at 530 nm is directed towards the fifth wire ring in the stack of five rings at an angle offset at 120° from the orientations of the first and second LEDs.

41. The apparatus of claim 40, wherein the lens of the first LED is touching the outer diameter of the first wire ring, the lens of the second LED is touching the outer diameter of the third wire ring, and the lens of the third LED is touching the outer diameter of the fifth wire ring.

42. An apparatus for tailoring materials comprising: a non-conductive support structure; a plurality of individual wire rings of a conducting metal spaced apart from one another and stacked in alignment to form a cylindrical space within the rings sufficient to house a material to be tailored, the wire rings being fixed in place by said non-conductive support structure; at least one power source operably connected to each wire ring; and a plurality of electromagnetic energy sources, selected from the group consisting of short arc lamps, high intensity discharge lamps, pencil lamps, lasers, light emitting diodes (LEDs), incandescent lamps, fluorescent lamps and halogen lamps, positioned outside the space within the rings and directed radially toward the space within the rings; wherein AC power is connected to at least one wire ring and DC power is connected to at least one other wire ring.

* * * * *